(12) United States Patent
Nakagawa et al.

(10) Patent No.: US 7,150,144 B2
(45) Date of Patent: Dec. 19, 2006

(54) ENGINE CONTROL APPARATUS

(75) Inventors: Shinji Nakagawa, Tokyo (JP); Toshio Hori, Tokyo (JP); Masami Nagano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/914,272

(22) Filed: Aug. 10, 2004

(65) Prior Publication Data
US 2005/0056002 A1 Mar. 17, 2005

(30) Foreign Application Priority Data
Sep. 11, 2003 (JP) ............................. 2003-320187

(51) Int. Cl.
*F01N 3/00* (2006.01)
(52) U.S. Cl. ...................... 60/277; 60/276; 60/285; 60/297; 60/301; 701/103
(58) Field of Classification Search .................. 60/274, 60/276, 277, 278, 285, 297, 301; 701/103, 701/109
See application file for complete search history.

(56) References Cited
U.S. PATENT DOCUMENTS 6,383,267 B1 *  5/2002  Takaku et al. ................ 96/111
6,389,802 B1 *  5/2002  Berger et al. ................. 60/274
6,758,034 B1 *  7/2004  Winkler et al. ............... 60/285
6,834,497 B1 * 12/2004  Miyoshi et al. ............... 60/277
6,889,497 B1 *  5/2005  Schnaibel et al. ............. 60/285

FOREIGN PATENT DOCUMENTS

| DE | 19850786 A1 | 2/2000 |
| DE | 19926305 A1 | 12/2000 |
| DE | 10003612 A1 | 8/2001 |
| DE | 10039709 A1 | 3/2002 |
| EP | 1134376 A2 | 9/2001 |
| JP | 7-180535 | 7/1995 |
| JP | 2000-337130 | 12/2000 |
| JP | 2002-266629 | 9/2002 |

* cited by examiner

*Primary Examiner*—Binh Q. Tran
(74) *Attorney, Agent, or Firm*—Crowell & Moring LLP

(57) ABSTRACT

A control apparatus is capable of separately detecting an unexpected fluctuation in the amount of NOx discharged from an engine (combustion chamber), separately from deterioration of lean NOx catalyst performance, thereby avoiding incorrect diagnosis of deterioration of the lean NOx catalyst, and ensuring the optimum control of the catalyst.

12 Claims, 59 Drawing Sheets

FIG. 14
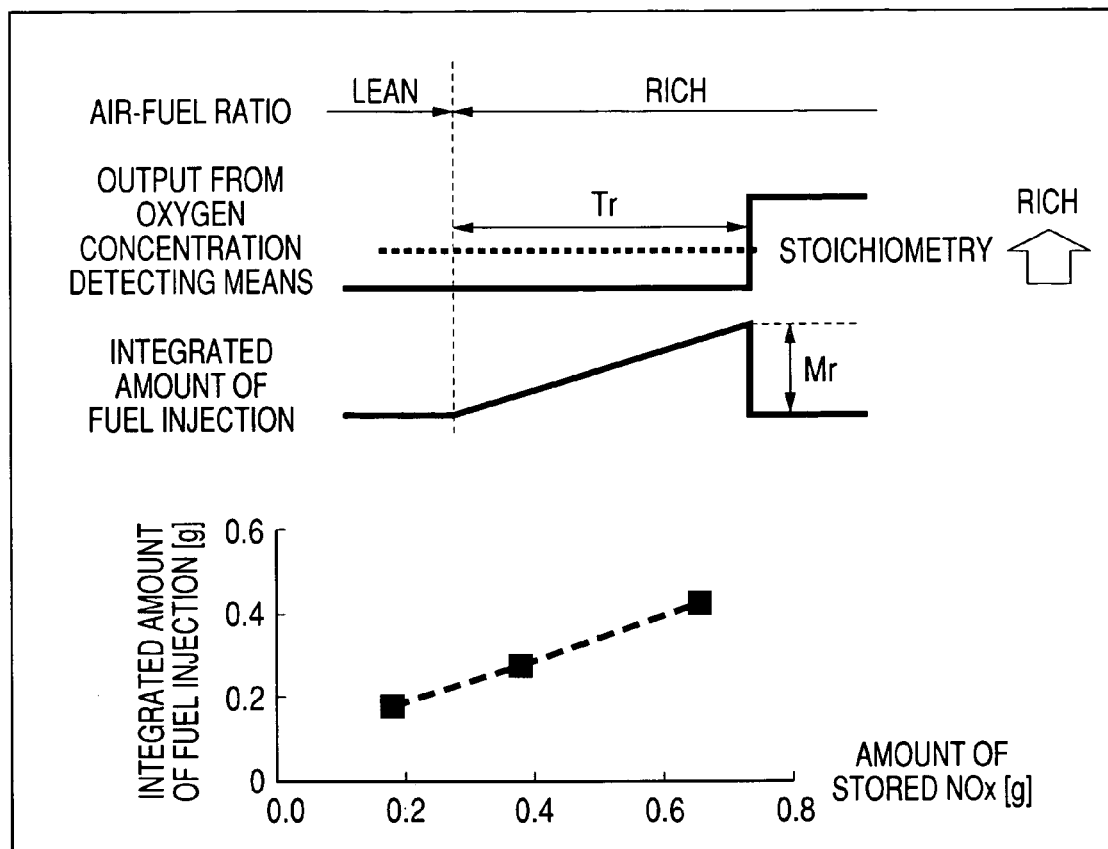
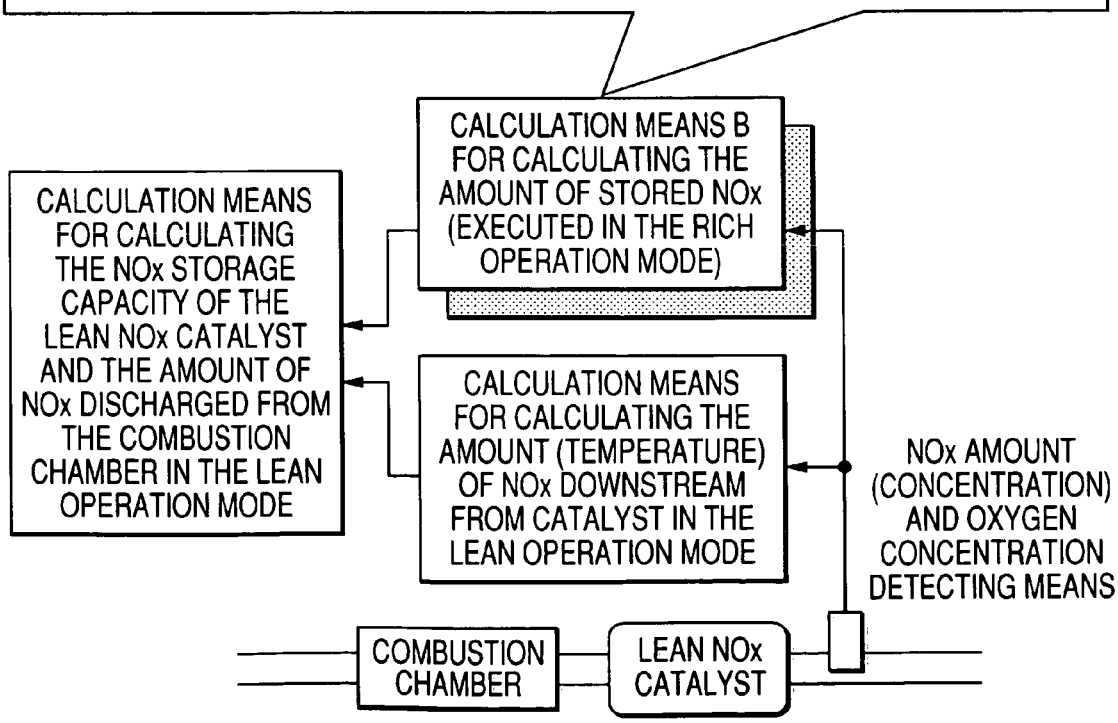

TARGET AIR-FUEL RATIO CALCULATION SECTION
(RICH SPIKE CONTROL SECTION)

<LEAN NOx CATALYST MODEL>

CALCULATION SECTION FOR CALCULATING THE AMOUNT OF NOx DOWNSTREAM FROM CATALYST IN THE LEAN OPERATION MODE (EXECUTED IN THE LEAN OPERATION MODE)

CALCULATION SECTION FOR CALCULATING THE AMOUNT OF STORED NOx
(EXECUTED IN THE RICH OPERATION MODE)

FIG. 43
CALCULATION SECTION FOR CALCULATING THE AMOUNT OF STORED NOx
(EXECUTED IN THE RICH OPERATION MODE)
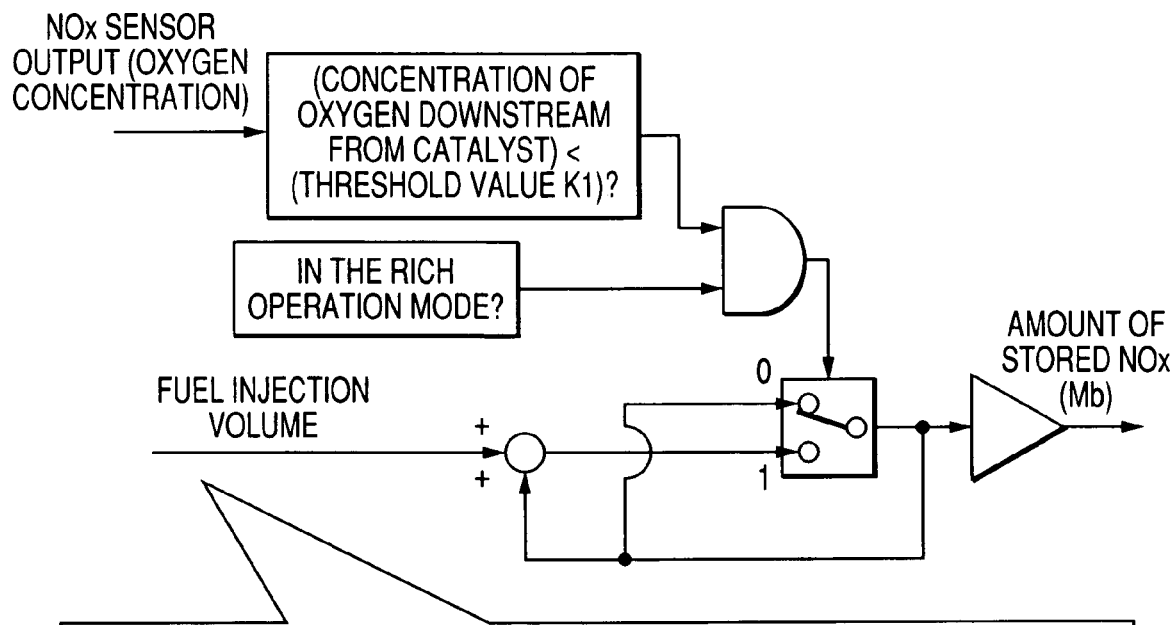
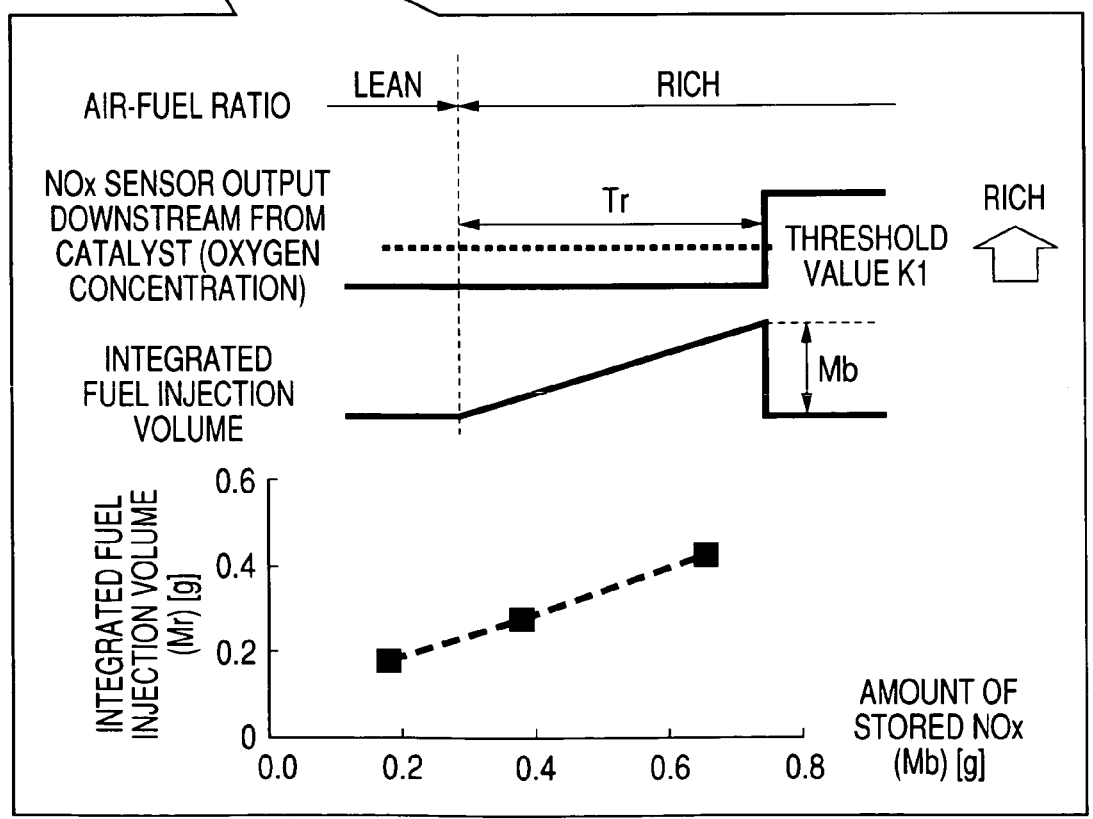

TARGET AIR-FUEL RATIO CALCULATION SECTION
(RICH SPIKE CONTROL SECTION)

RICH VOLUME CONTROL SECTION

DIAGNOSTIC SECTION FOR THE LEAN NOx CATALYST AND THE AMOUNT OF NOx DISCHARGED FROM THE COMBUSTION CHAMBER $$fm(Rs) = fn(Rs) \times \frac{Mb-Md}{Mn-Md} + fd(Rs) \times \frac{Mn-Mb}{Mn-Md}$$

DIAGNOSTIC SECTION FOR CHECKING THE LEAN NOx CATALYST (INCLUDING OXYGEN) AND THE AMOUNT OF NOx DISCHARGED FROM THE COMBUSTION CHAMBER

RICH VOLUME CONTROL SECTION

ENGINE CONTROL APPARATUS

CLAIM OF PRIORITY

The present application claims priority from Japanese application serial no. 2003-320187, filed on Sep. 11, 2003, the content of which is hereby incorporated by reference into this application.

FIELD OF THE INVENTION

The present invention relates to a control apparatus of an engine wherein a lean NOx catalyst having a function of storing the NOx discharged from a combustion chamber in the lean operation mode, and desorbing and cleaning the stored NOx in the rich operation mode is provided in an exhaust path. It relates particularly to a control apparatus that ensures a high-precision diagnosis of the performance of the aforementioned lean NOx catalyst (NOx storage capacity) in a lean-burn engine capable of combustion in the wide range of air-fuel ratio.

BACKGROUND OF THE INVENTION

Requirements for a fuel economy engine in the field of a vehicle underlie a recent campaign to combat the global warming problem and energy problem on a worldwide scale. A lean burn engine is one of the most conspicuous examples. Especially in the cylinder injection engine, a fuel is directly injected in the combustion chamber, gas mixture is stratified and combustion is carried out at an air-fuel ratio of 40 or more. This arrangement reduces the fuel cost, as compared with the prior art inlet port injection engine. In the meantime, solution to environmental problems including air pollution requires improvement of the performance of an emission gas, and tighter emission control is being enforced in each country of the world every year.

The three-way component catalyst having been used in the prior art fails to clean the NOx discharged from the engine (combustion chamber) in the lean operation mode. So in the lean burn engine, a lean NOx catalyst is commonly provided in an emission path to clean NOx in the lean operation mode. The lean NOx catalyst stores NOx in the lean operation mode, namely, in the atmosphere of oxidation, and HC and CO are cleaned by oxidation. Further, if rich operation (hereinafter referred to as "rich spike" or "rich control") is started, namely, the atmosphere of reduction is formed in order to clean the stored NOx, then the stored NOx is desorbed to cause oxidation/reduction reaction, together with the reducing agent ($H_2$, CO, HC) discharged from the combustion chamber. Thus, the lean NOx catalyst is effective in reducing the amount of NOx emission, whereas it requires the performance of the catalyst (NOx storage capacity) to be diagnosed.

In the process of diagnosing the performance of lean NOx catalyst (NOx storage capacity), unexpected deterioration of combustion unexpected fluctuation in the amount of NOx emission from the engine (combustion chamber) causes deterioration of diagnostic accuracy of the catalyst. Especially in the case of a cylinder injection engine, the combustion injection valve is installed in the combustion chamber. This makes it easier for the cinders called the deposit to stick to the injection port of the fuel injection valve. Thus, fluctuations in the shape of spray at the time of fuel injection may be caused by the deposit. The fluctuations in the shape of spray often give an adverse effect to the combustion performance, especially to the emission gas performance in the stratified lean operation mode, resulting in a big change in the amount of NOx discharged from the combustion chamber. Further, when the EGR rate in the lean operation mode may not reach the required level due to a trouble of the EGR valve or the like, fluctuations in the amount of NOx flowing into the lean NOx catalyst may be caused.

For example, Japanese Patent Laid-open No. 2000-337130 (pages 1 and 2, FIGS. 1 through 11), wherein an oxygen sensor is arranged downstream from the lean NOx catalyst in the emission path, a technique of estimating the amount of NOx stored in the lean NOx catalyst in the lean operation mode used prior to rich spike, based on the rich reverse delay time of the sensor in the rich spike mode. This technique is to diagnose the performance (the maximum NOx storage volume) of the lean NOx catalyst, based on the amount of the stored NOx. According to this method, however, when there is an unexpected reduction in the amount of NOx flowing into the lean NOx catalyst for the aforementioned causes and others, the amount of the stored NOx estimated in the rich spike mode also reduces, even if the lean NOx catalyst is not subjected to deterioration. This may lead to such an incorrect diagnosis that the lean NOx catalyst has deteriorated.

In Japanese Patent Laid-open No. Hei 07-180535 (pages 1 through 5, FIGS. 1 and 2), an NOx sensor for detecting the concentration is arranged downstream from the lean NOx catalyst, and is used to detect the amount of NOx flowing out of the lean NOx catalyst without being stored in that NOx catalyst in the lean operation mode. When the amount of unstored NOx has been detected to increase in excess of a predetermined value, the lean NOx catalyst is evaluated to have deteriorated. According to this method, however, if there has been an unexpected increase in the amount of NOx discharged from the combustion chamber or the amount of NOx flowing into the lean NOx catalyst in the lean operation mode due to the aforementioned causes, this may lead to such an incorrect diagnosis that the lean NOx catalyst has deteriorated, due to an increase in the amount of unstored NOx in the lean operation mode, even if there is deterioration in the lean NOx catalyst (reduction in NOx storage capacity).

Further, in Japanese Patent Laid-open No. 2002-266629 (pages 1 through 18, FIGS. 1 through 15), at least one of the maximum amount of NOx absorbed by the catalyst and the NOx absorption speed of the catalyst is calculated using the output of a sensor, arranged downstream from the lean NOx catalyst, for detecting the NOx concentration. When the maximum amount of NOx absorbed by the catalyst or the NOx absorption speed of the catalyst calculated in the aforementioned manner is smaller than the evaluation value, the catalyst is evaluated to have deteriorated. This proposal, however, may lead to such an incorrect diagnosis that the lean NOx catalyst has deteriorated, when there has been an unexpected increase in the amount of NOx discharged from the combustion chamber or the amount of NOx flowing into the lean NOx catalyst in the lean operation mode due to the aforementioned causes.

As described above, according to the prior art, when there has been an unexpected increase in the amount of NOx discharged from the combustion chamber or the amount of NOx flowing into the lean NOx catalyst, the lean NOx catalyst may be evaluated as having deteriorated, even if there is no deterioration in the lean NOx catalyst.

SUMMARY OF THE INVENTION

It is an object of the present invention, in view of the prior art described above, to provide a control apparatus of an engine capable of ensuring high-precision diagnosis of the lean NOx catalyst performance, without any possibility of incorrect diagnosis of the lean NOx catalyst, when there has been an unexpected increase in the amount of NOx discharged from the combustion chamber or the amount of NOx flowing into the lean NOx catalyst.

To achieve the aforementioned object, the first embodiment of the present invention is basically applicable to the engine where the lean NOx catalyst having a function storing the NOx discharged from the combustion chamber in the lean operation mode and desorbing and cleaning the stored NOx in the rich operation mode is arranged in the exhaust path. It includes:

catalyst upstream NOx volume detecting means for directly or indirectly detecting the amount of NOx discharged from the combustion chamber or the amount of NOx flowing into the lean NOx catalyst; and catalyst performance diagnosing means for diagnosing the performance often lean NOx catalyst, based on the amount of NOx detected by the catalyst upstream NOx volume detecting means (see FIG. 1).

As described above, the performance of the lean NOx catalyst is diagnosed with consideration given to the amount of NOx discharged from the combustion chamber or the amount of NOx flowing into the lean NOx catalyst. This method ensures accurate evaluation of the performance of the lean NOx catalyst (NOx storage capacity=level of deterioration) without a diagnostic error, as compared to the case of the prior art where the amount of NOx discharged from the combustion chamber or the amount of NOx flowing into the lean NOx catalyst has not been taken into account.

To put it in greater details, unexpected fluctuations may occur to the amount of NOx discharged from the combustion chamber or the amount of NOx flowing into the lean NOx catalyst due to deterioration of combustibility on the engine side, EGR and related failures, deterioration and problems. For example, there may be an increase in the amount of NOx flowing out downstream from the lean NOx catalyst. In this case, according to the prior art method, the lean NOx catalyst may be diagnosed to have deteriorated. Such a diagnostic error can be avoided when the performance of the lean NOx catalyst is diagnosed, based on the amount of NOx discharged from the combustion chamber or the amount of NOx flowing into the lean NOx catalyst, as described above. In the engine arranged for EGR (exhaust gas recirculation), the amount of NOx discharged from the combustion chamber is different from the amount of NOx flowing into the lean NOx catalyst.

The second embodiment of the control apparatus of the present invention has combustion control means for controlling the air-fuel ratio of the gas mixture supplied for combustion, the amount of fuel supplied and intake air volume, based on the result of diagnosis by the catalyst performance diagnostic means, in addition to the configuration of the first embodiment (see FIG. 2).

To put it more specifically, the combustion control means is designed to control the timing of starting rich spike control for the lean NOx catalyst and the rich volume (=rich depth) as the amount of fuel increase relative to the amount of fuel supplied based as a theoretical air-fuel ratio, based on the result of diagnosing the performance of the lean NOx catalyst.

In the third embodiment of the control apparatus of the present invention, the aforementioned catalyst upstream NOx volume detecting means includes a sensor, arranged upstream of the lean NOx catalyst in the emission path, for detecting the amount or concentration of NOx flowing to the NOx catalyst. The catalyst performance diagnostic means is designed to diagnose the performance of the lean NOx catalyst based on the output of the sensor (see FIG. 3). A known NOx sensor capable of detecting the amount and concentration of the NOx in the emission gas is used as the aforementioned sensor.

In the fourth embodiment of the control apparatus of the present invention, the aforementioned catalyst upstream NOx volume detecting means includes a sensor, arranged downstream of the lean NOx catalyst in the emission path, for detecting the amount or concentration of NOx downstream from the lean NOx catalyst. The catalyst performance diagnostic means is designed to diagnose the performance of the lean NOx catalyst based on the output of the sensor (see FIG. 4).

In the fifth embodiment of the control apparatus of the present invention, the aforementioned catalyst upstream NOx volume detecting means includes a sensor for detecting the amount or concentration of oxygen downstream from the lean NOx catalyst. The catalyst performance diagnostic means is designed to diagnose the performance of the lean NOx catalyst based on the output of the sensor (see FIG. 5).

As described above, the amount of NOx discharged from the combustion chamber or the amount of NOx flowing into the lean NOx catalyst can be indirectly detected by the NOx sensor or oxygen sensor arranged downstream from the lean NOx catalyst. This arrangement ensures high-precision diagnosis of the performance of the aforementioned lean NOx catalyst, based on the output of the sensor.

In the sixth embodiment of the control apparatus of the present invention, the aforementioned catalyst performance diagnostic means is designed to change the lean NOx catalyst deterioration evaluation level, based on the fluctuations in the amount of NOx discharged from the combustion chamber or the amount of NOx flowing into the lean NOx catalyst, detected by the catalyst upstream NOx volume detecting means (FIG. 6). To put it more specifically, when a failure has occurred to the EGR means due to the trouble of the EGR valve and there is a sudden increase in the amount of NOx flowing into the lean NOx catalyst, means are provided to ensure that the lean NOx catalyst is not evaluated as having deteriorated, even if the amount of NOx downstream from the lean NOx catalyst has increased.

In the seventh embodiment of the control apparatus of the present invention, the aforementioned catalyst performance diagnostic means is designed to diagnose the performance of the lean NOx catalyst only when the amount of NOx detected by the catalyst upstream NOx volume detecting means lies within a predetermined range (see FIG. 7).

If the amount of NOx discharged from the combustion chamber or the amount of NOx flowing into the lean NOx catalyst is outside the predetermined range, a diagnostic error may occur to the performance of the lean NOx catalyst. Accordingly, diagnosis of this catalyst is performed.

The eighth embodiment of the control apparatus of the present invention comprises an EGR diagnostic means for diagnosing to see if EGR means is normal or not. The aforementioned catalyst performance diagnostic means diagnoses the performance of the lean NOx catalyst only when the EGR means has been evaluated as normal by the EGR diagnostic means. If there is any trouble of the EGR means, there will be a big fluctuation in the amount of NOx discharged from the combustion chamber and the amount of NOx flowing into the lean NOx catalyst, with the result that lean NOx catalyst diagnostic precision is affected. To prevent this, diagnosis of this catalyst is disabled.

The ninth embodiment of the present invention is applicable to an engine wherein lean NOx catalyst having a function of storing the NOx discharged from a combustion chamber in the lean operation mode, and desorbing and cleaning this stored NOx in the rich operation mode is provided in an exhaust path. This control apparatus comprises:

a sensor for detecting the amount or concentration of the NOx downstream from the lean NOx catalyst;

calculation means A for calculating the amount of NOx downstream from the lean NOx catalyst in the lean operation mode, based on the output from the sensor;

calculation means B for calculating the amount of NOx stored in the lean NOx catalyst;

means for calculating the NOx storage capacity of the lean NOx catalyst, based on the results of calculations by the calculation means A and B (see FIG. 9).

The tenth embodiment of the present invention comprises means for calculating the amount of NOx discharged from the combustion chamber in the lean operation mode, in addition to the NOx storage capacity of the lean NOx catalyst, based on the results of calculations by the calculation means A and B (see FIG. 10).

The eleventh embodiment of the present invention comprises:

setting means for setting a reference value A relative to the amount of NOx downstream from the lean NOx catalyst in the lean operation mode;

setting means for setting a reference value B relative to the stored amount of NOx;

comparison means A for comparing between the amount of NOx downstream from the lean NOx catalyst as a result of calculation by the calculation means A, and the reference value A;

comparison means B for comparing between the amount of NOx stored in the lean NOx catalyst as a result of calculation by the calculation means A, and the reference value B;

diagnostic means for evaluating that:

the amount of NOx discharged from the combustion chamber has reduced when the result of calculation by the calculation means A is smaller than the reference value A in the comparison means A, and the result of calculation by calculation means B is smaller than the reference value B in the comparison means B;

the amount of NOx discharged from the combustion chamber has increased when the result of calculation by calculation means A is greater than the reference value A in the comparison means A, and the result of calculation by calculation means B is greater than the reference value B in the comparison means B; and the NOx storage capacity of the lean NOx catalyst has reduced when the result of calculation by calculation means A is smaller than the reference value A in the comparison means A, and the result of calculation by calculation means B is greater than the reference value B in the comparison means B (see FIGS. 11 and 12).

To put it another way, when there is no deterioration in performance of the lean NOx catalyst in the lean operation mode defined by predetermined operation conditions (such as torque, speed, air-fuel ratio, EGR rate and lean time), the estimated NOx that can be stored in the lean NOx catalyst is assumed as the reference value B. When there is no deterioration in performance of the lean NOx catalyst, the concentration (or amount) downstream from the lean NOx catalyst in the lean operation mode defined by predetermined operation conditions (such as torque, speed, air-fuel ratio, EGR rate and lean time), namely, the concentration of the estimated NOx flowing downstream without being stored in the lean NOx catalyst is assumed as the reference value A.

As shown in FIG. 12, the actual NOx concentration (or amount) downstream from the lean NOx catalyst is compared with the reference value A in the lean operation mode (comparison means A). If the actual NOx concentration (or amount) downstream from the lean NOx catalyst is smaller than the reference value A, the amount of NOx discharged from the combustion chamber is considered to have reduced. If the actual NOx concentration (or amount) downstream from the lean NOx catalyst is greater than the reference value A, the amount of NOx discharged from the combustion chamber may have increased or the NOx storage capacity of the lean NOx catalyst may have deteriorated. In this phase, namely, from the result of comparison in the lean operation mode, however, no evaluation is made as to whether the deviation of the actual measurement from the reference value A has been caused by the increase in the amount of NOx discharged from the combustion chamber or by the reduction in the storage capacity of lean NOx catalyst.

Similarly, as shown in FIG. 12, the actual amount of the NOx stored in the lean NOx catalyst is compared with the reference value B in the lean operation mode (comparison means B). If the actual amount of the NOx is greater than the reference value B, the amount of NOx discharged from the combustion chamber is evaluated to have increased. If the actual amount of the NOx is smaller than the reference value B, the amount of NOx discharged from the combustion chamber may have increased or the NOx storage capacity of the lean NOx catalyst may have deteriorated. In this phase, namely, from the result of comparison between the reference value B and actual amount of storage, however, no evaluation is made as to whether the deviation of the actual measurement from the reference value B has been caused by the decrease in the amount of NOx discharged from the combustion chamber or by the reduction in the storage capacity of lean NOx catalyst. FIG. 12 shows the results of comparison by the comparison means A and B shown in the form of a matrix.

As shown in the matrix, from the combination between the results of comparison means A and B, decrease in the amount of NOx discharged from the combustion chamber, increase in the amount of NOx discharged from the combustion chamber and deterioration of the storage capacity of the lean NOx catalyst can be separately considered for evaluation.

To put it another way, if the actual NOx concentration (or amount) downstream from the lean NOx catalyst is smaller than the reference value A in the comparison means A during the lean operation mode, and the actual NOx amount is smaller than the reference value B in the comparison means B, then the amount of NOx discharged from the combustion chamber is evaluated to have decreased. If the actual NOx concentration (or amount) downstream from the lean NOx catalyst is greater than the reference value A in the comparison means A during the lean operation mode, the actual NOx amount is greater than the reference value B in the comparison means B, then the amount of NOx discharged from the combustion chamber is evaluated to have increased. If the actual NOx concentration (amount) is greater than the reference value A in the comparison means A, and the actual NOx amount is smaller than the reference value B in the comparison means B, then the storage capacity of the lean NOx catalyst is evaluated to have decreased.

In the twelfth embodiment of the present invention, the calculation means B for calculating the amount of NOx stored in the lean NOx catalyst calculates the amount of the stored NOx, based on the output of the sensor for detecting the amount and concentration of NOx downstream from the lean NOx catalyst in the rich operation mode performed to desorb and clean the NOx stored in the lean NOx catalyst.

Rich operation is performed to desorb and clean the NOx stored in the lean NOx catalyst in the lean operation mode. As shown in FIG. 13, in the rich operation mode, part of the NOx stored in the lean NOx catalyst remains unclean and is discharged downstream from the catalyst. The amount of discharge is proportional to the amount of NOx stored in the catalyst. Thus, the amount of actually stored NOx can be estimated by the amount or concentration of the NOx downstream from the lean NOx catalyst during rich operation.

The thirteenth embodiment of the present invention comprises a sensor for detecting the concentration of oxygen downstream from the lean NOx catalyst. The calculation means B for calculating the amount of NOx stored in the lean NOx catalyst calculates the amount of the stored NOx, based on the time period from the time when air-fuel ratio of the gas mixture supplied for combustion is made rich, until the air-fuel ratio is detected as being rich by the sensor; or based on the amount of fuel injected or the amount of intake air during this time period, in the rich operation mode used to desorb and clean the NOx stored in the lean NOx catalyst.

Rich operation is performed to desorb and clean the NOx stored in the lean operation mode. As shown in FIG. 14, some time period is required from the time when air-fuel ratio of the gas mixture supplied for combustion is made rich, until the air-fuel ratio is detected as being rich by the sensor (e.g. an oxygen sensor) located downstream from the lean NOx catalyst. During this time period, the NOx stored in the catalyst oxidizes the reducing agent ($H_2$, CO, HC) flowing into the catalyst, so this time period is correlated to the amount of stored NOx. To improve the diagnostic precision, the amount of the actually stored NOx can be estimated based on the amount of fuel injection (or intake air volume) during this time period. The NOx sensor is capable of detecting oxygen at the same time, according to its principle of detection. In this case, therefore, the concentration of both NOx and oxygen can be detected by one NOx sensor.

The fourteenth embodiment of the present invention comprises:

an engine NOx emission volume model for calculating the amount of NOx discharged from the combustion chamber or the concentration of NOx; and a lean NOx catalyst model for calculating the reference values A and B, based on the amount or concentration of NOx discharged from the combustion chamber calculated according to the aforementioned NOx emission volume model (see FIG. 15).

A lean NOx catalyst model is used to calculate both the amount of NOx (estimated value) stored in the lean NOx catalyst during the lean operation as the reference value B, and the amount of NOx (estimated value) discharged downstream, without being stored in the lean NOx catalyst during the lean operation as the reference value A. The input value of the lean NOx catalyst model includes the amount of NOx discharged from the combustion chamber [NOx concentration at the inlet of the lean NOx catalyst (the amount of NOx flowing into the lean NOx catalyst)], air-fuel ratio of the gas mixture supplied for combustion, intake air volume and emission temperature, as shown in FIG. 16. Further, it also calculates the concentration of NOx at the lean NOx catalyst inlet (the amount of NOx flowing into the lean NOx catalyst, using the engine NOx emission volume model. The input value of the engine NOx emission volume model includes the engine torque, engine speed, and EGR rate and air-fuel ratio.

In the fifteenth embodiment of the present invention, the engine NOx emission volume model calculates the amount of NOx discharged from the combustion chamber, by correcting the NOx emission volume basic value calculated according to the engine torque and speed, based on the EGR rate and air-fuel ratio (see FIG. 17).

In the sixteenth embodiment of the present invention, lean NOx catalyst model comprises:

calculation means for calculating the amount of NOx flowing into the lean NOx catalyst, based on the amount of NOx flowing into the lean NOx catalyst calculated by the aforementioned engine NOx emission volume model;

calculation means for calculating the NOx cleaning rate and storage rate based on the reference value A;

calculation means for calculating the amount of NOx storage based on the amount of NOx flowing into the lean NOx catalyst and NOx cleaning rate or storage rate;

setting means for setting the reference value B by adding up the NOx storage volume;

calculation means for subtracting the NOx storage volume from the amount of NOx flowing into the lean NOx catalyst and calculating the amount of unstored NOx; and setting means for setting the reference value A by integrating the unstored amount of NOx.

To put it another way, as shown in FIG. 18, the amount (concentration) of NOx discharged from the combustion chamber is mass-converted by the calculation means for calculating the amount of NOx flowing into the lean NOx catalyst. Then the NOx storage volume is subtracted from the amount of NOx flowing into the lean NOx catalyst to find the amount of unstored NOx. Further, the amount of NOx downstream from the catalyst is found as the reference value A by integrating the unstored amount of NOx. The amount of stored NOx is found by multiplying the amount of NOx flowing into the lean NOx catalyst, by the NOx cleaning rate or storage rate. The amount of stored NOx is expresses the amount of NOx stored during a predetermined time period, and is expressed in g/T. It can be expressed as a storage speed. The amount of NOx stored in a predetermined period time is integrated to get the total amount of NOx stored in the catalyst as a reference value B. Further, the NOx cleaning rate (storage rate) is determined according to the total amount of stored NOx (reference value B). To put it another way, this property can be expressed as follows: The greater the total amount of stored NOx, the smaller the cleaning (storage) rate.

The seventeenth embodiment of the present invention comprises rich control start timing setting means for setting the timing to start rich control to desorb and clean the NOx stored in the lean NOx catalyst, based on the reference value A or B (see FIG. 19).

To put it another way, the timing to start rich control is determined according to the total amount of NOx stored in the catalyst as a reference value B and the amount (concentration) of NOx downstream from the catalyst as a reference value A.

In the eighteenth embodiment of the present invention, the aforementioned rich control start timing setting means sets the timing in such a way that rich control starts when the reference value B calculated by the lean NOx catalyst model has exceeded a predetermined value B (see FIG. 20).

To put it another way, rich control starts when the total amount of NOx stored in the catalyst as the reference value B has exceeded a predetermined value Sb.

In the nineteenth embodiment of the present invention, the aforementioned rich control start timing setting means sets the timing in such a way that rich control starts when the reference value A calculated by the lean NOx catalyst model has exceeded a predetermined value Sa (see FIG. 21).

To put it another way, rich control starts when the total amount of discharged NOx downstream from the catalyst as the reference value A has exceeded a predetermined value Sa.

The twentieth embodiment of the present invention comprises calculation means for calculating the rich volume during the rich control for desorbing and cleaning the NOx stored in the lean NOx catalyst, according to the reference value B (see FIG. 22).

To put it another way, the rich volume (increase in the amount of fuel with respect to theoretical air-fuel ratio) in the rich control mode is determined according to the total amount of NOx stored in the catalyst as the reference value B. This is based on the assumption that the mount of stored NOx and the rich volume (amount of fuel) required for reduction of the stored NOx are correlated with each other.

The twenty-first embodiment of the present invention comprises fuel supply volume calculation means for determining that the value obtained by multiplying a predetermined value C by the reference value B calculated by the lean NOx catalyst model is the fuel supply volume in the rich control mode (see FIG. 23).

In other words, this is based on the assumption that the amount of stored NOx and the rich volume (amount of fuel) required for reduction of the stored NOx is proportional to each other.

The twenty-second embodiment of the present invention comprises:

means for changing the parameter of the lean NOx catalyst model in response to the NOx storage capacity of the lean NOx catalyst; and means for changing the parameter of the engine NOx emission volume model in response to the amount of NOx discharged from the combustion chamber (see FIG. 24).

Parameters of the engine NOx emission volume model and lean NOx catalyst model are on-line tuned, using the results of evaluation of:

decrease in the amount of NOx discharged from the combustion chamber;

increase in the amount of NOx discharged from the combustion chamber; and deterioration of the storage capacity of the lean NOx catalyst, obtained from the results of diagnosis in two stages—diagnosis in the lean operation mode and diagnosis in the rich operation mode, as described above;

whereby the reference values A and B are made to conform to the current amount of NOx discharged from the combustion chamber and the performance of the lean NOx catalyst.

The twenty-third embodiment of the present invention comprises means for changing the NOx emission volume basic value calculated according to the torque and speed of the engine in the engine NOx emission volume model, and the NOx emission volume correction value calculated based on the EGR rate and air-fuel ratio.

When there is an increase or decrease in the amount of the amount of NOx discharged from the combustion chamber, the parameter of the engine NOx emission volume model is on-line tuned, from the results of diagnosis in two stages—diagnosis in the lean operation mode and diagnosis in the rich operation mode, as described above. The position to be tuned is determined according to the torque and speed of the engine, RGR rate and air-fuel ratio in this case.

The twenty-fourth embodiment of the present invention comprises means for changing the NOx cleaning rate or storage rate calculated on the basis of the reference value B in the lean NOx catalyst, in response to the NOx storage capacity of the lean NOx catalyst (see FIG. 26).

If deterioration in the performance of the lean NOx catalyst is found out from the results of diagnosis in two stages—diagnosis in the lean operation mode and diagnosis in the rich operation mode, as described above, the parameter of the lean NOx catalyst model is on-line tuned. The position to be tuned is the NOx cleaning (storing) rate calculation means. The relationship between the total amount of stored NOx and the NOx cleaning (storage) rate is changed in response to deterioration of the performance. To put it more specifically, the value of the NOx cleaning (storage) rate conforming to the total amount of stored NOx is reduced to show the deteriorating storage performance.

The twenty-fifth embodiment of the present invention comprises sensor for detecting the amount or concentration of oxygen downstream from the lean NOx catalyst; and means for calculating at least one of the oxygen storage capacity of the lean NOx catalyst, NOx storage capacity of the lean NOx catalyst and the amount of NOx discharged from the combustion chamber in the lean operation mode, based on the output from the sensor.

In other words, the lean NOx catalyst has an oxygen storage capacity, in addition to the NOx storage capacity, in some cases. According to the aforementioned sixth embodiment, the time period when the output of the oxygen sensor downstream from lean NOx catalyst indicates the rich air-fuel ratio includes the time when the oxygen stored in the catalyst oxidizes the reducing agent ($H_2$, CO, HC) flowing in from the catalyst inlet, in addition to the time when the NOx stored in the catalyst oxidizes the reducing agent ($H_2$, CO, HC) flowing in from the catalyst inlet. Therefore, this time period is correlated to both the amount of stored NOx and amount of stored oxygen, and only the amount of stored NOx cannot be detected. Thus, means for calculating the amount of oxygen stored in the lean NOx catalyst is added so as to provide the function of calculating the amounts of stored NOx and oxygen, independently of each other.

In the twenty-sixth embodiment of the present invention, the means for calculating the amount of oxygen stored in the lean NOx catalyst calculates the amount of the stored oxygen, based on the time period from the time when air-fuel ratio of the gas mixture supplied for combustion is evaluated as being rich, until the air-fuel ratio is detected as being rich by the sensor; or based on the amount of fuel injected or the amount of intake air during this time period, in the rich operation mode used to desorb and clean the NOx stored in the lean NOx catalyst (see FIG. 28).

To put it another way, the time period from the time when air-fuel ratio of the gas mixture supplied for combustion is evaluated as being rich, until the output of the rich air-fuel ratio downstream from lean NOx catalyst indicates the rich air-fuel ratio, is equivalent to the time period when the NOx or oxygen stored in the catalyst oxidizes the reducing agent ($H_2$, CO, HC) flowing in from the catalyst inlet. In the similar manner, a fixed delay is present in the time period from the time when the rich air-fuel ratio changes into the lean air-fuel ratio until the output of the oxygen sensor downstream from lean NOx catalyst indicates the lean air-fuel ratio. This is because the oxygen flowing in from the catalyst inlet is stored in the oxygen, so an oxidation atmosphere is not created in the catalyst outlet. Thus, this time period depends only on the amount of stored oxygen, without depending on the amount of stored NOx. Accordingly, the amount of stored oxygen can be estimated based on the time period from the time when air-fuel ratio of the gas mixture supplied for combustion has become lean, until output of the oxygen sensor downstream from lean NOx catalyst indicates the lean air-fuel ratio. Further, to improve precision, the actual amount of stored NOx can also be estimated based on the amount of fuel injected (or intake air) during this time period.

The twenty-seventh embodiment of the present invention comprises means for calculating the timing of starting the rich control to desorb and clean the NOx stored in the lean NOx catalyst and the rich volume in the rich control mode, based on at least one of the oxygen storage capacity of the lean NOx catalyst, NOx storage capacity of the lean. NOx catalyst and the amount of NOx discharged from the combustion chamber in the lean operation mode (see FIG. 29).

To put it another way, especially the amount of fuel supplied at the time of rich control includes the amount of fuel required to consume the stored oxygen in addition to the amount of fuel required for reducing the stored NOx.

The control apparatus of the present invention is not only applicable to a spark ignition engine mounted on a vehicle but also to a compressed self-ignition engine mounted on a vehicle.

To put it another way, the amount of NOx discharged is much inferior in a compressed self-ignition engine to a spark ignition engine. However, when the compressed self-ignition fails, there is an increase in the amount of NOx discharged from the engine (combustion chamber). This indicates that the control apparatus of the present invention is effectively applicable to the compressed self-ignition engine as well.

In the control apparatus of the present invention, when an unexpected fluctuation has occurred in the amount of NOx discharged from the combustion chamber due to insufficient combustibility of the engine, EGR error, deterioration or trouble, and an abnormal increase has occurred in the amount of NOx discharged downstream from lean NOx catalyst, then deterioration of lean NOx catalyst is considered to have taken place due to diagnostic error, according to the prior art. By contrast, the present invention eliminates the possibility of such diagnostic error because the performance of the lean NOx catalyst is diagnosed, with consideration given to the fluctuation in the amount of NOx discharged from the combustion chamber.

When there is a fluctuation in the amount of NOx downstream from catalyst, the present arrangement allows detection and diagnosis to be carried out separately, depending on whether the fluctuation is due to the increase or decrease in the amount of NOx discharged from the combustion chamber on the engine side or due to the deterioration in the performance of the lean NOx catalyst (reduction in storage capacity). This method eliminates the possibility of diagnostic error due to deterioration in the performance of the lean NOx catalyst, and ensures effective improvement in the performance of the emission gas of the engine and fuel economy.

BRIEF DESCRIPTION OF THE DRAWINGS

FIG. 14 is a drawing showing the thirteenth embodiment of a control apparatus according to the present invention;

13

Figure 1:
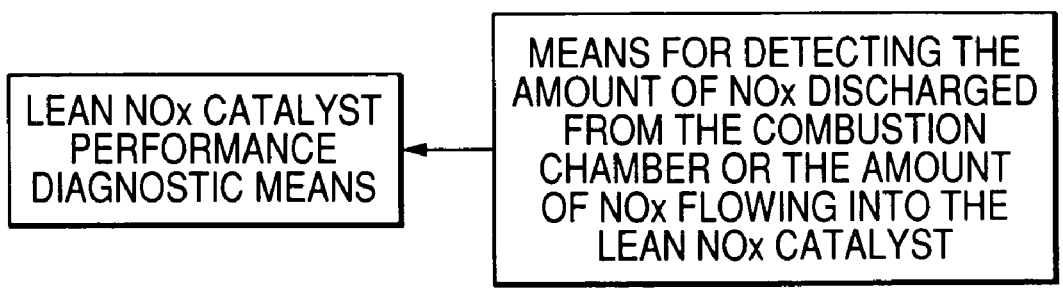
FIG. 1 is a drawing showing the first embodiment of a control apparatus according to the present invention.
Figure 2:
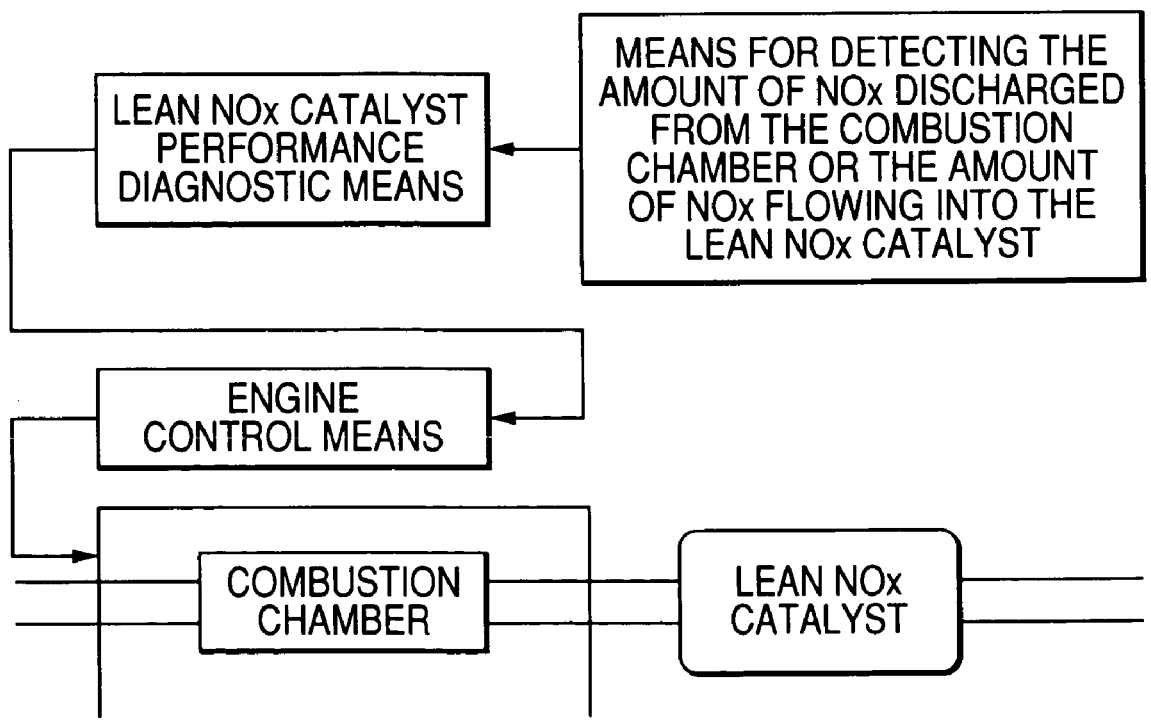
FIG. 2 is a drawing showing the second embodiment of a control apparatus according to the present invention.
Figure 3:
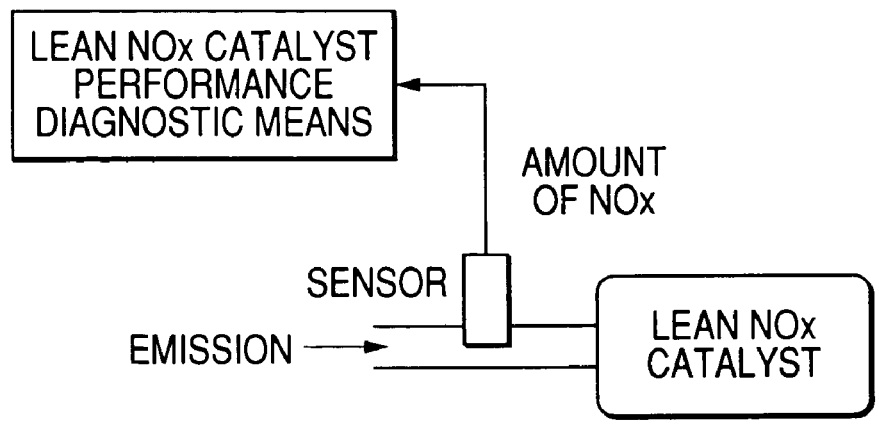
FIG. 3 is a drawing showing the third embodiment of a control apparatus according to the present invention.
Figure 4:
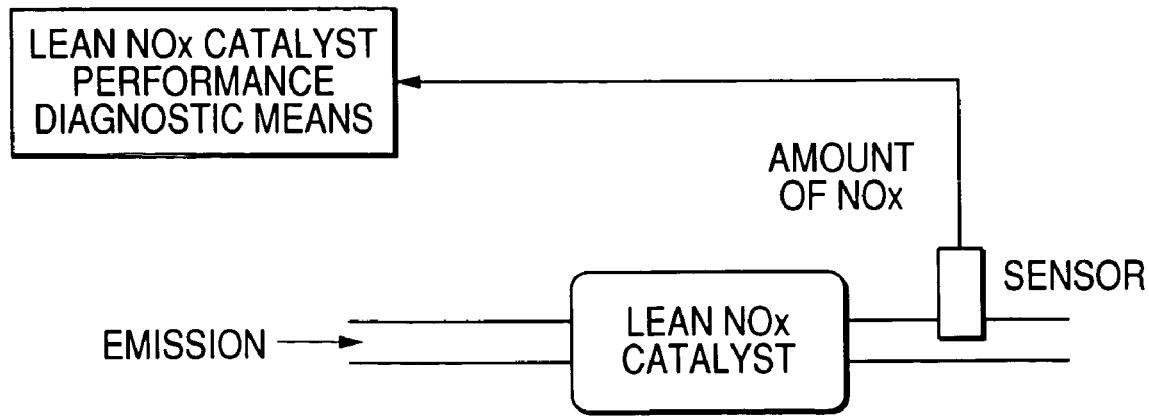
FIG. 4 is a drawing showing the fourth embodiment of a control apparatus according to the present invention.
Figure 5:
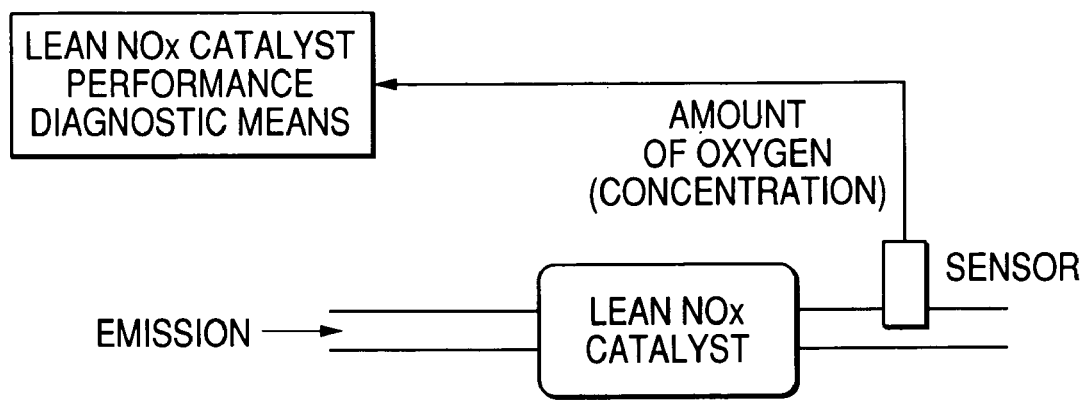
FIG. 5 is a drawing showing the fifth embodiment of a control apparatus according to the present invention.
Figure 6:
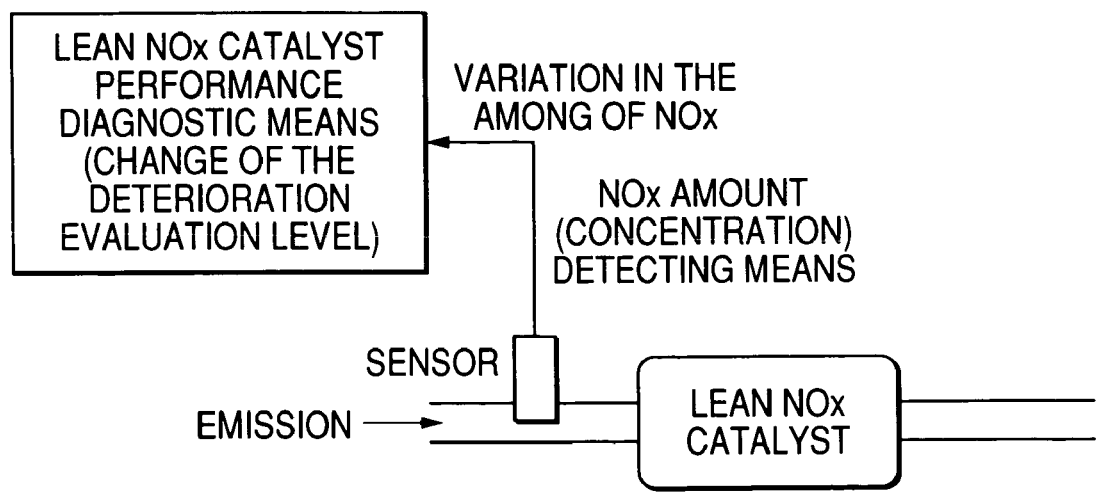
FIG. 6 is a drawing showing the sixth embodiment of a control apparatus according to the present invention.
Figure 7:
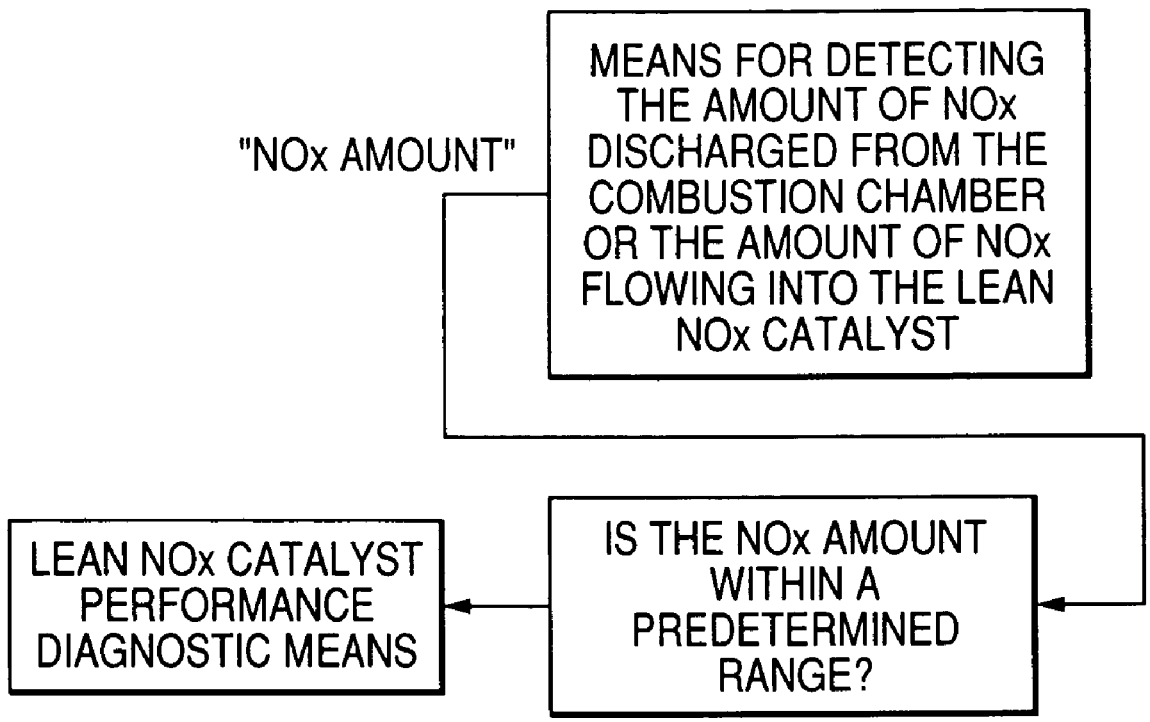
FIG. 7 is a drawing showing the seventh embodiment of a control apparatus according to the present invention.
Figure 8:
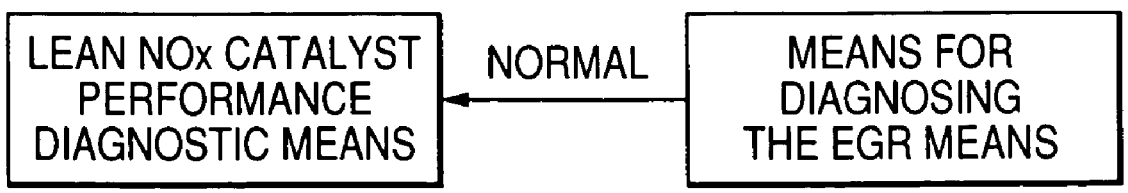
FIG. 8 is a drawing showing the eighth embodiment of a control apparatus according to the present invention.
Figure 9:
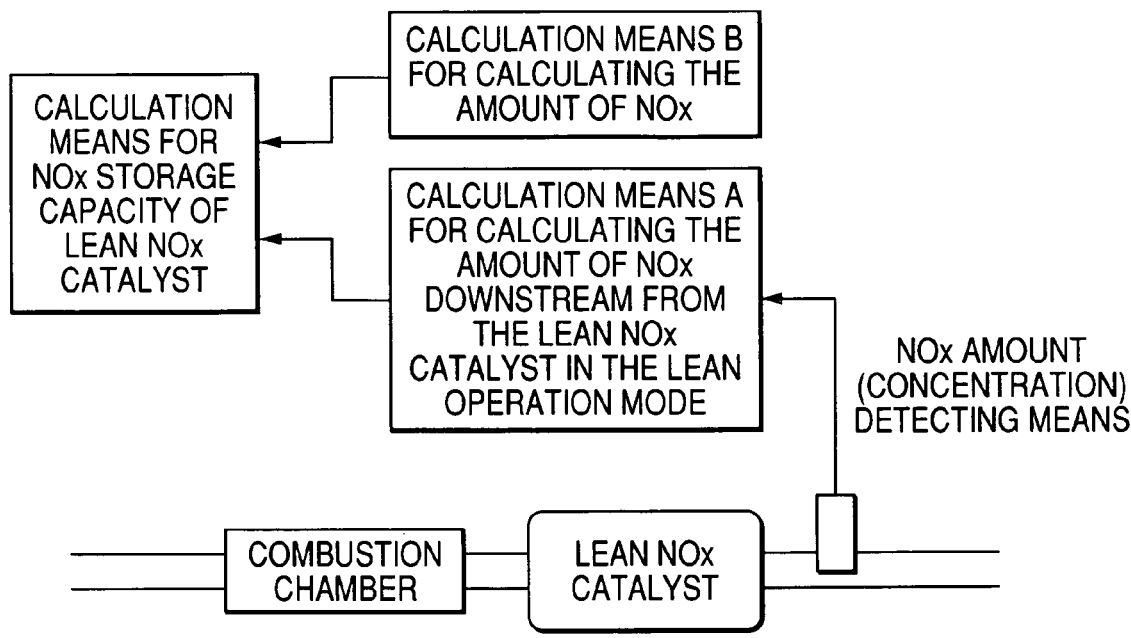
FIG. 9 is a drawing showing the ninth embodiment of a control apparatus according to the present invention.
Figure 10:
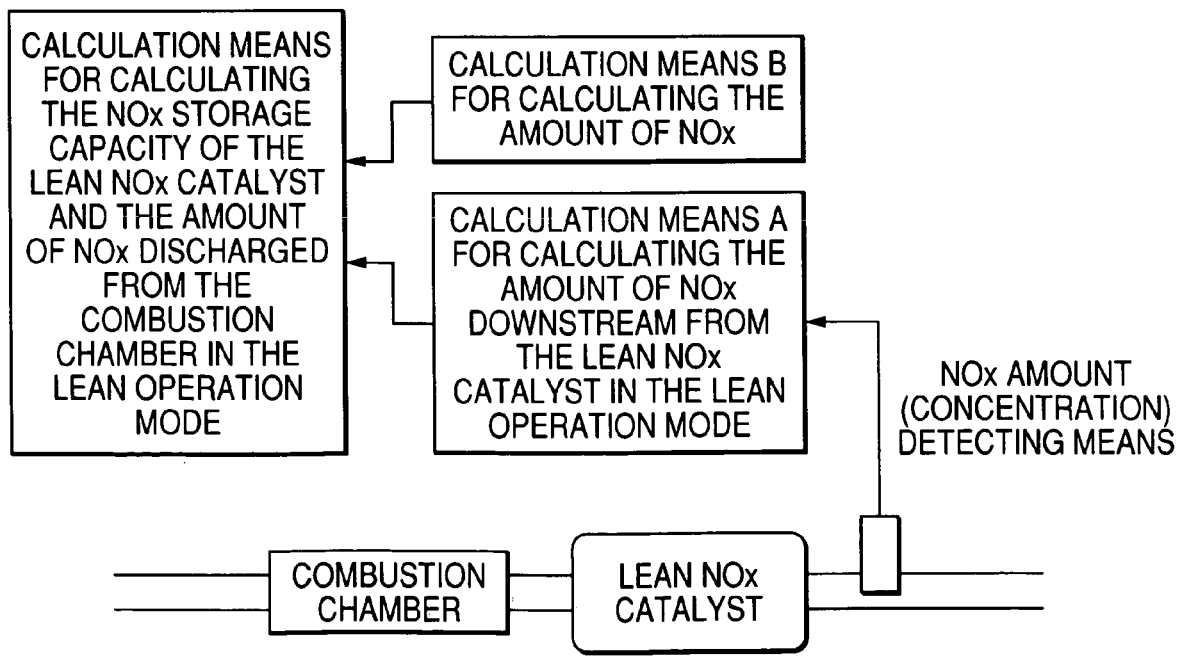
FIG. 10 is a drawing showing the tenth embodiment of a control apparatus according to the present invention.
Figure 11:
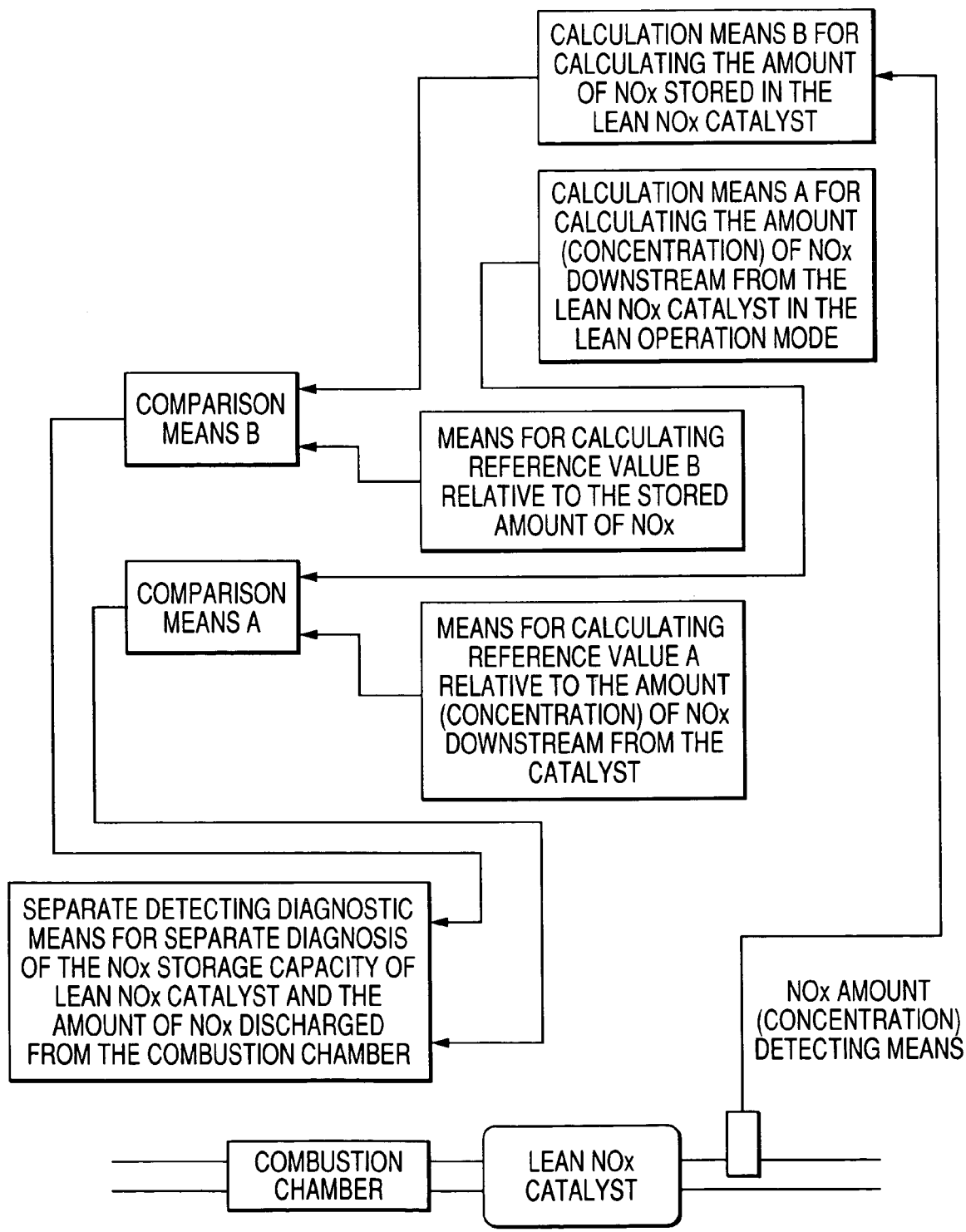
FIG. 11 is a drawing showing the eleventh embodiment of a control apparatus according to the present invention.
Figure 12:
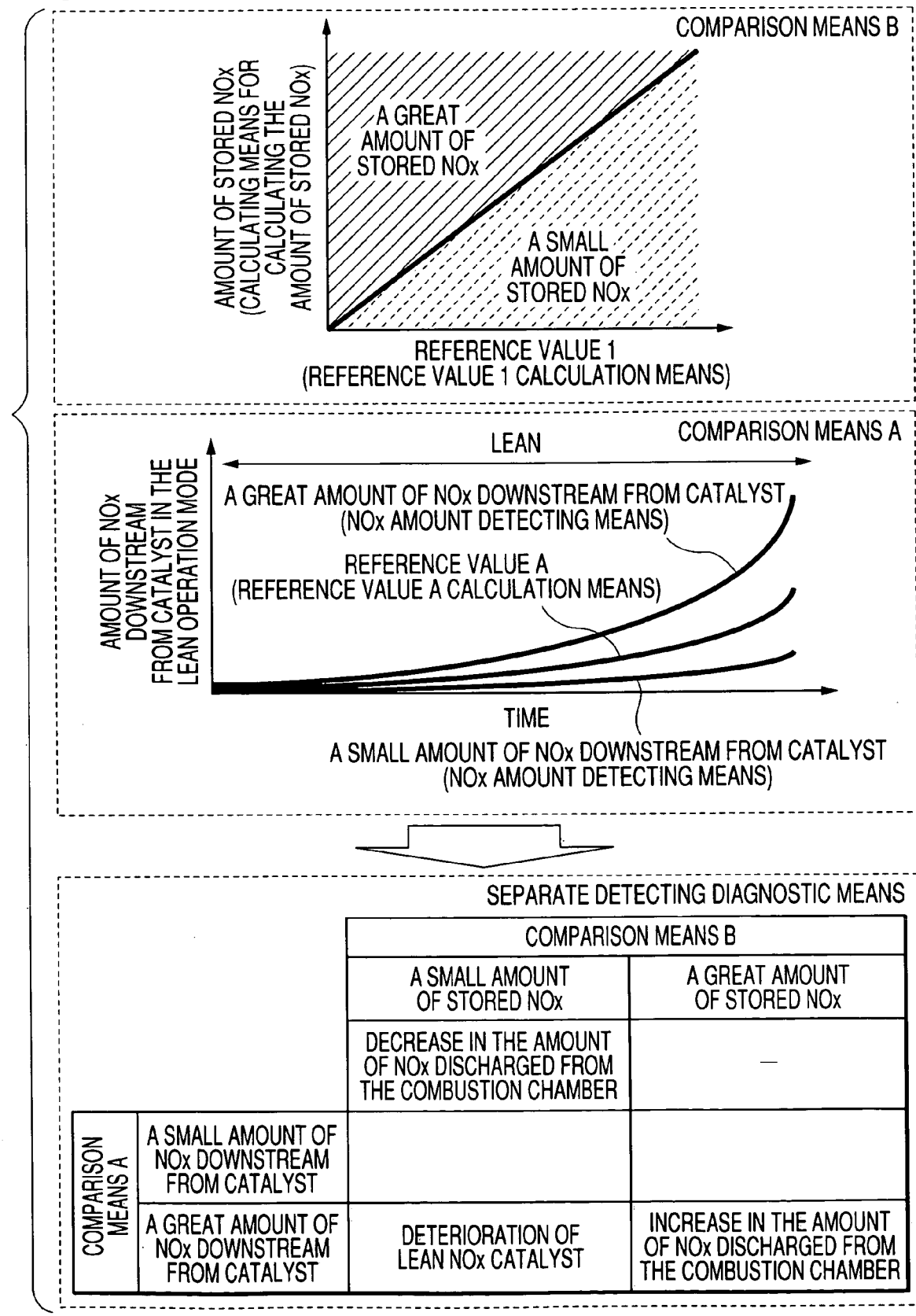
FIG. 12 is a drawing showing the eleventh embodiment of a control apparatus according to the present invention.
Figure 13:
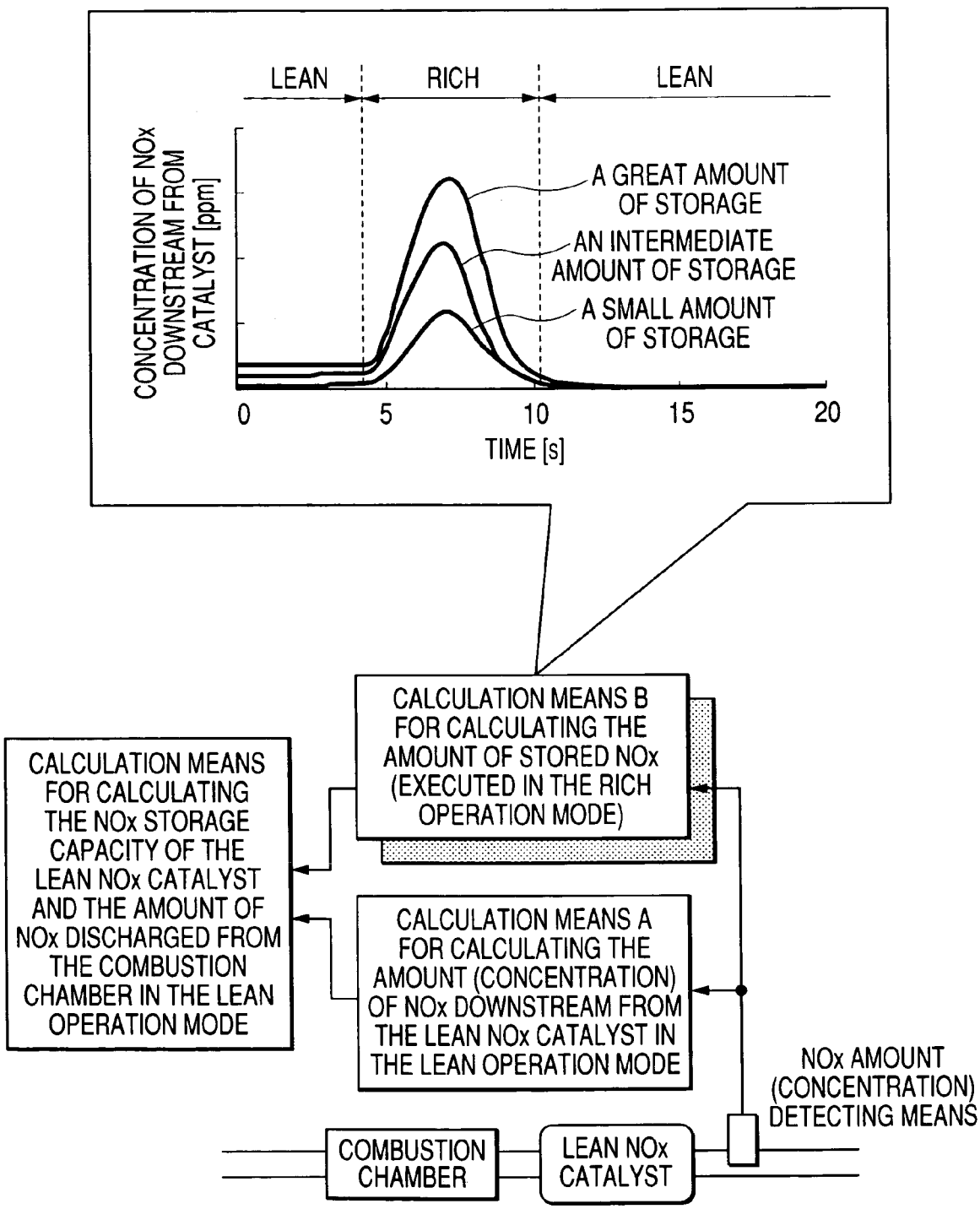
FIG. 13 is a drawing showing the twelfth embodiment of a control apparatus according to the present invention.
Figure 15:
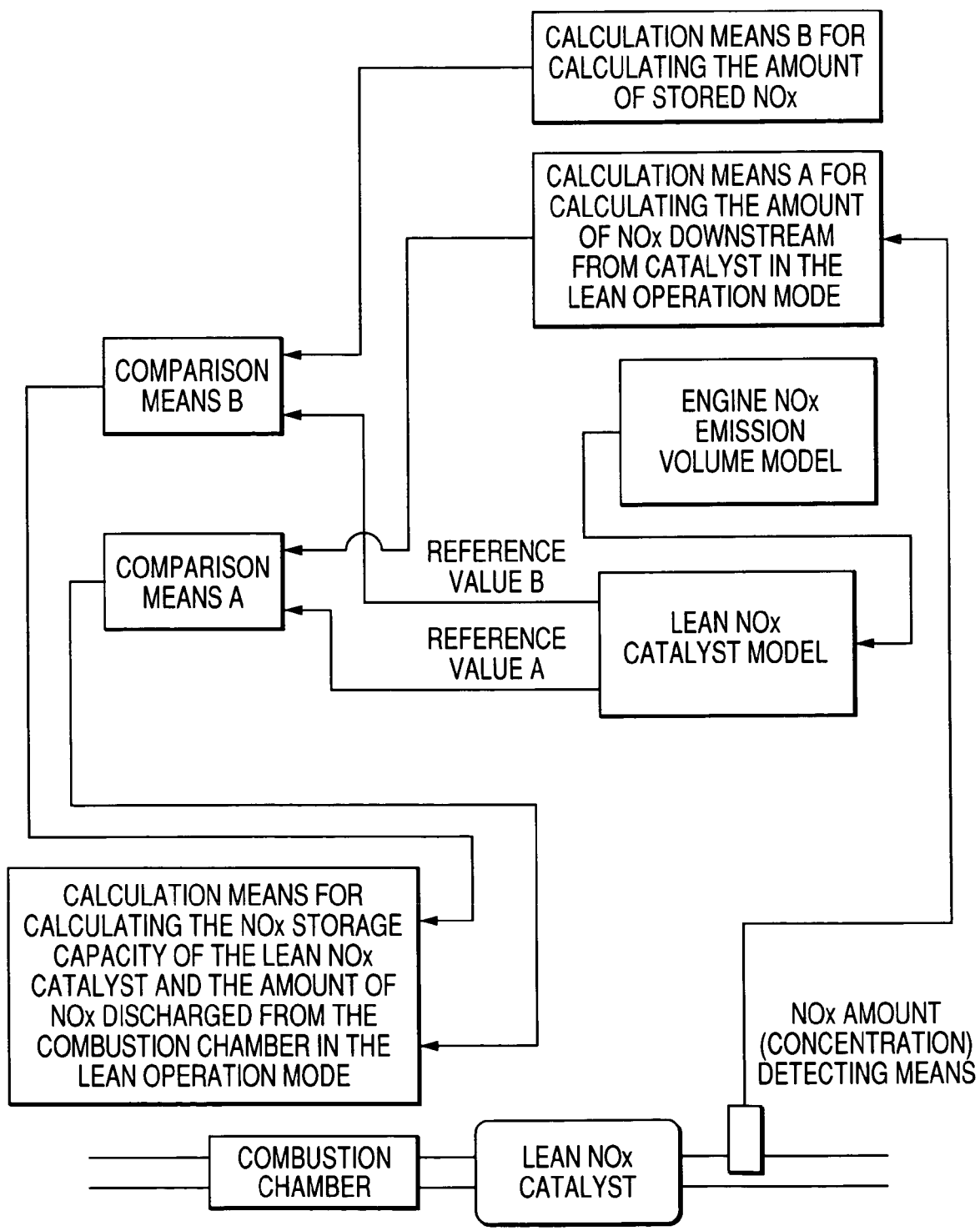
FIG. 15 is a drawing showing the fourteenth embodiment of a control apparatus according to the present invention.
Figure 16:
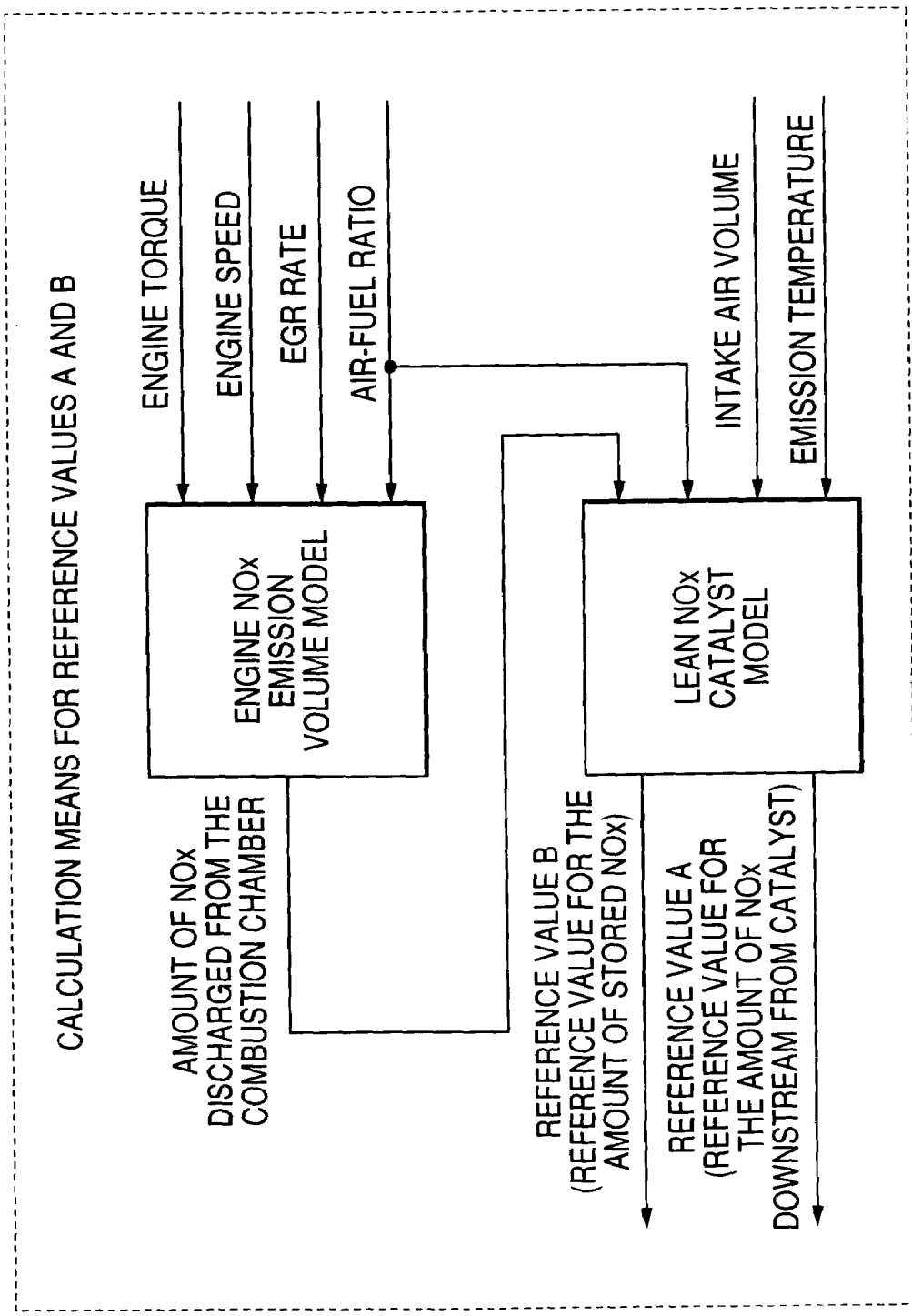
FIG. 16 is a drawing showing the fourteenth embodiment of a control apparatus according to the present invention.
Figure 17:
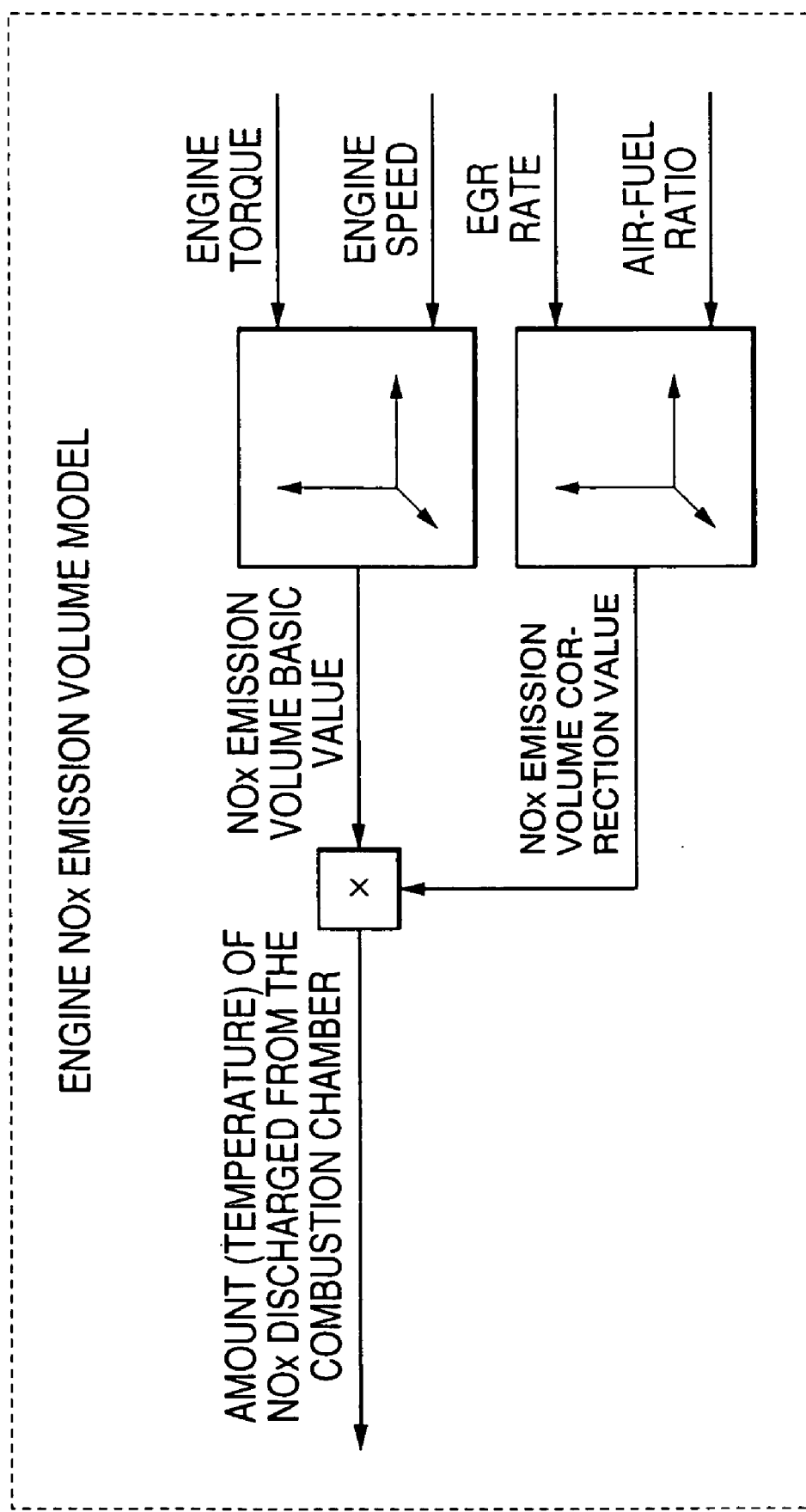
FIG. 17 is a drawing showing the fifteenth embodiment of a control apparatus according to the present invention.
Figure 18:
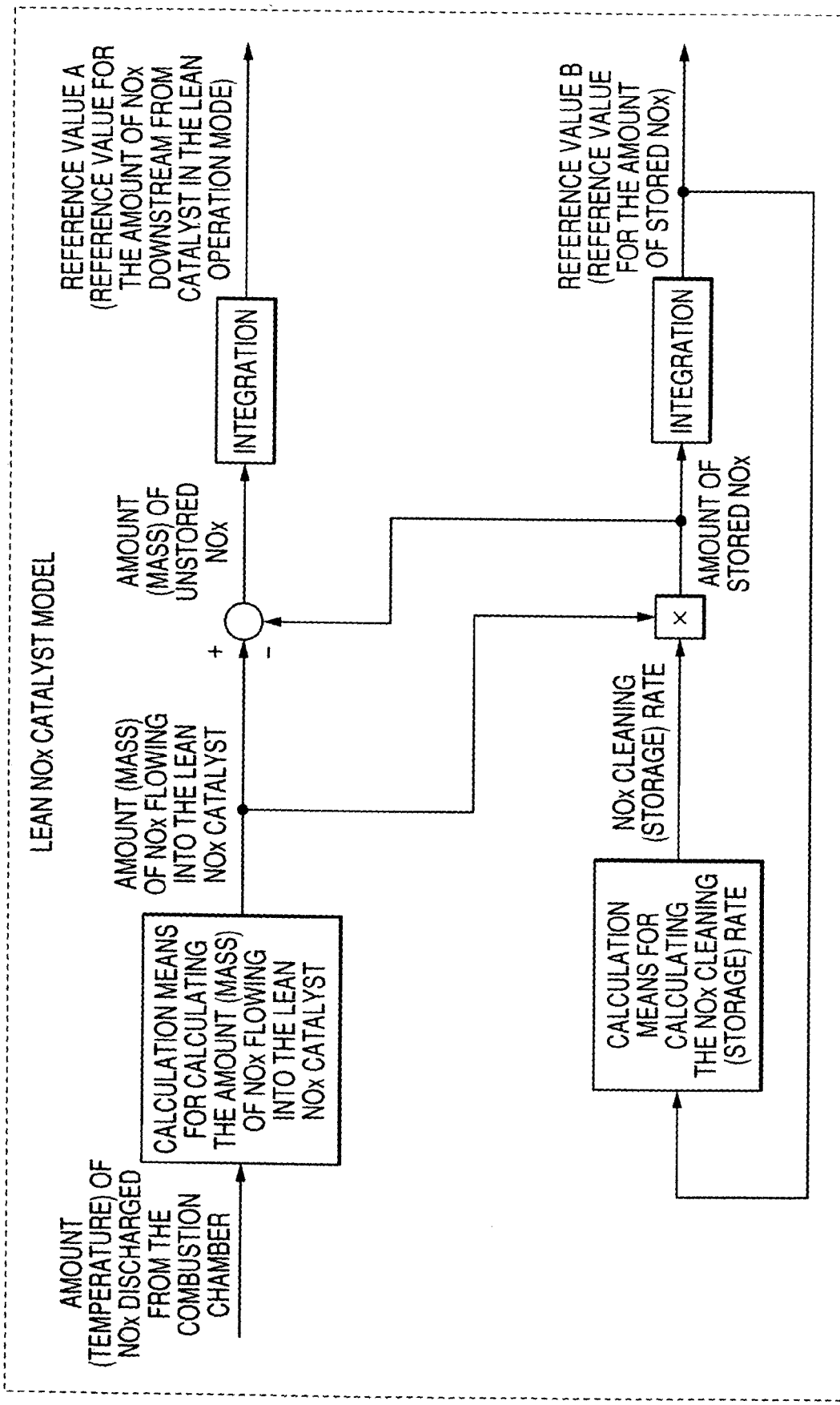
FIG. 18 is a drawing showing the sixteenth embodiment of a control apparatus according to the present invention.
Figure 19:
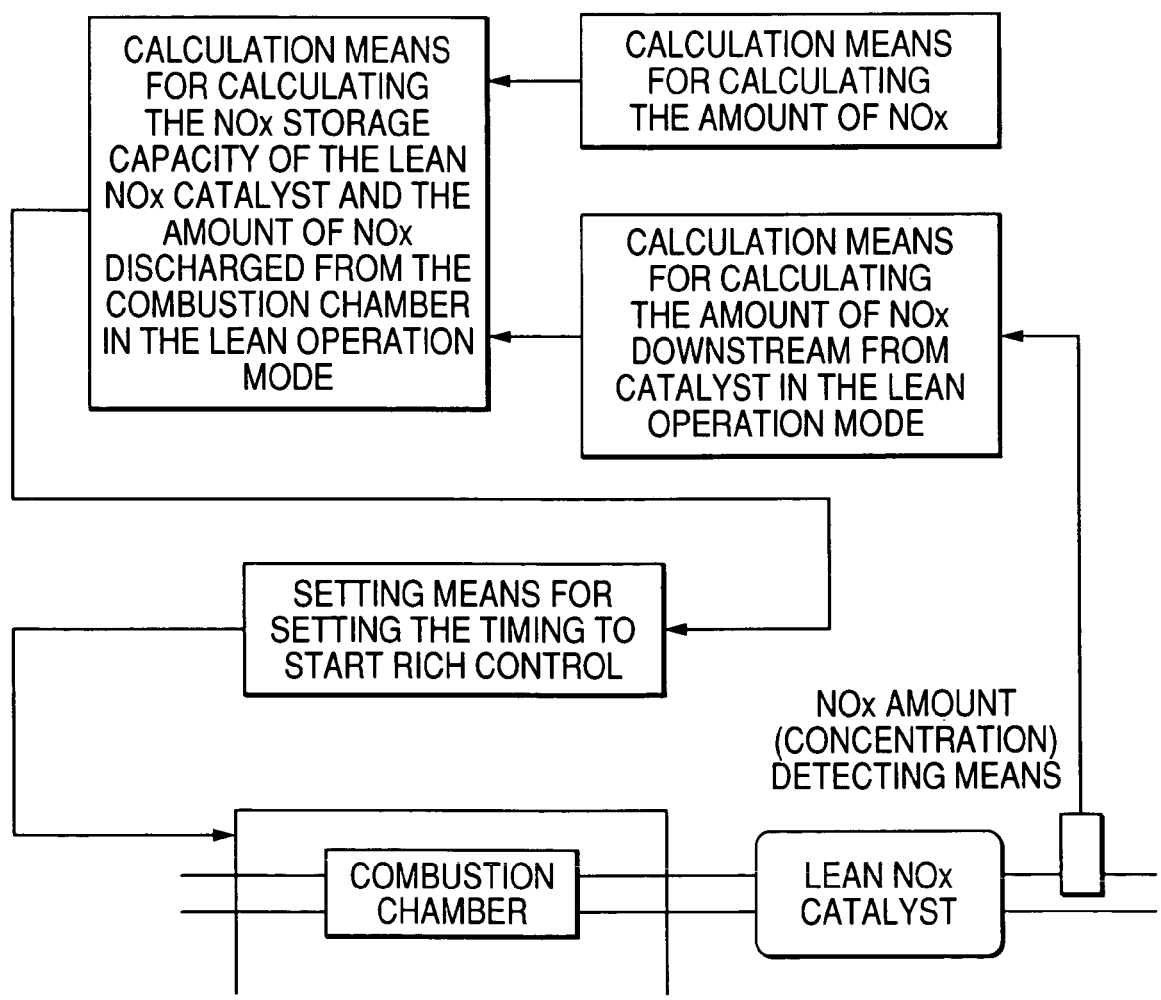
FIG. 19 is a drawing showing the seventeenth embodiment of a control apparatus according to the present invention.
Figure 20:
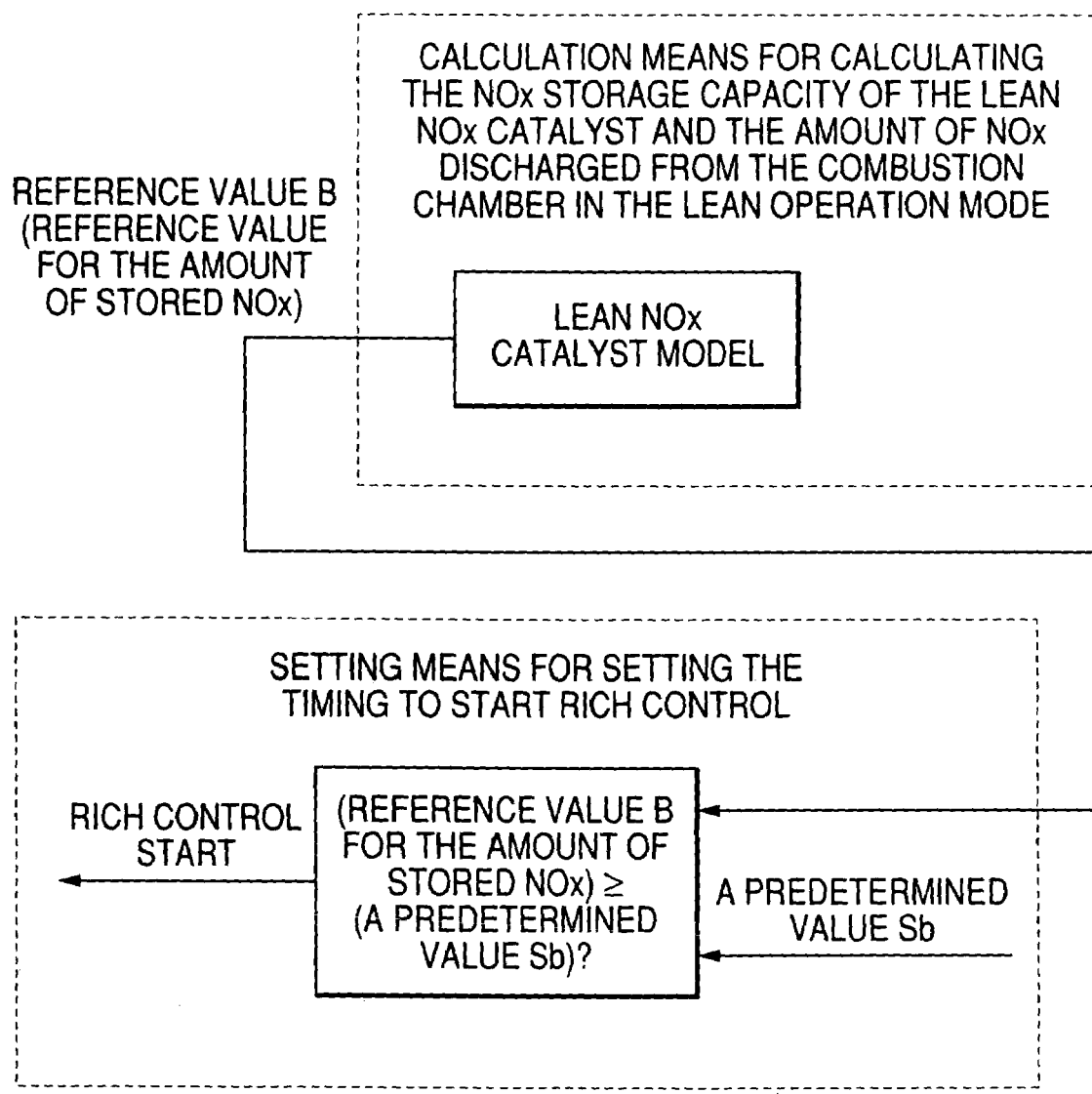
FIG. 20 is a drawing showing the eighteenth embodiment of a control apparatus according to the present invention.
Figure 21:
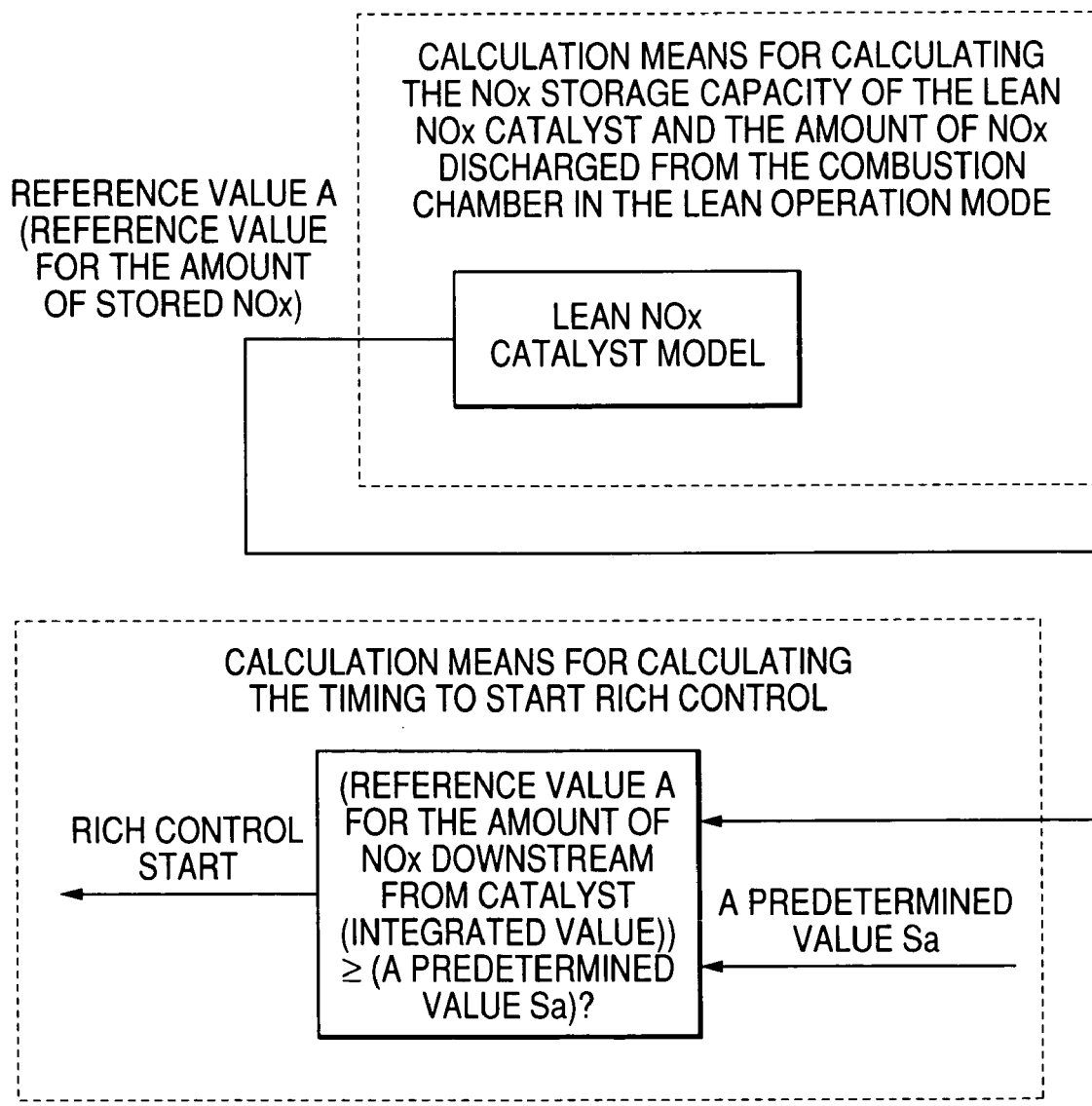
FIG. 21 is a drawing showing the nineteenth embodiment of a control apparatus according to the present invention.
Figure 22:
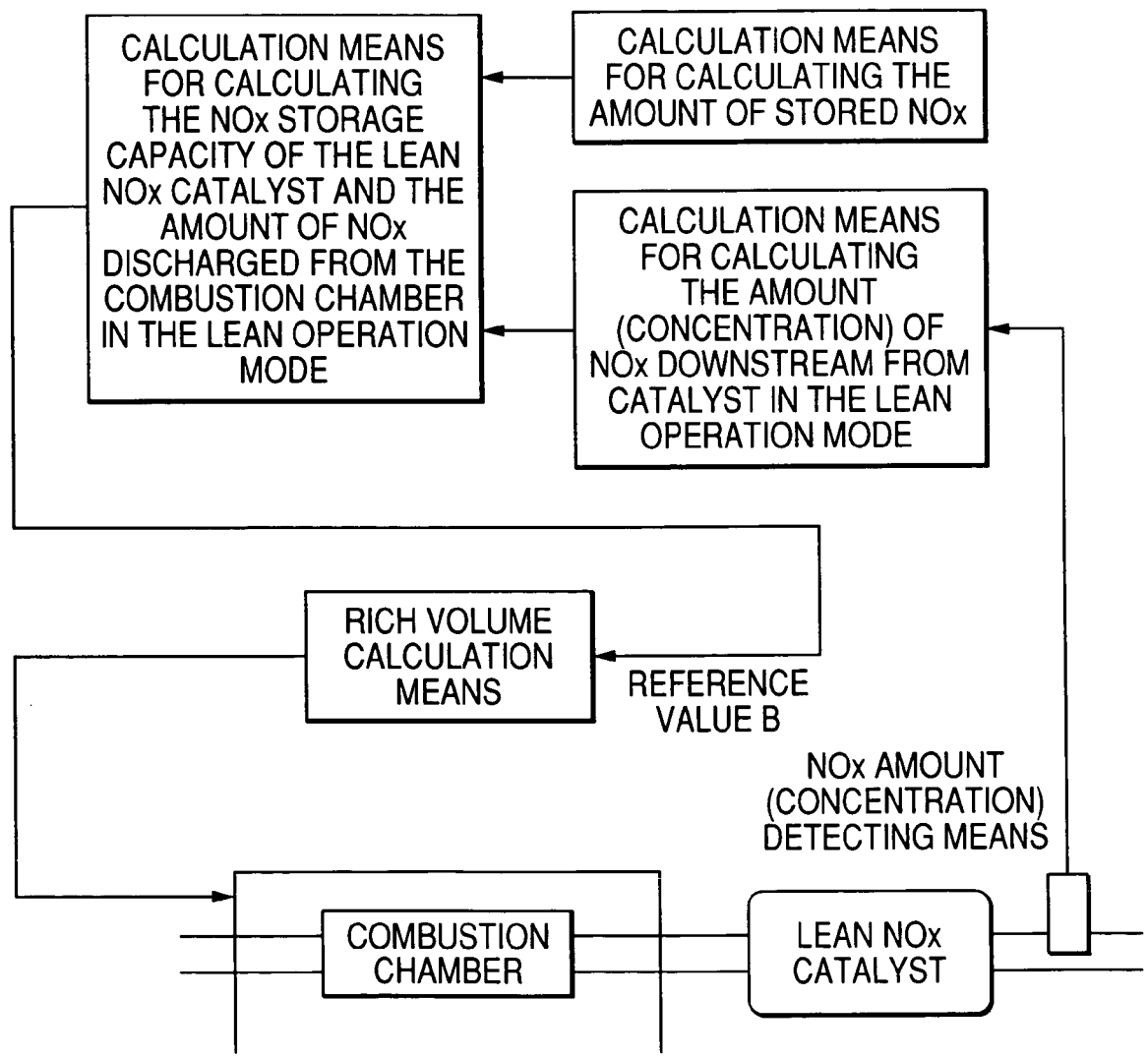
FIG. 22 is a drawing showing the twentieth embodiment of a control apparatus according to the present invention.
Figure 23:
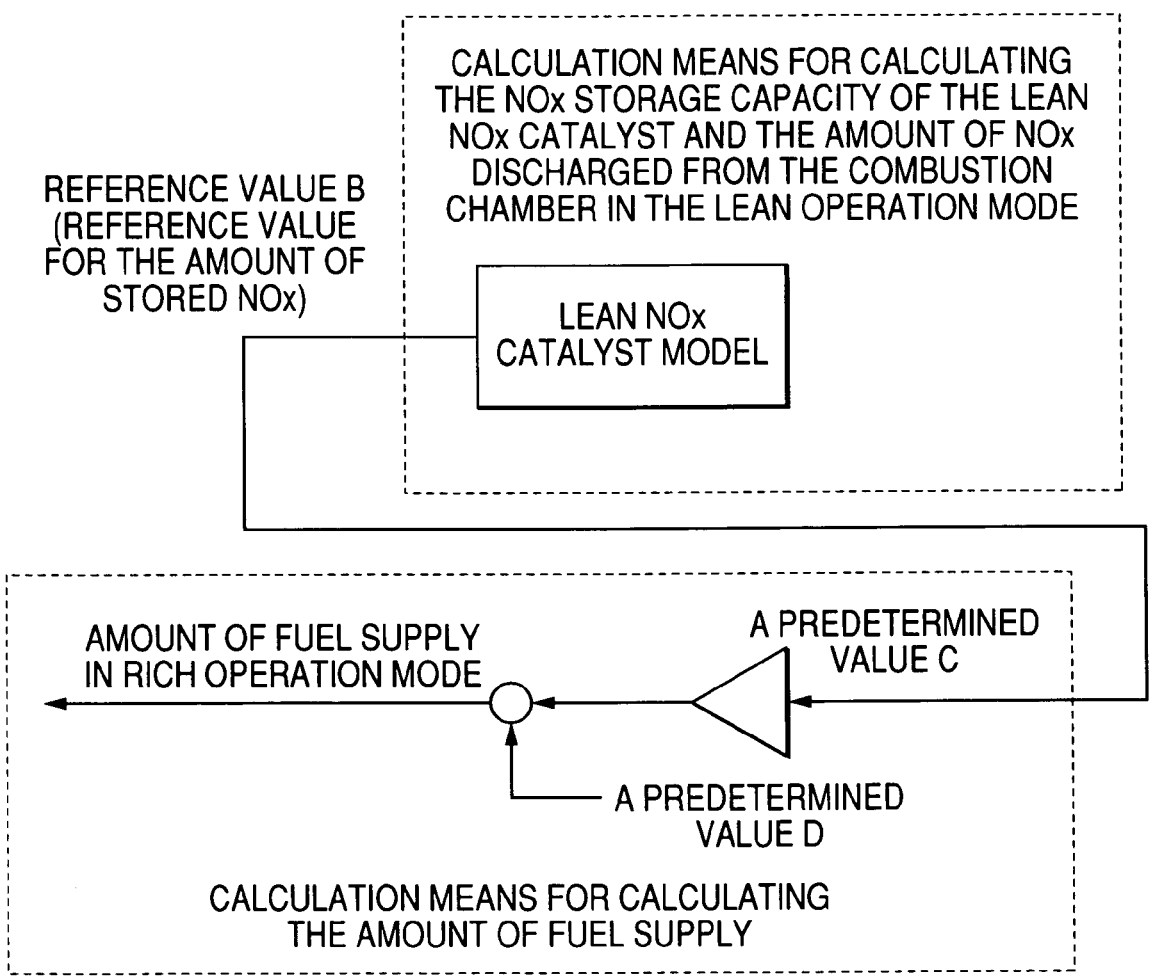
FIG. 23 is a drawing showing the twenty-first embodiment of a control apparatus according to the present invention.
Figure 24:
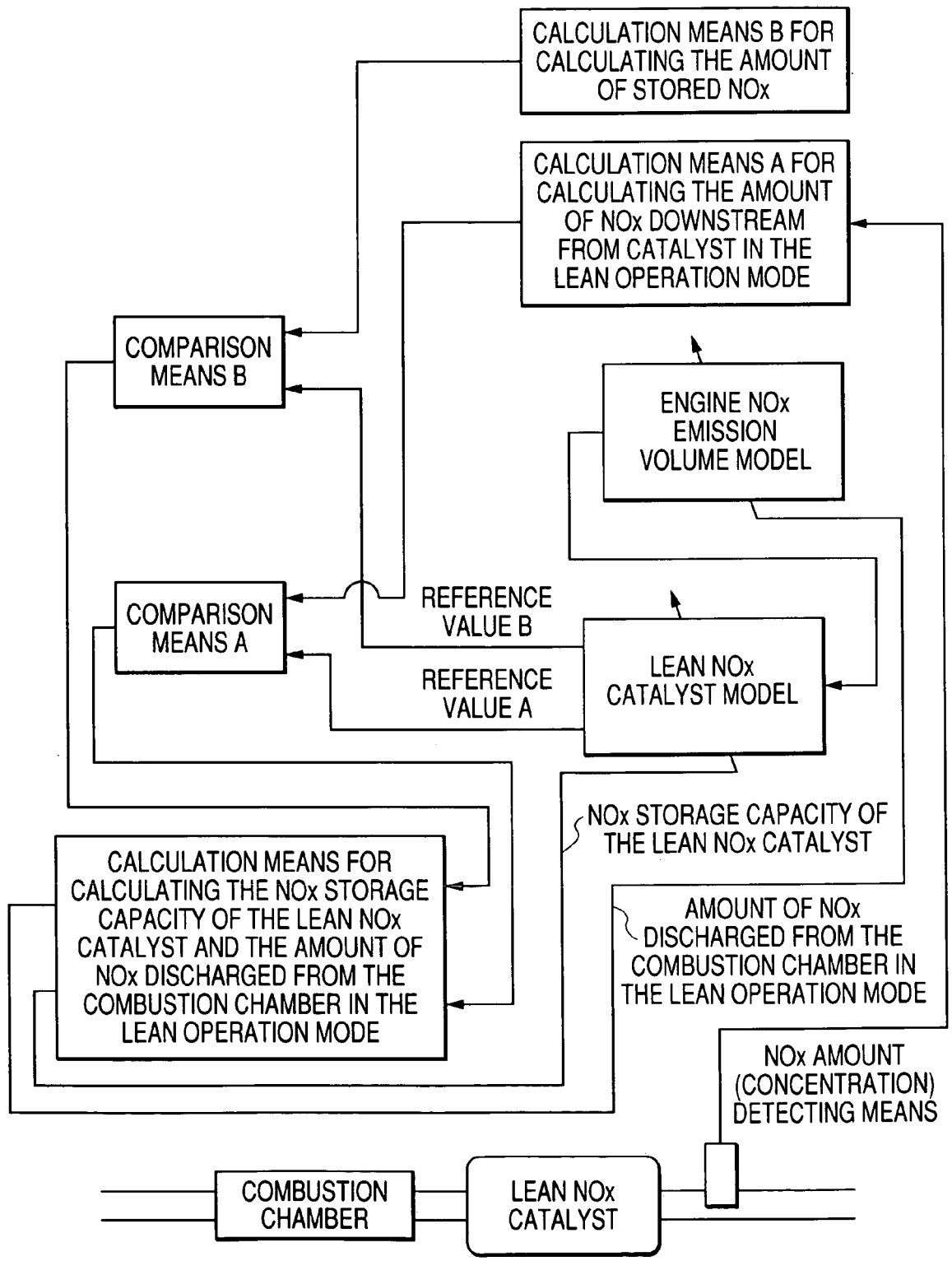
FIG. 24 is a drawing showing the twenty-second embodiment of a control apparatus according to the present invention.
Figure 25:
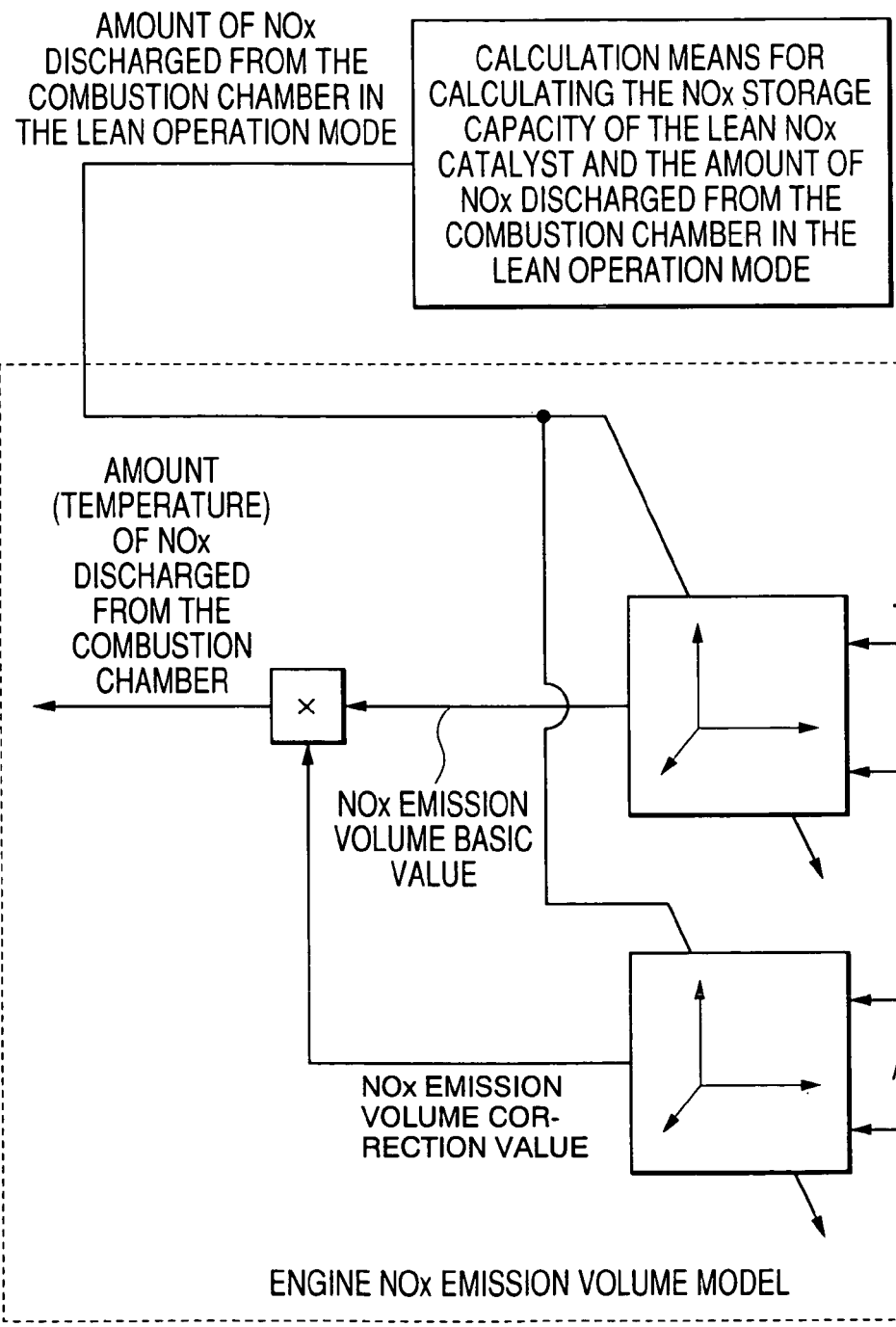
FIG. 25 is a drawing showing the twenty-third embodiment of a control apparatus according to the present invention.
Figure 26:
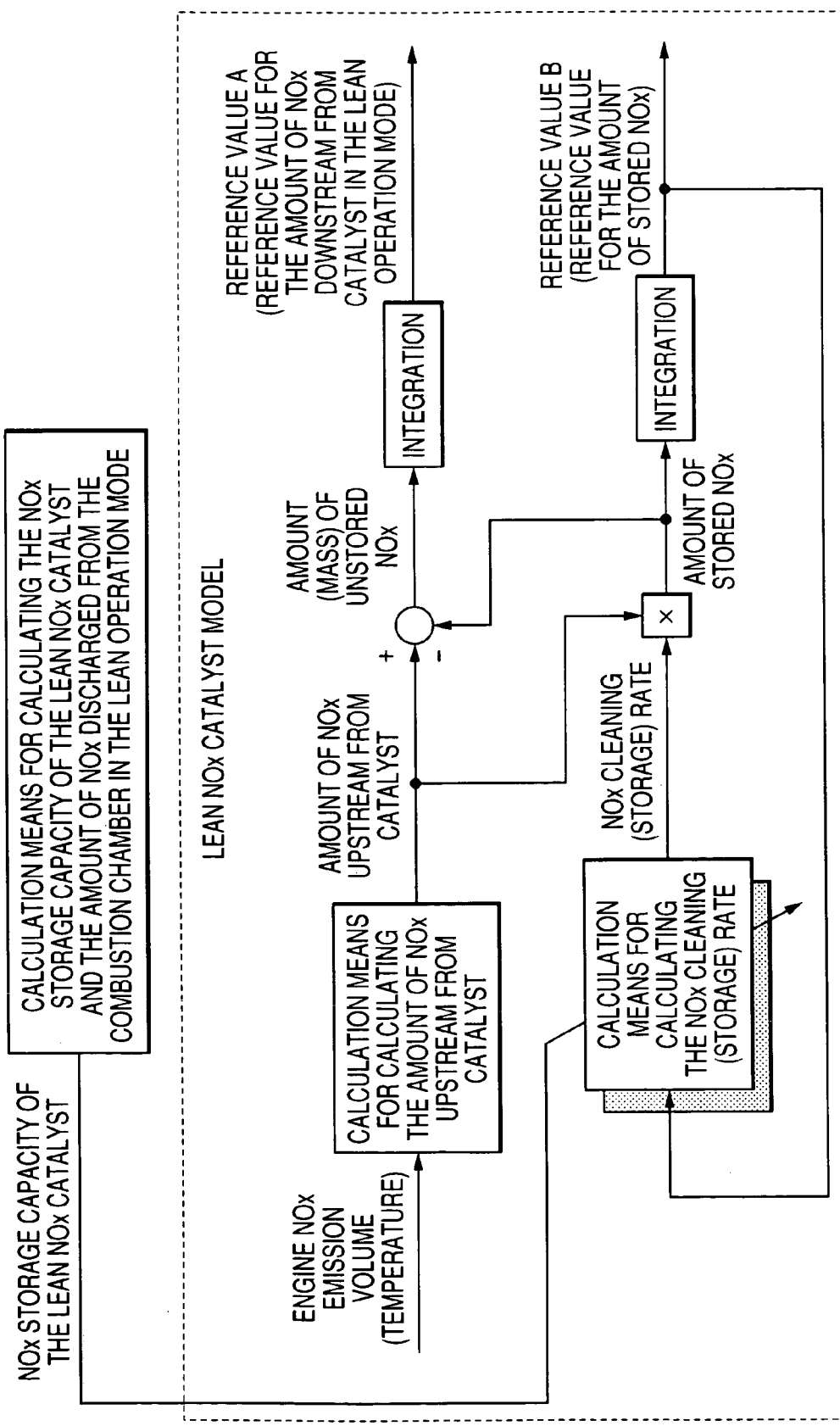
FIG. 26 is a drawing showing the twenty-fourth embodiment of a control apparatus according to the present invention.
Figure 27:
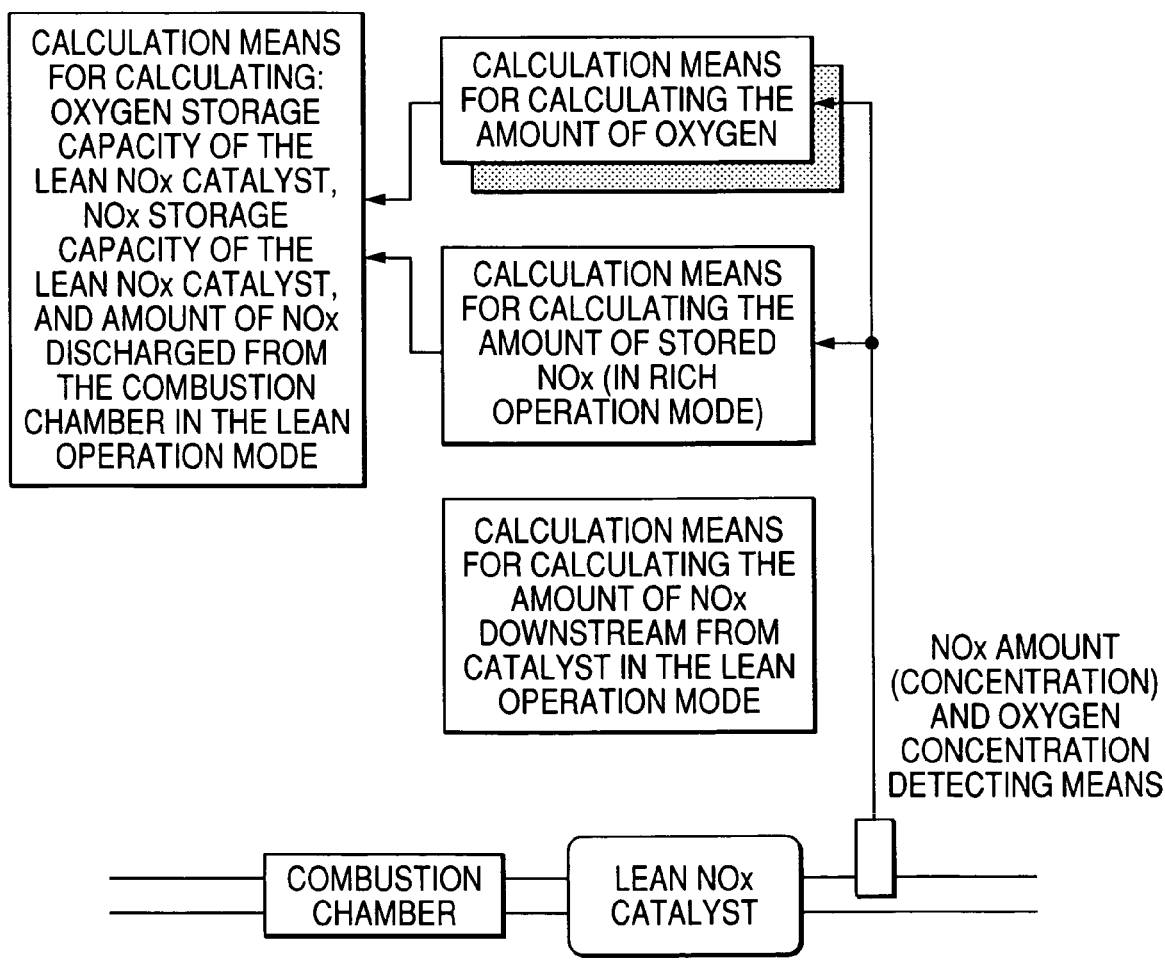
FIG. 27 is a drawing showing the twenty-fifth embodiment of a control apparatus according to the present invention.
Figure 28:
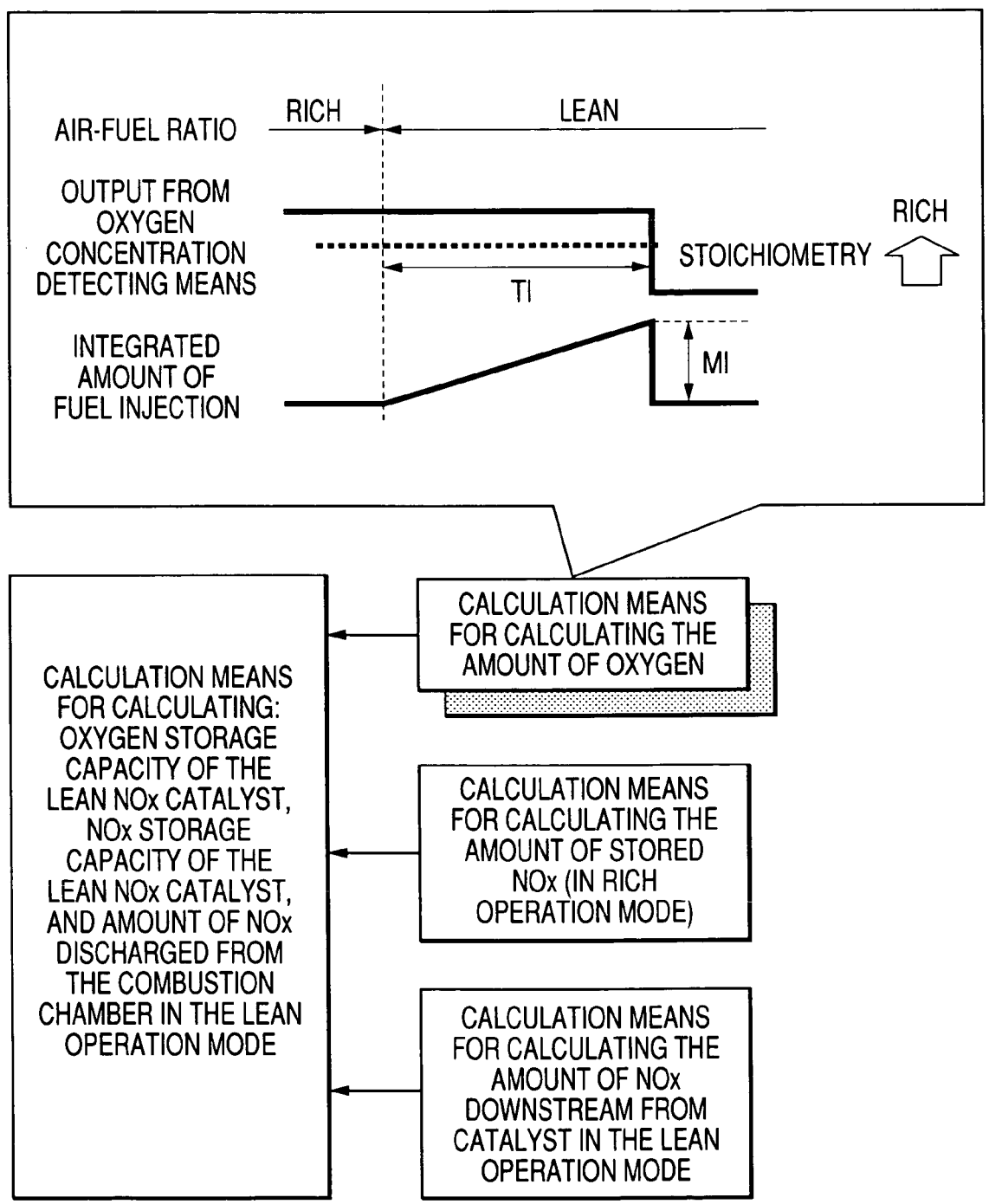
FIG. 28 is a drawing showing the twenty-sixth embodiment of a control apparatus according to the present invention.
Figure 29:
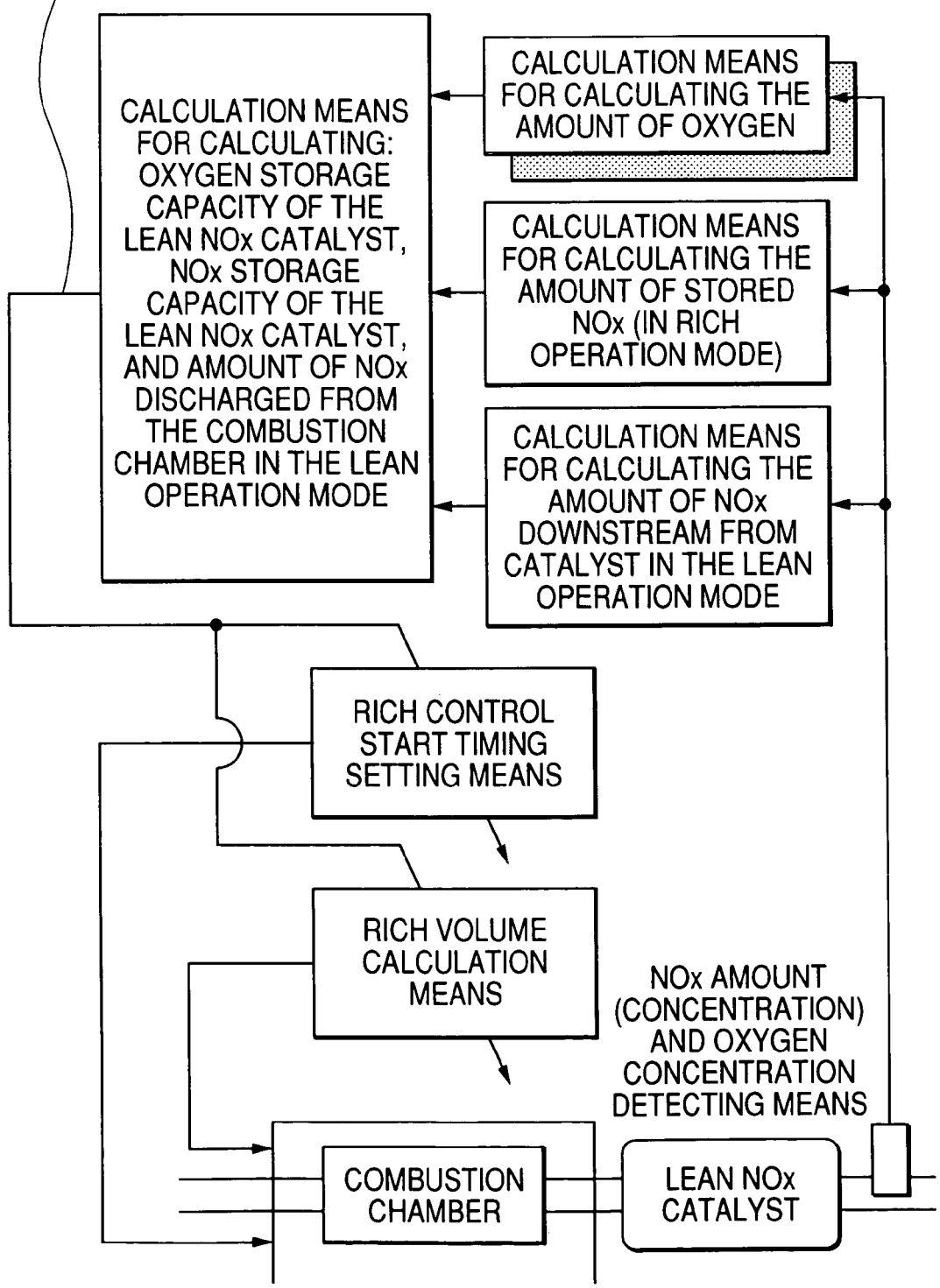
Figure 30:
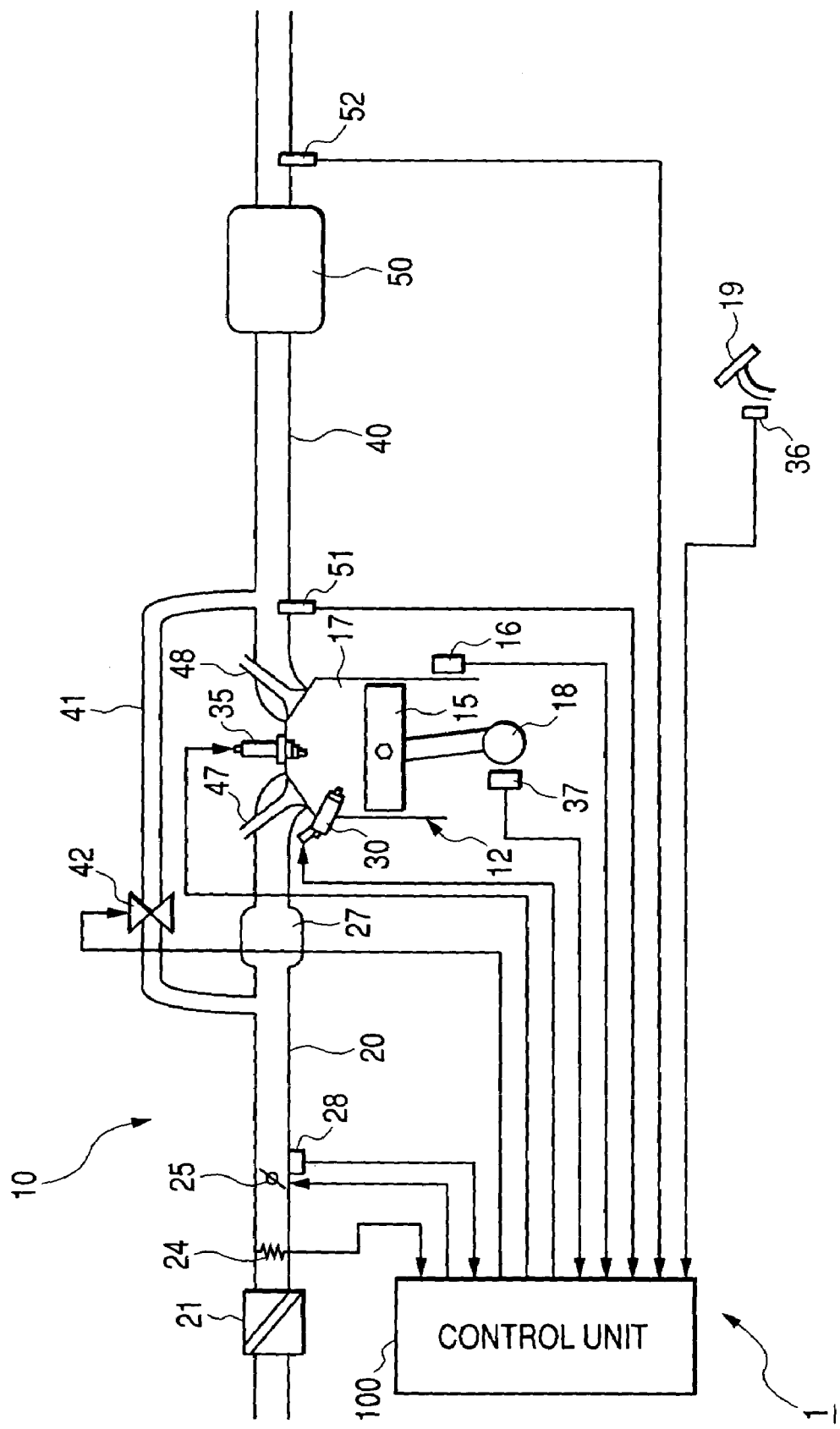
Figure 31:
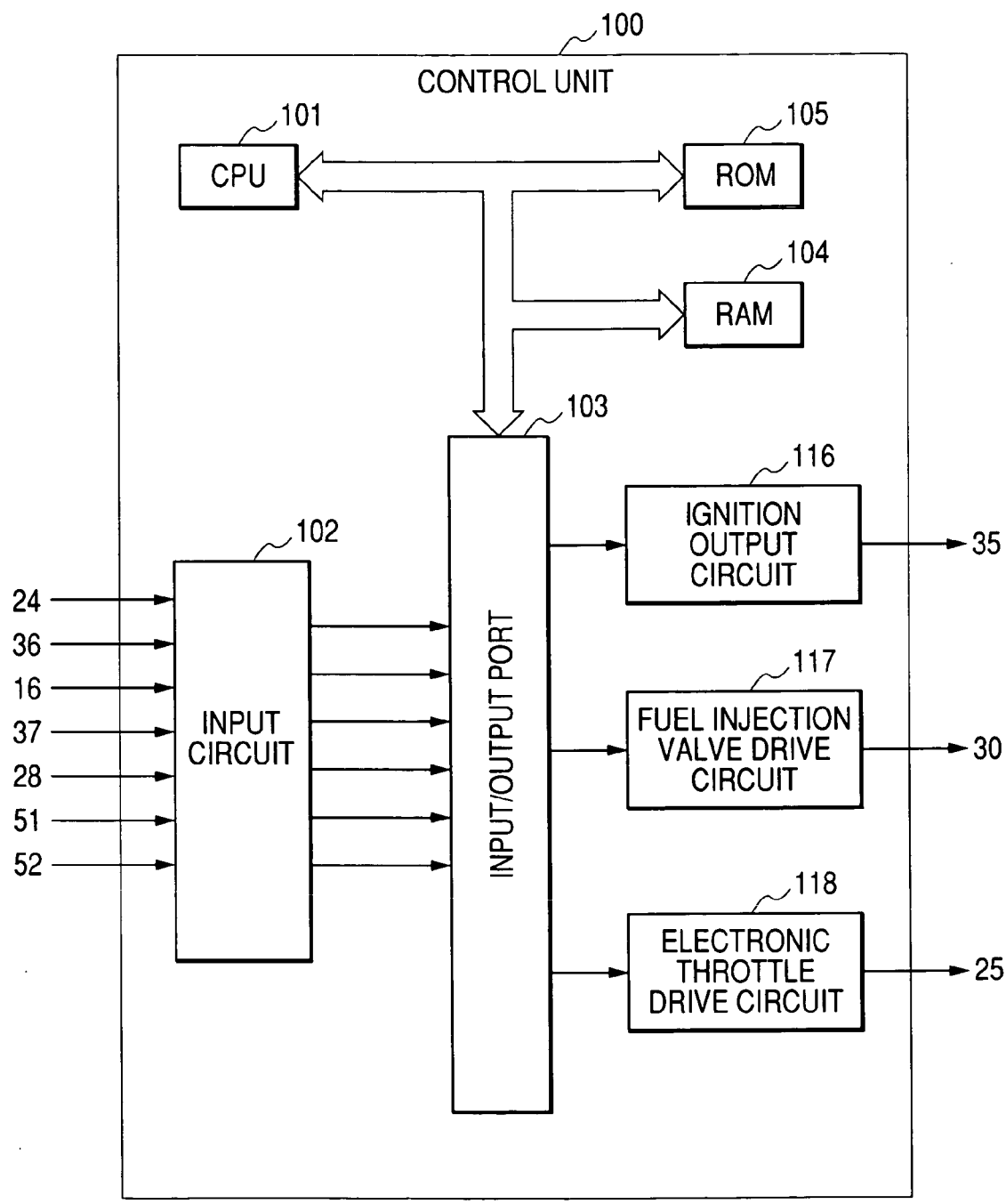
Figure 32:
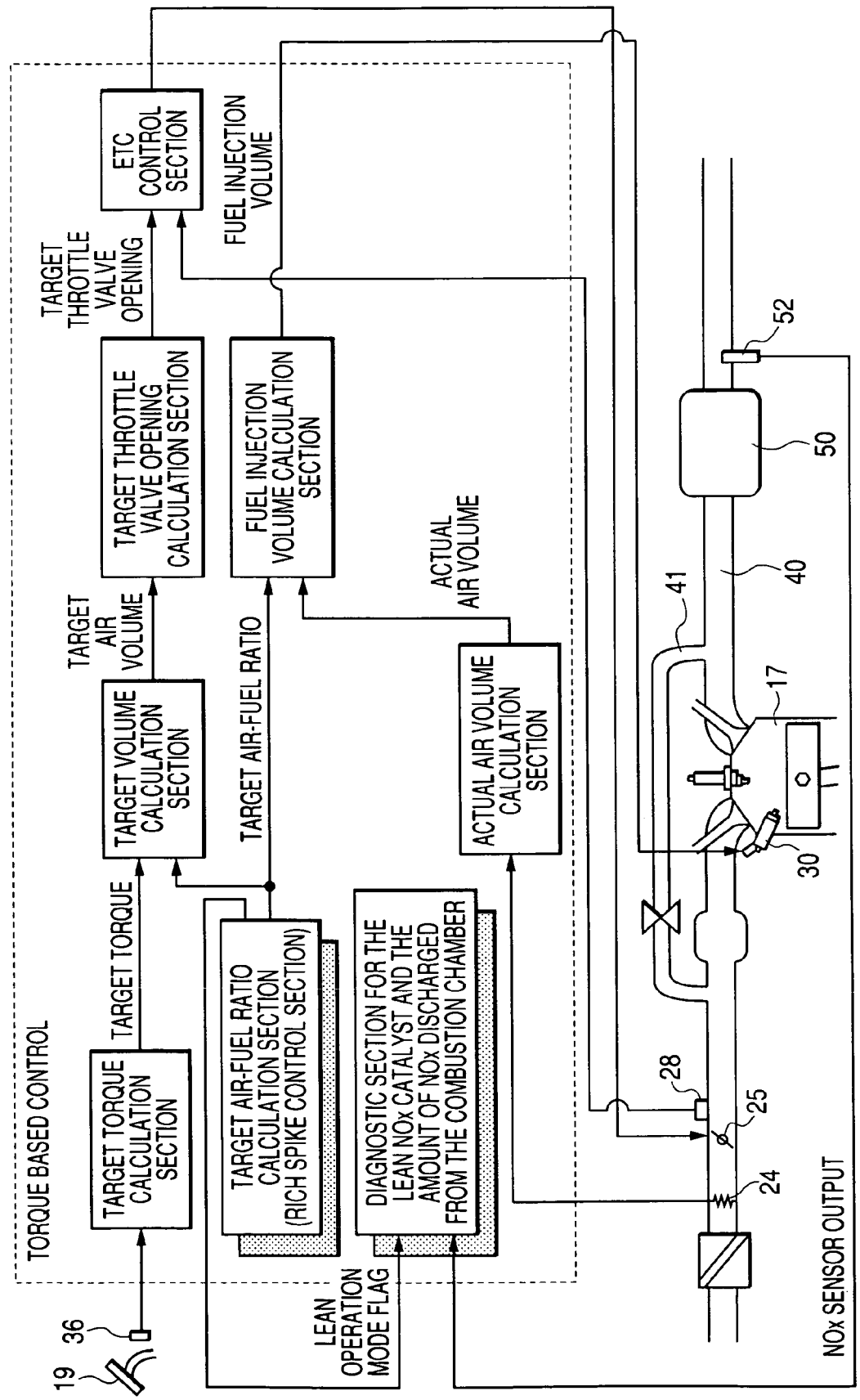
Figure 33:
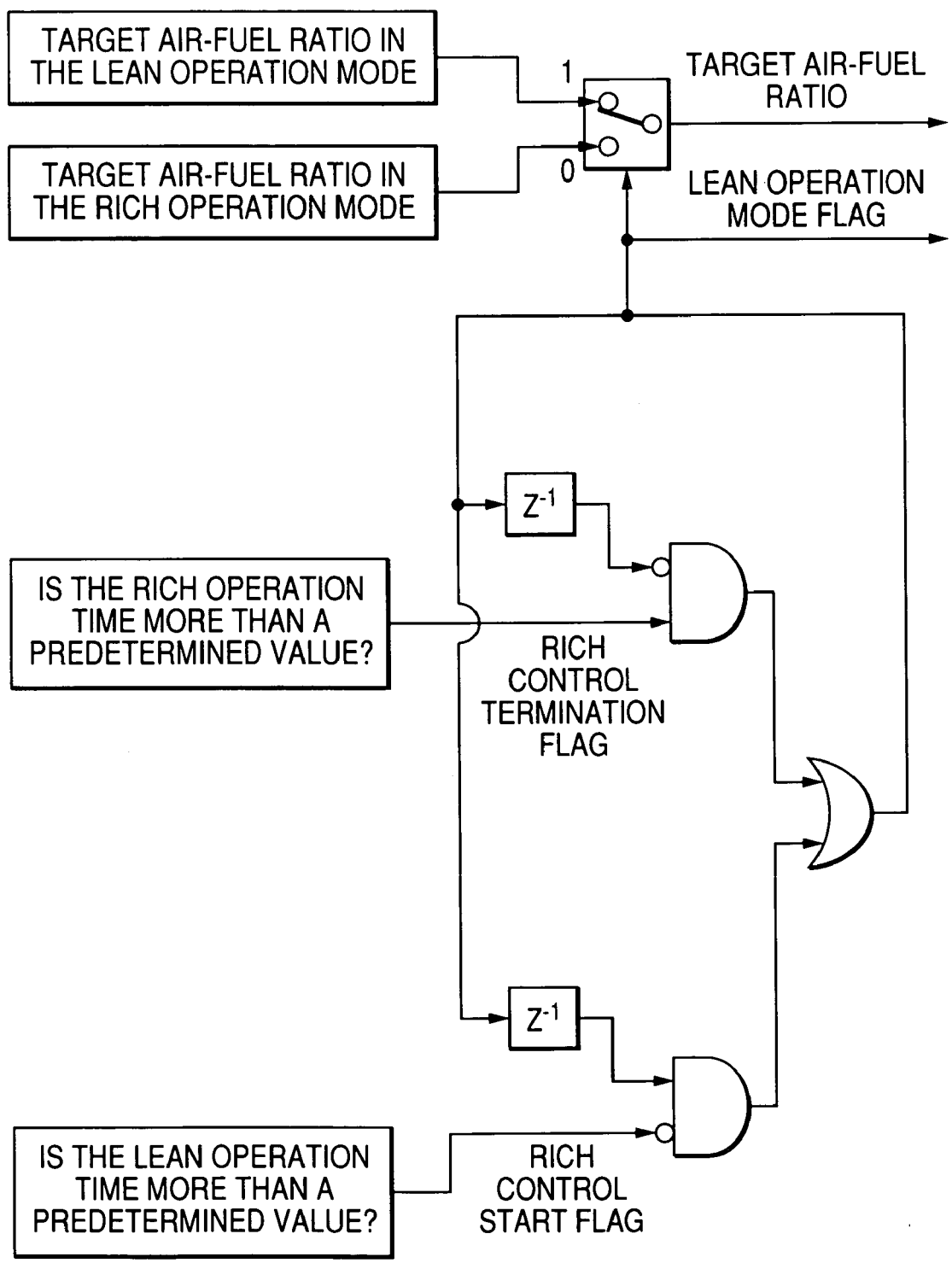
Figure 34:
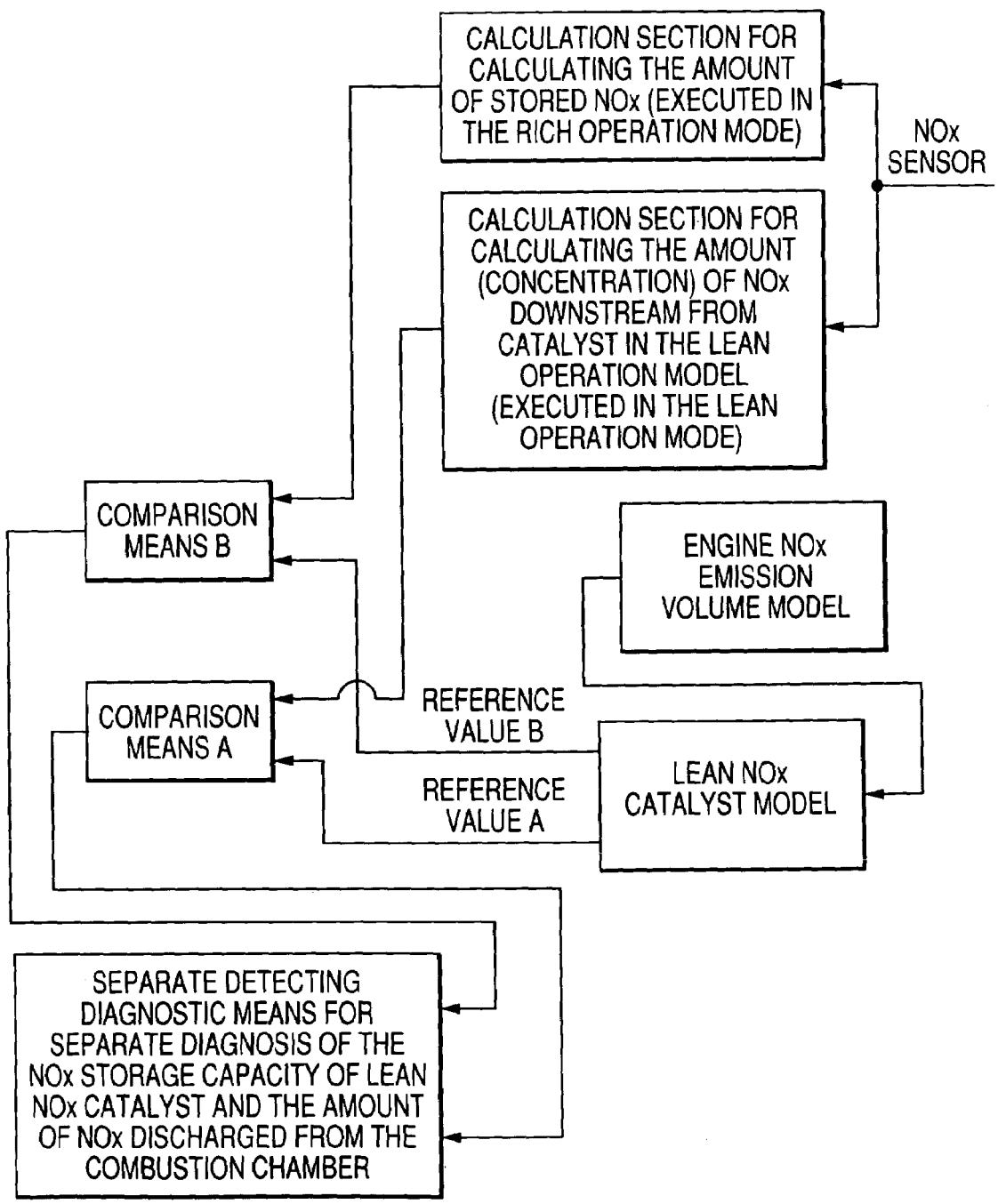
Figure 35:
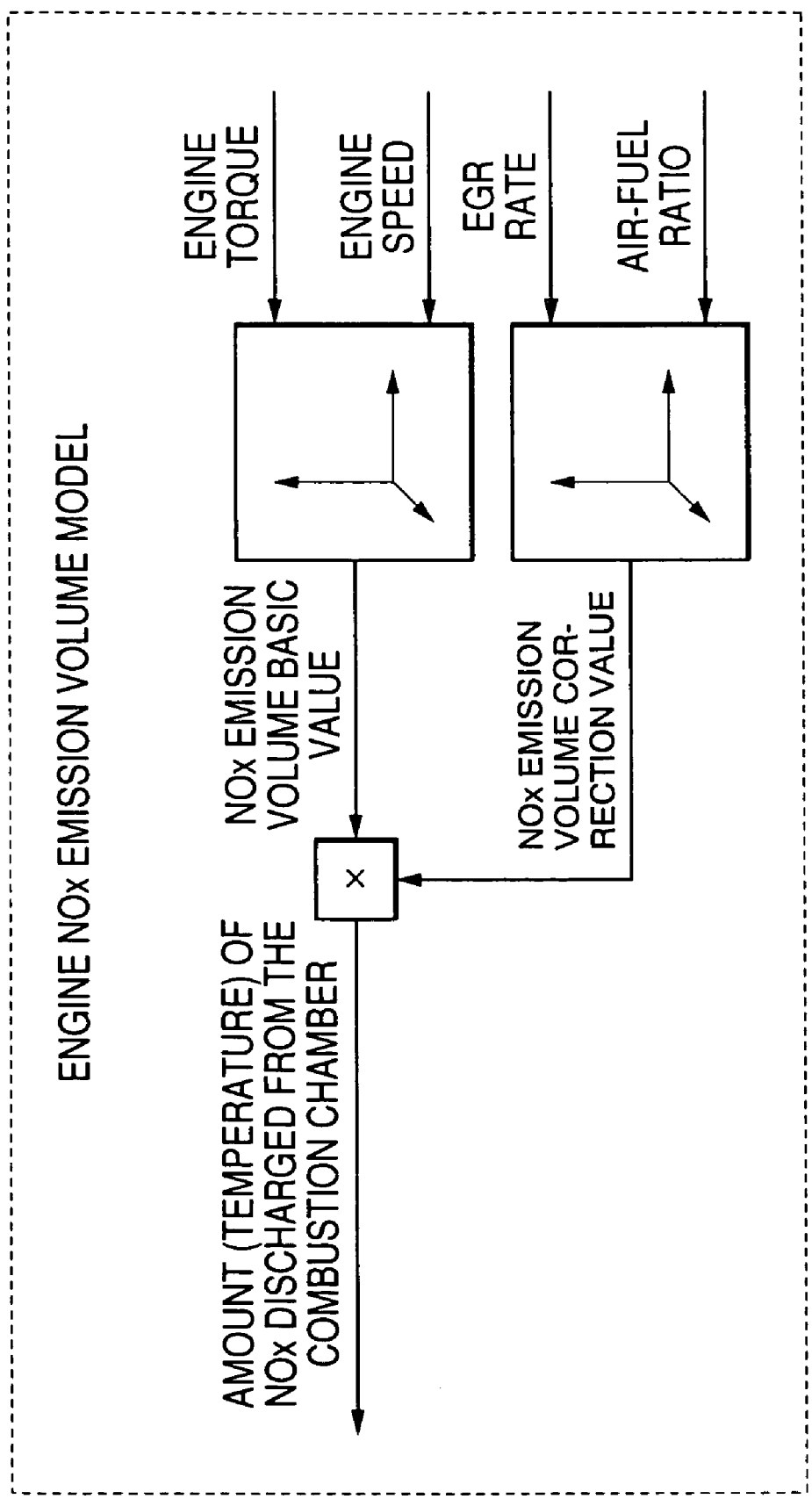
Figure 36:
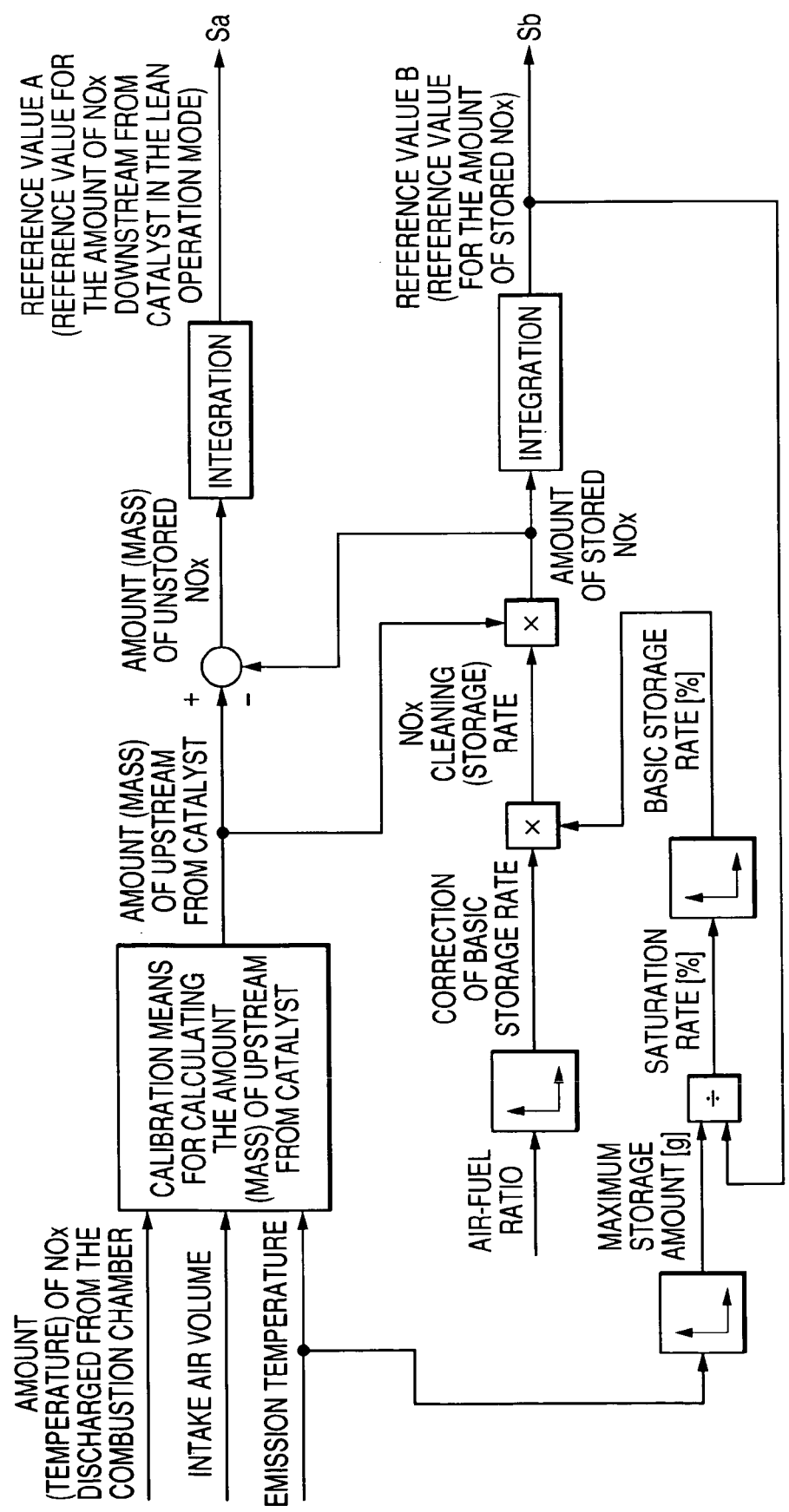
Figure 37:
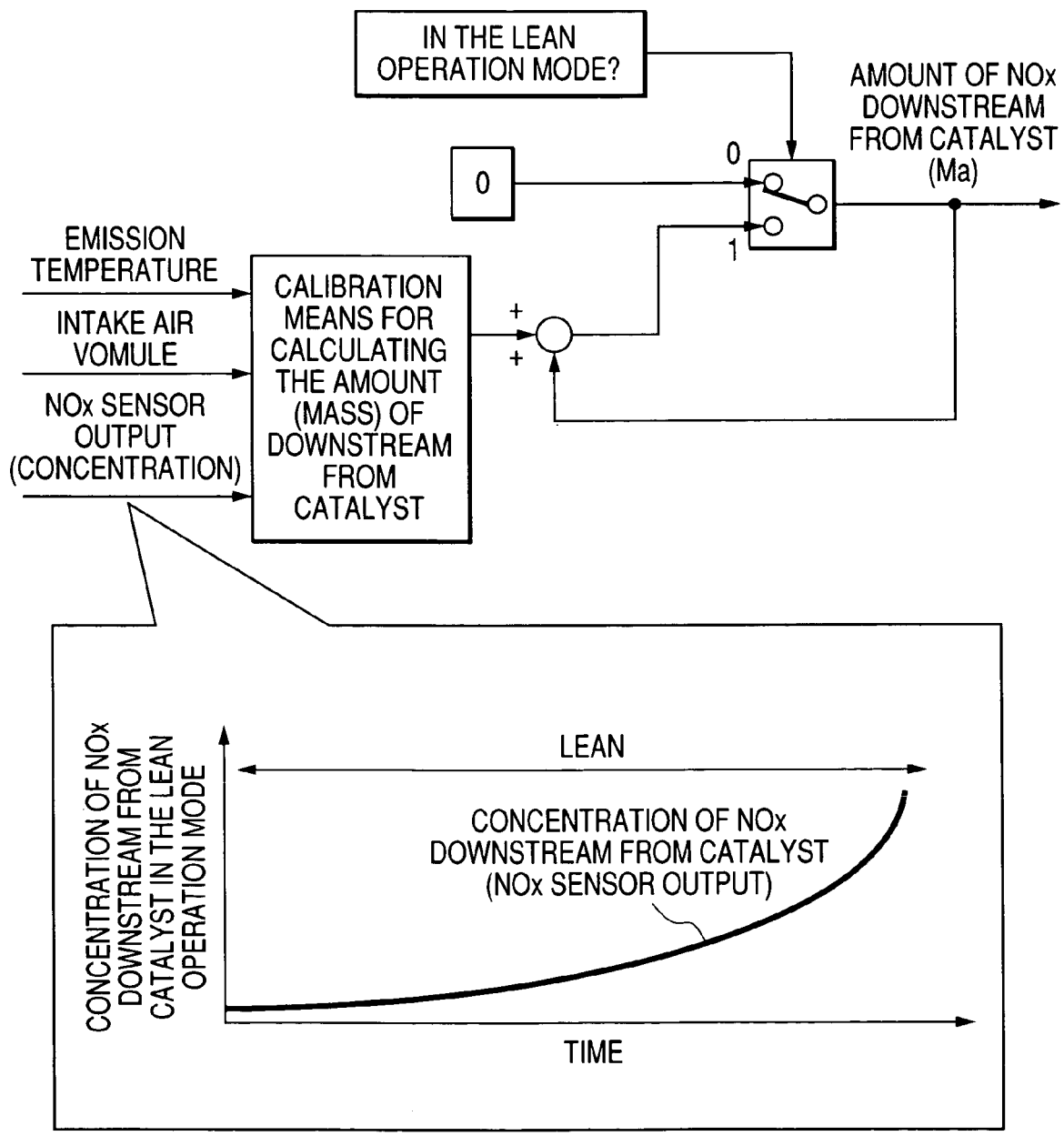
Figure 38:
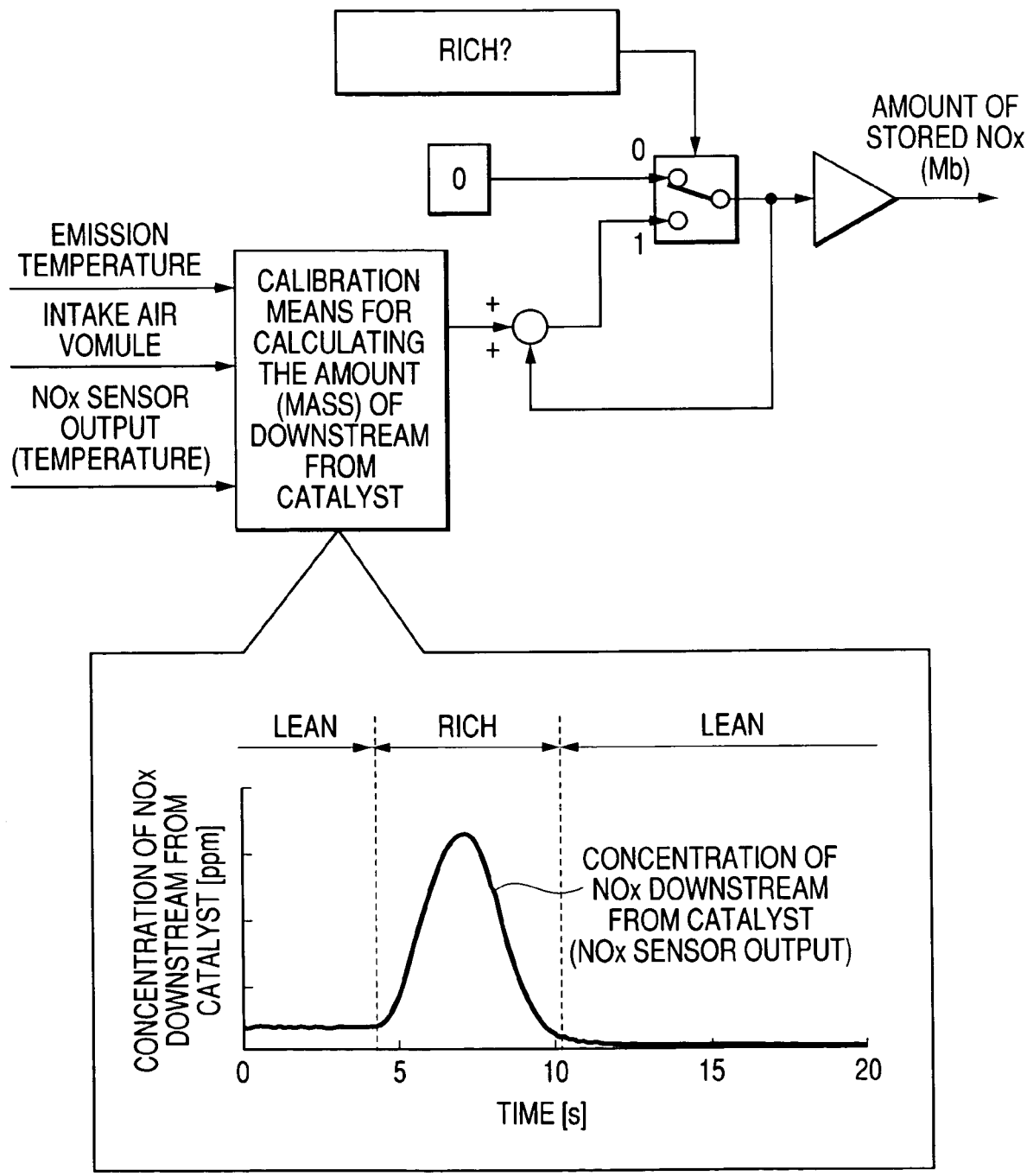
Figure 39:
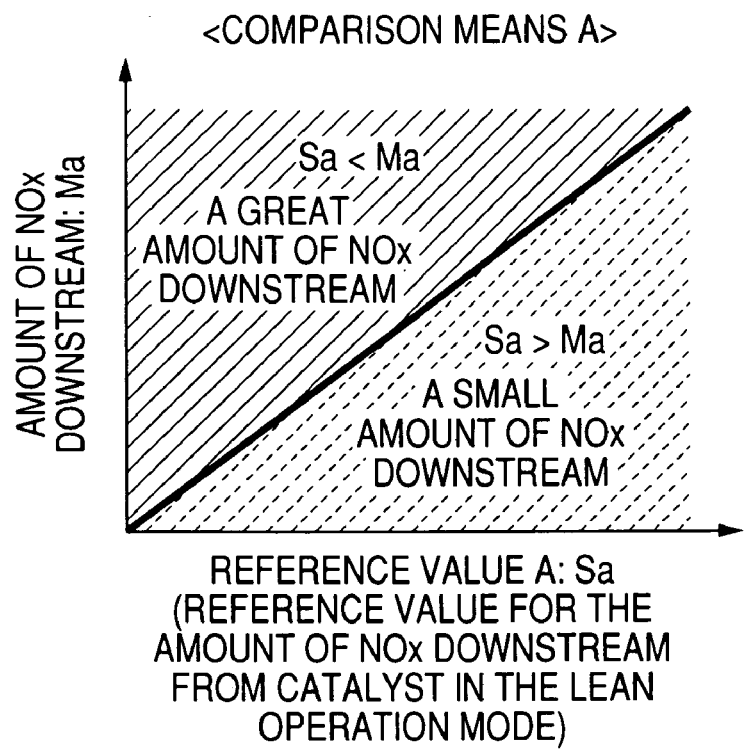
Figure 40:
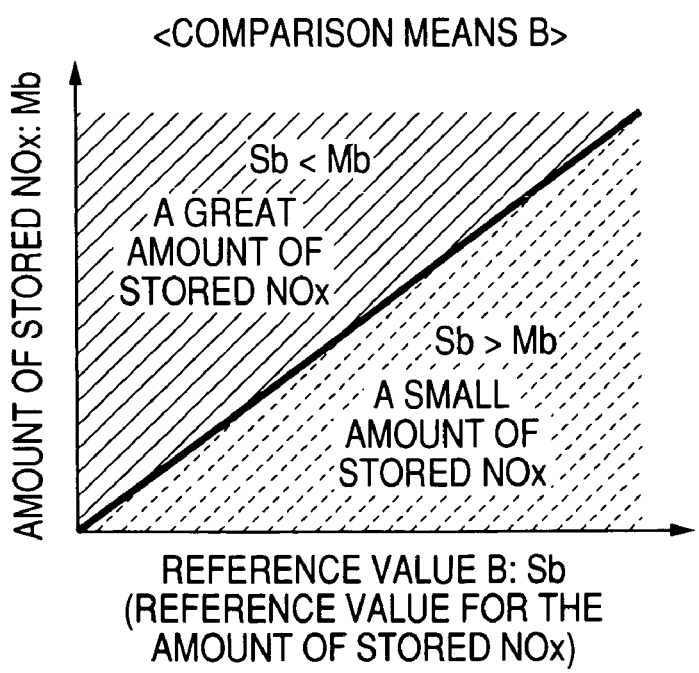
Figure 41:
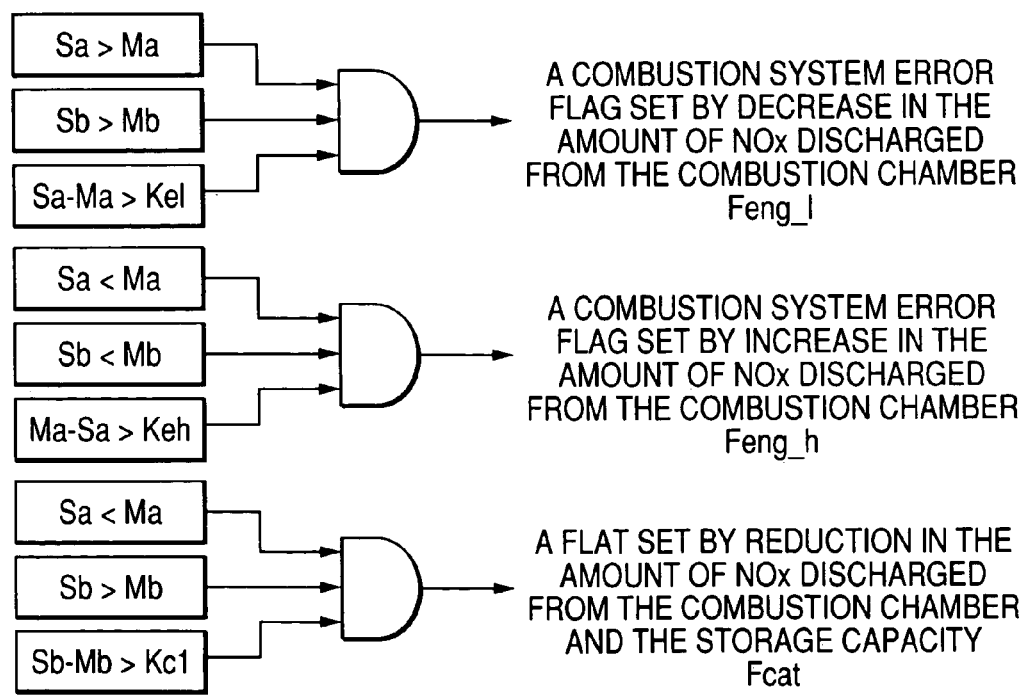
Figure 42:
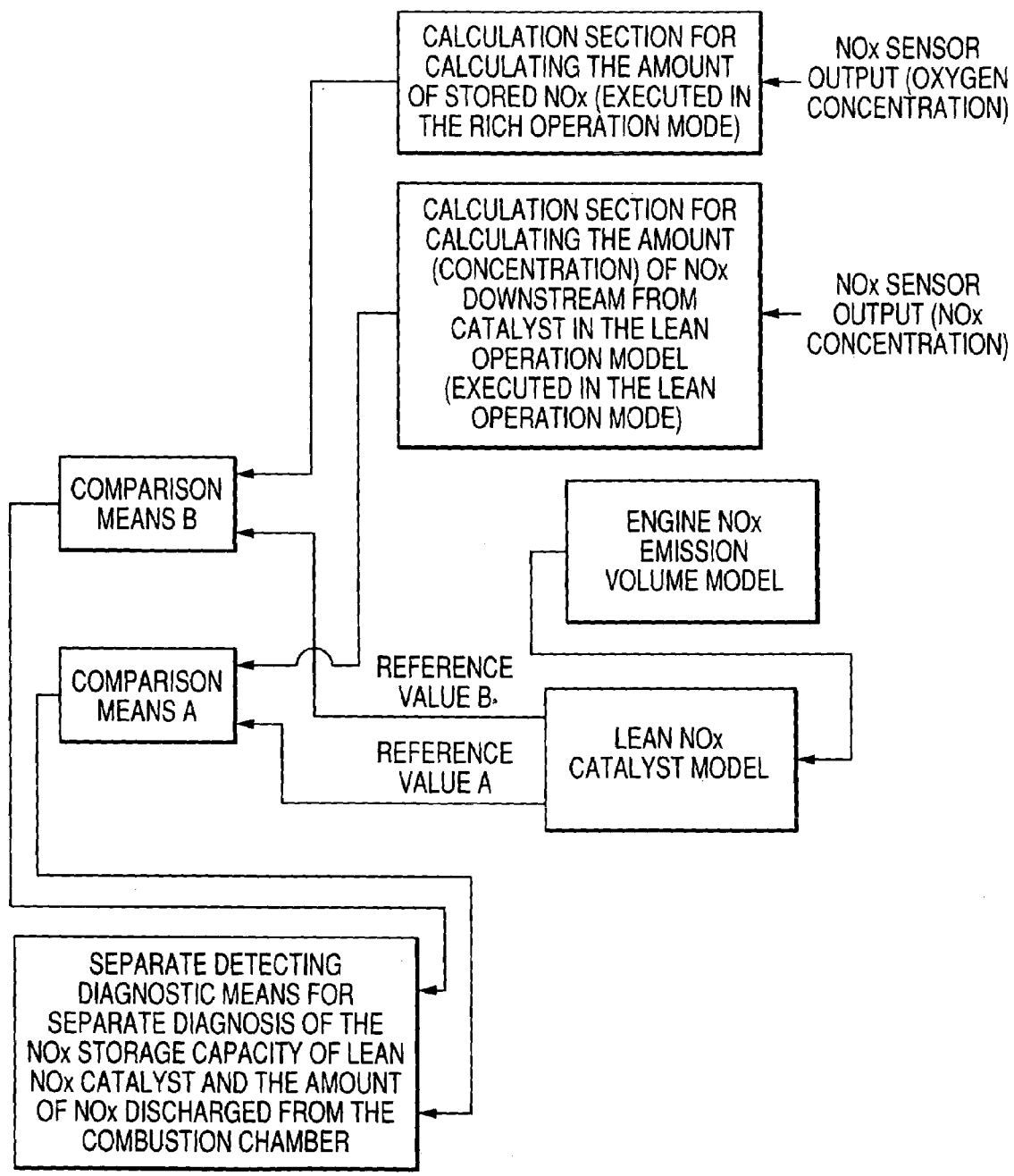
Figure 44:
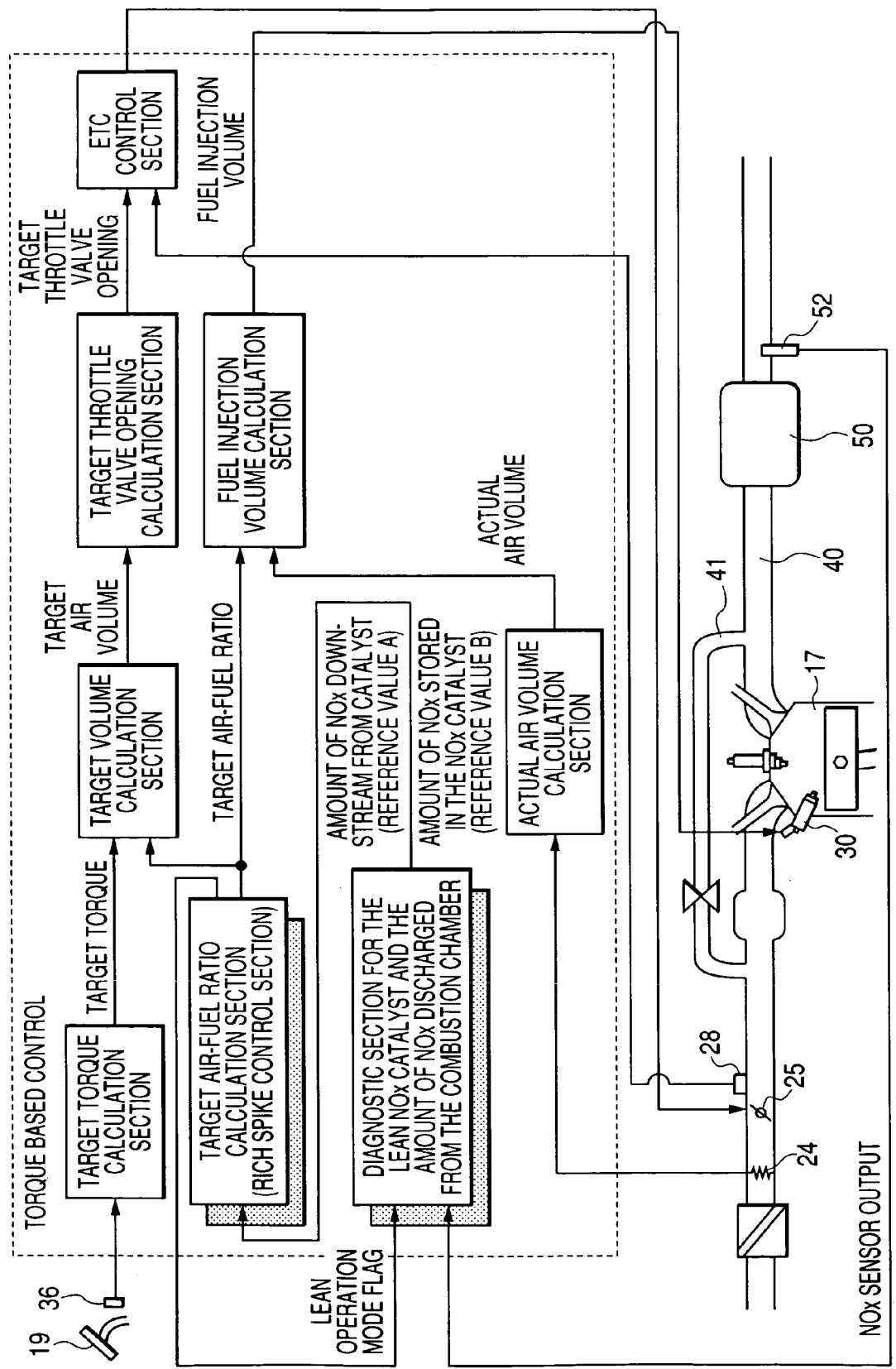
Figure 45:
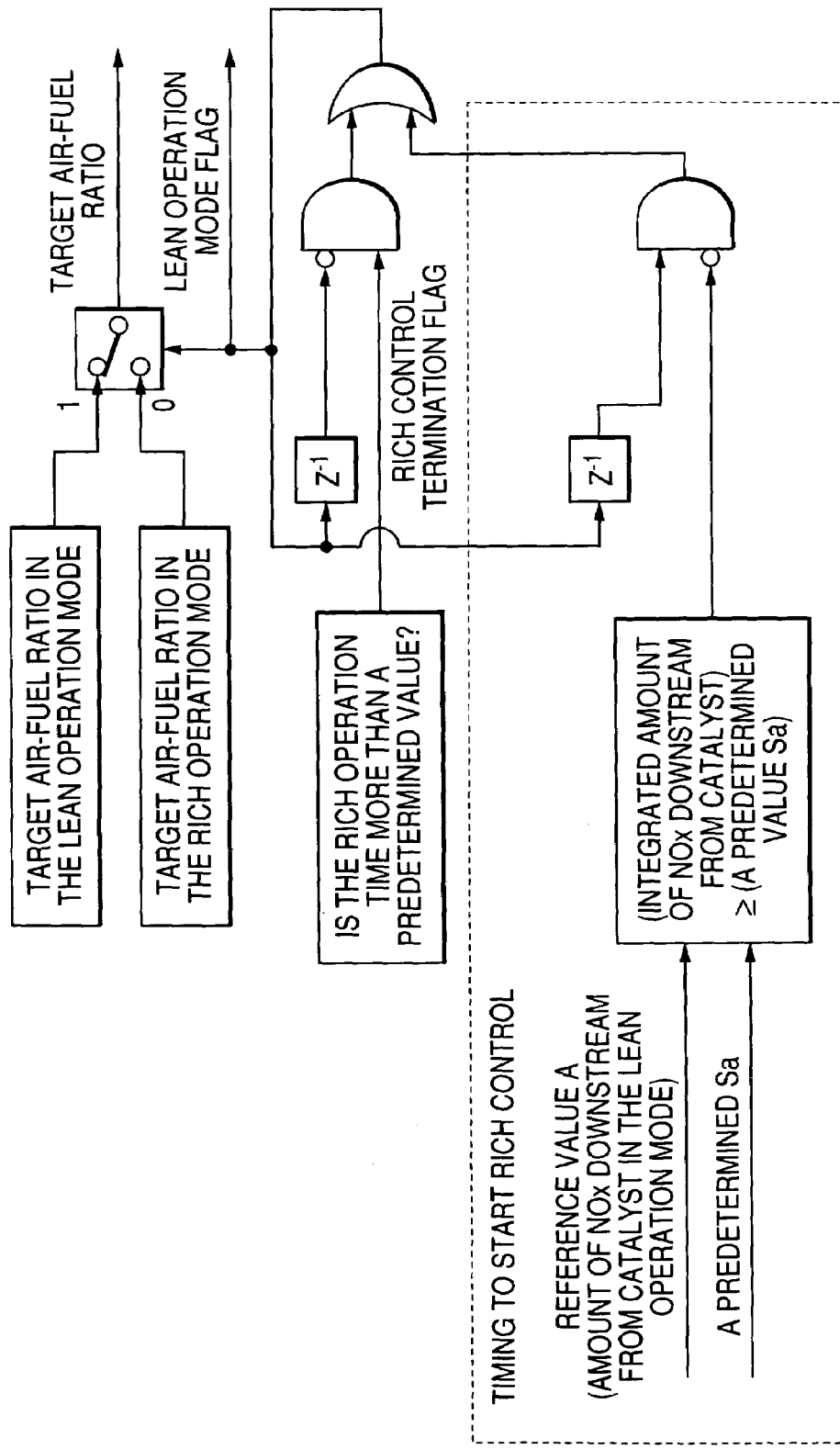
Figure 46:
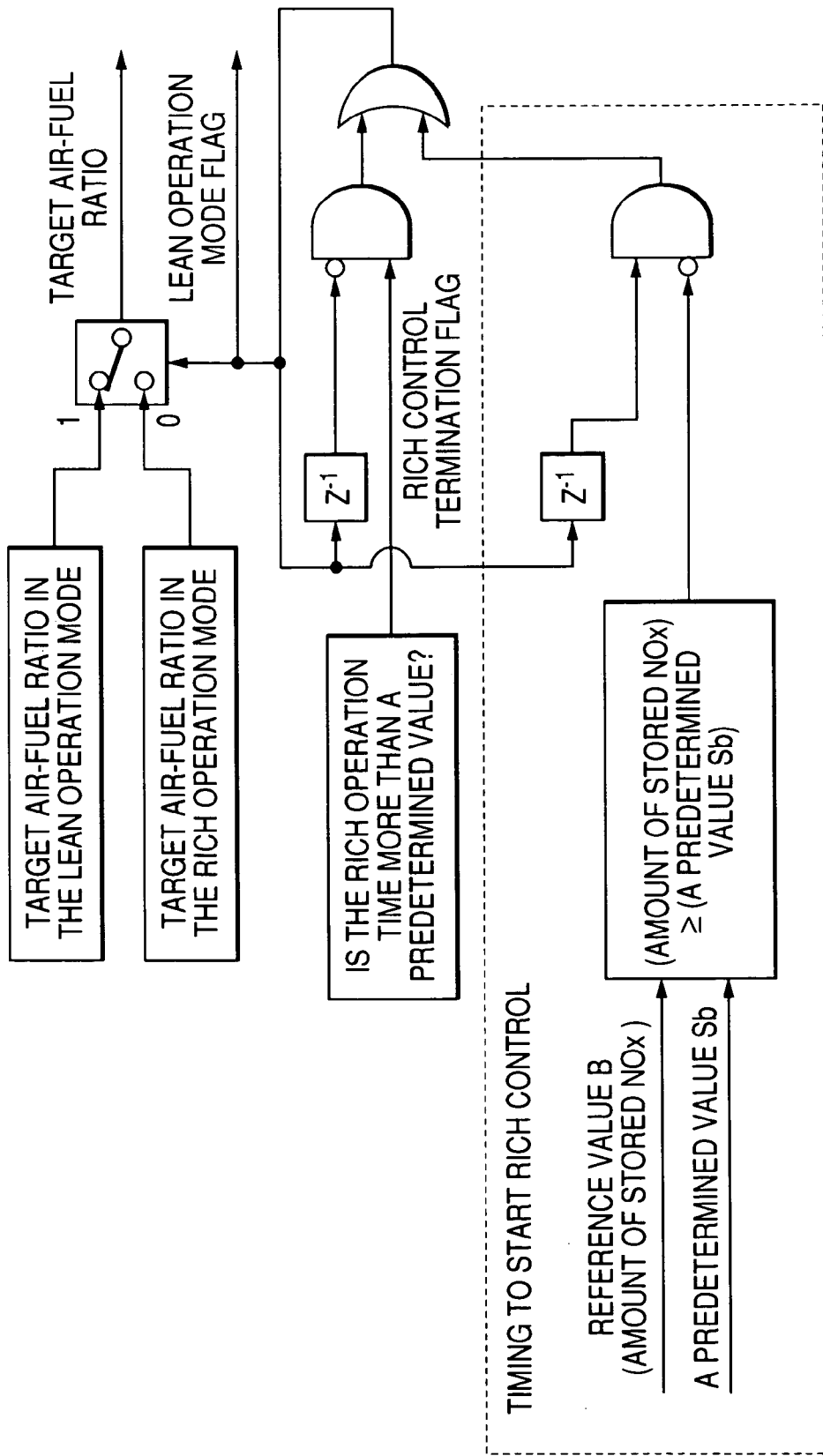
Figure 47:
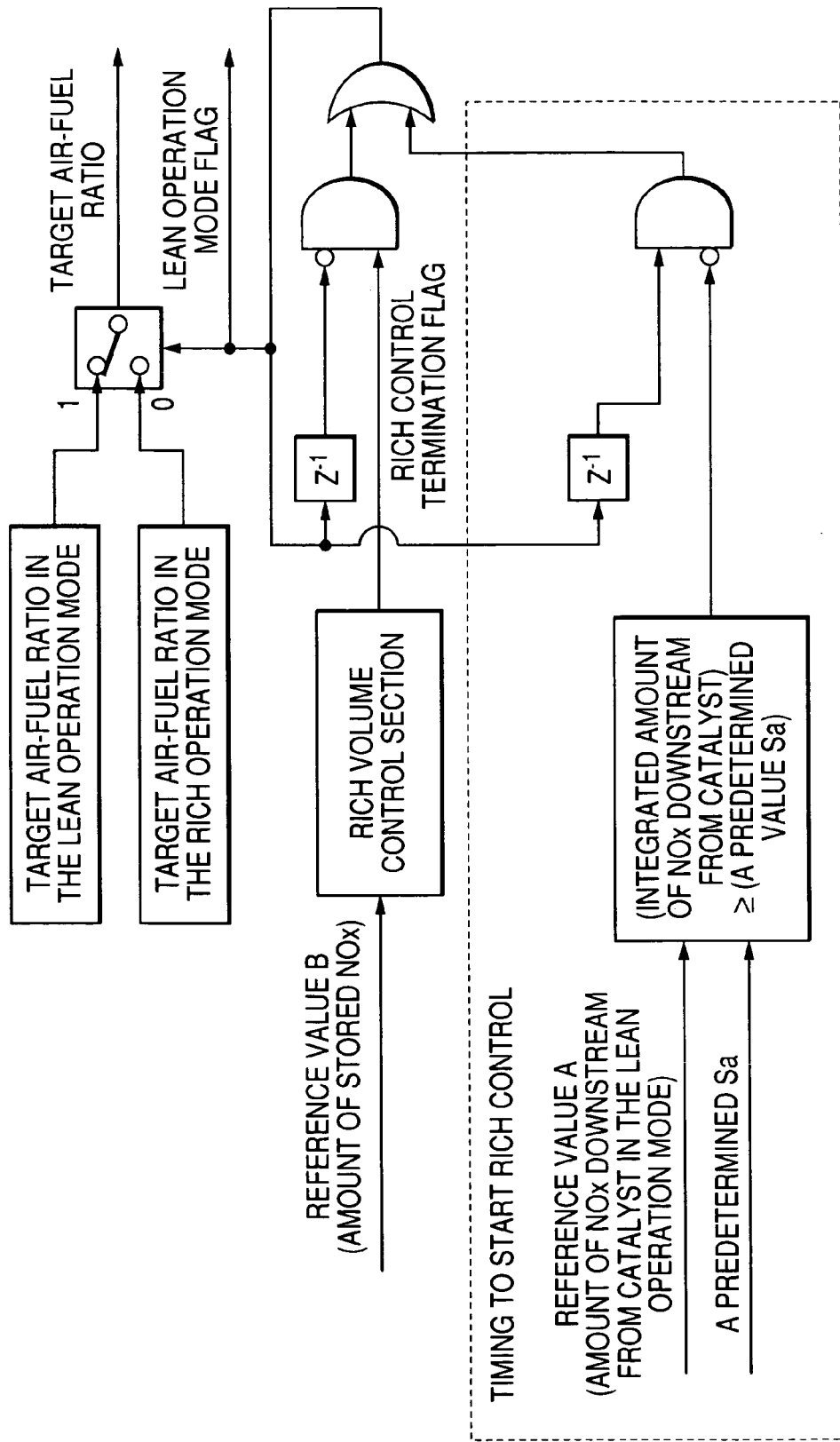
Figure 48:
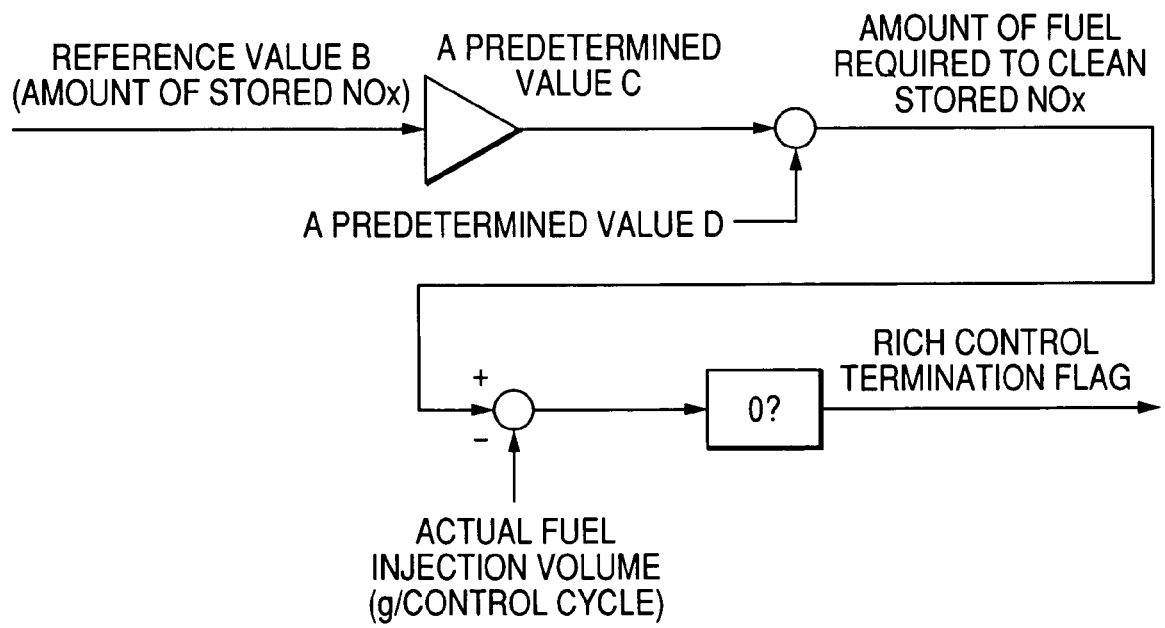
Figure 49:
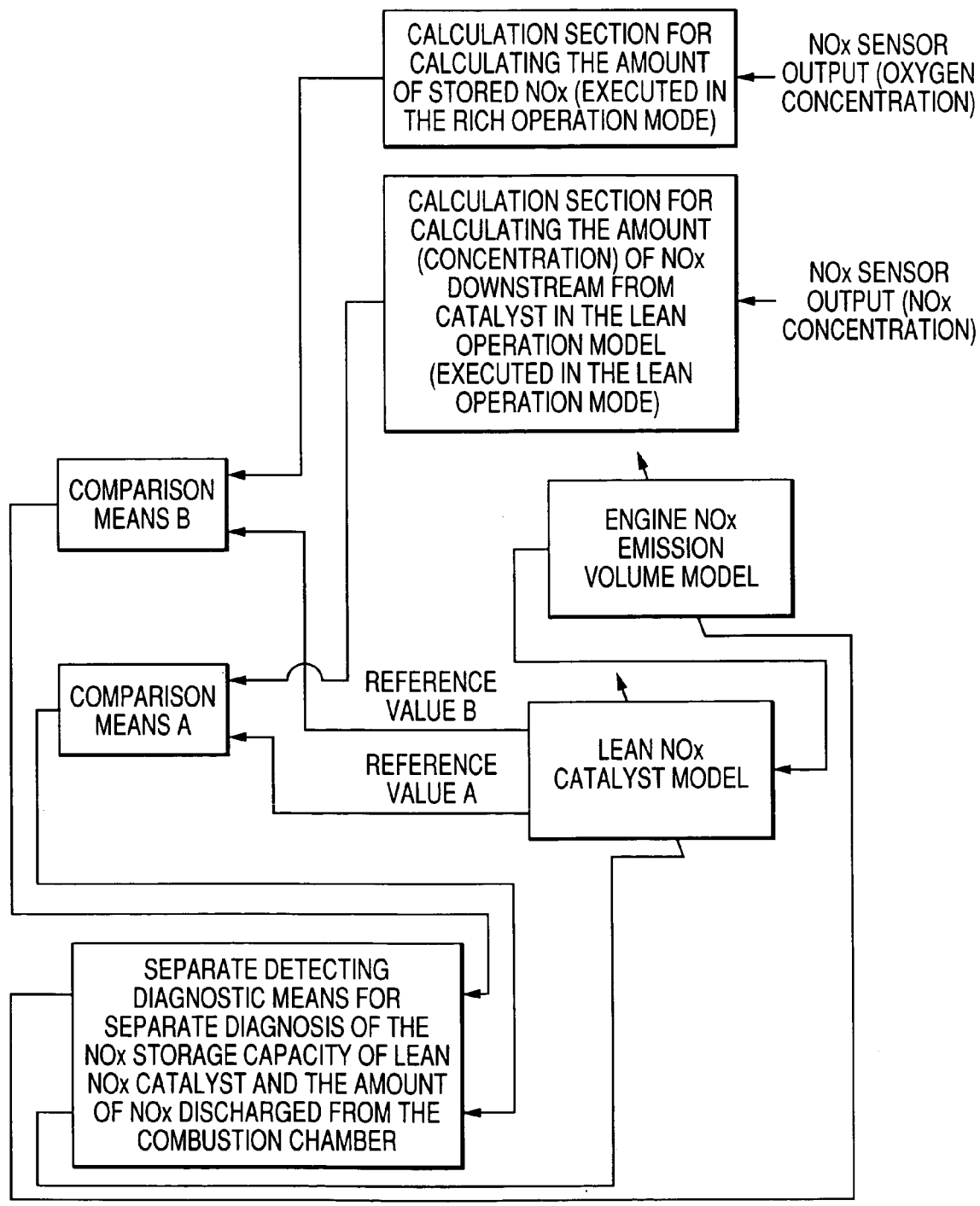
Figure 50:
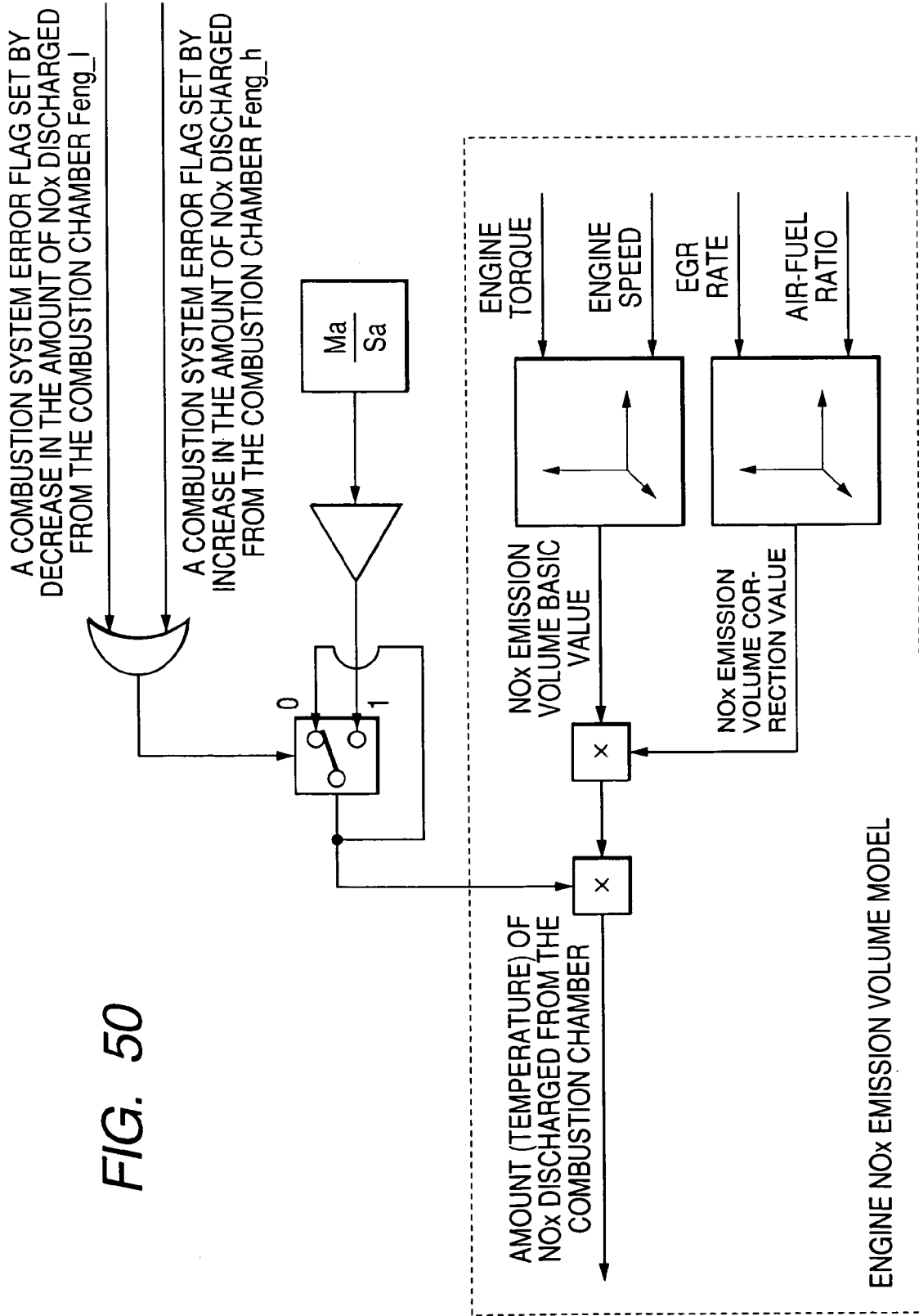
Figure 51:
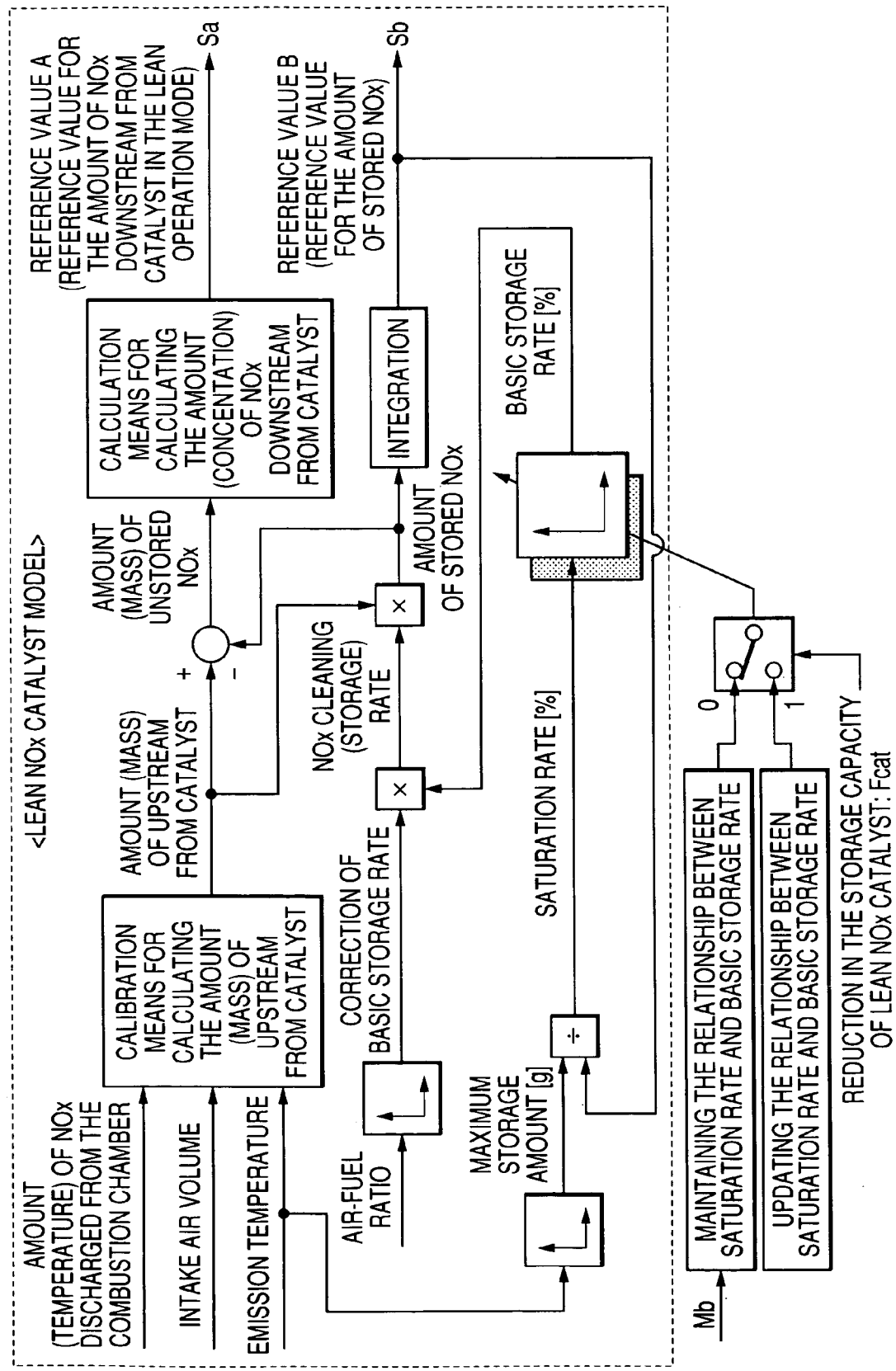
Figure 52:
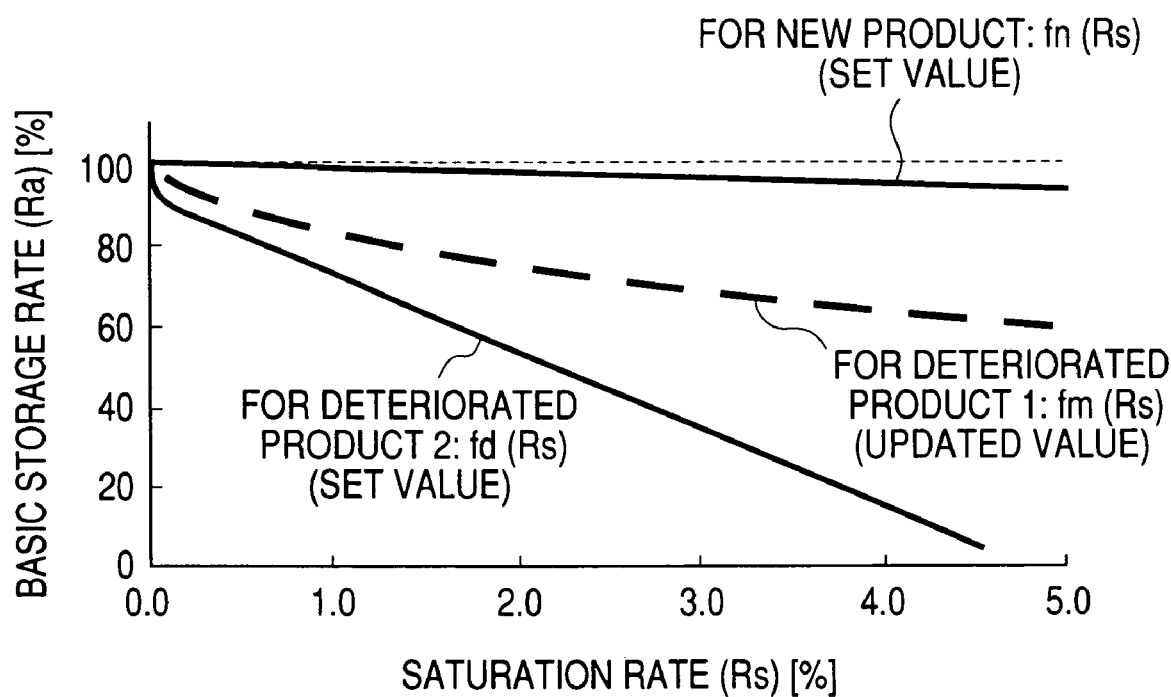
Figure 53:
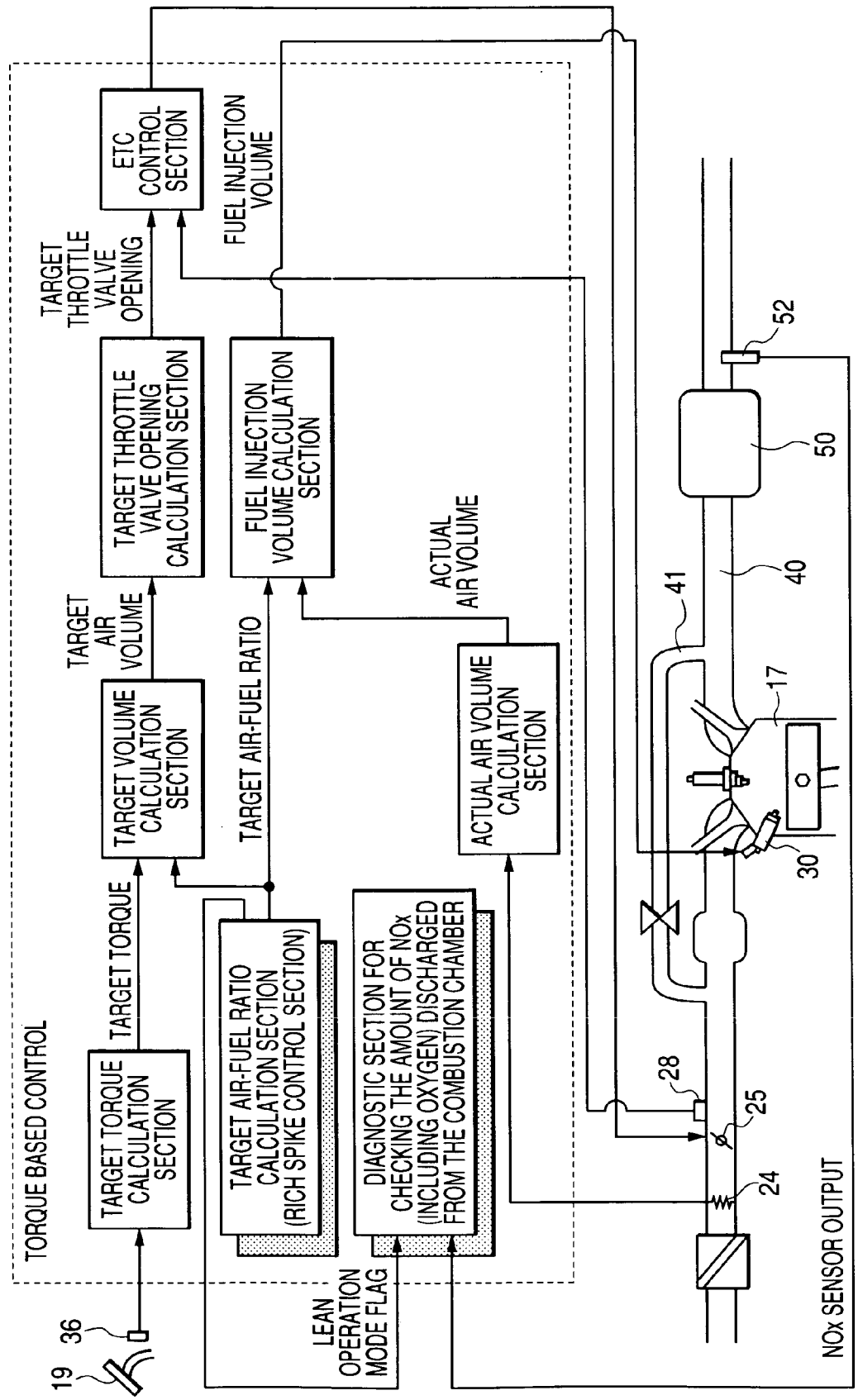

FIG. 29 is a drawing showing the twenty-seventh embodiment of a control apparatus according to the present invention;

FIG. 30 is a system diagram representing a first embodiment of the present invention;

FIG. 31 is a diagram showing the internal configuration of the control unit of the present invention;

FIG. 32 is a drawing of the control system in the first embodiment;

FIG. 33 is a block diagram showing the target air-fuel ratio calculation section in the first embodiment;

FIG. 34 is a block diagram showing the separate detecting diagnostic section for the lean NOx catalyst and the amount of NOx discharged from the combustion chamber in the first embodiment;

FIG. 35 is a block diagram representing the engine NOx emission volume model in the first embodiment;

FIG. 36 is a block diagram showing the lean NOx catalyst model in the first embodiment;

FIG. 37 is a block diagram showing the calculation section for calculating the amount (concentration) of NOx downstream from catalyst in the lean operation mode in the first embodiment;

FIG. 38 is a block diagram showing the calculation section for calculating the amount of stored NOx in the first embodiment;

FIG. 39 is a drawing representing the details of the comparison made by the comparison means A in the first embodiment;

FIG. 40 is a drawing representing the details of the comparison made by the comparison means B in the first embodiment;

FIG. 41 is a diagram showing the processing by the separate detecting diagnostic section applied to the NOx storage capacity of the lean NOx catalyst and the amount of NOx discharged from the combustion chamber in the lean operation mode in the first embodiment;

FIG. 42 is a block diagram showing the diagnostic section for the lean NOx catalyst and the amount of NOx discharged from the combustion chamber in the second embodiment;

FIG. 43 is a block diagram showing the calculation section for calculating the amount of stored NOx in the second embodiment;

FIG. 44 is a diagram showing a control system in the third embodiment;

FIG. 45 is a block diagram showing an example of the target air-fuel ratio calculation section in the third embodiment;

FIG. 46 is a block diagram showing another example of the target air-fuel ratio in the third embodiment;

FIG. 47 is a block diagram showing the target air-fuel ratio calculation section in the fourth embodiment;

FIG. 48 is a block diagram showing the rich volume control section in the fourth embodiment;

FIG. 49 is a block diagram showing the diagnostic section for the lean NOx catalyst and the amount of NOx discharged from the combustion chamber in the fifth embodiment;

FIG. 50 is a block diagram showing the engine NOx emission volume model in the fifth embodiment;

FIG. 51 is a block diagram showing the lean NOx catalyst model in the fifth embodiment;

FIG. 52 is a drawing representing how to update the relationship between the saturation rate and basic storage rate curve in the fifth embodiment;

FIG. 53 is a drawing showing a control system in the sixth embodiment;

14

Figure 54:
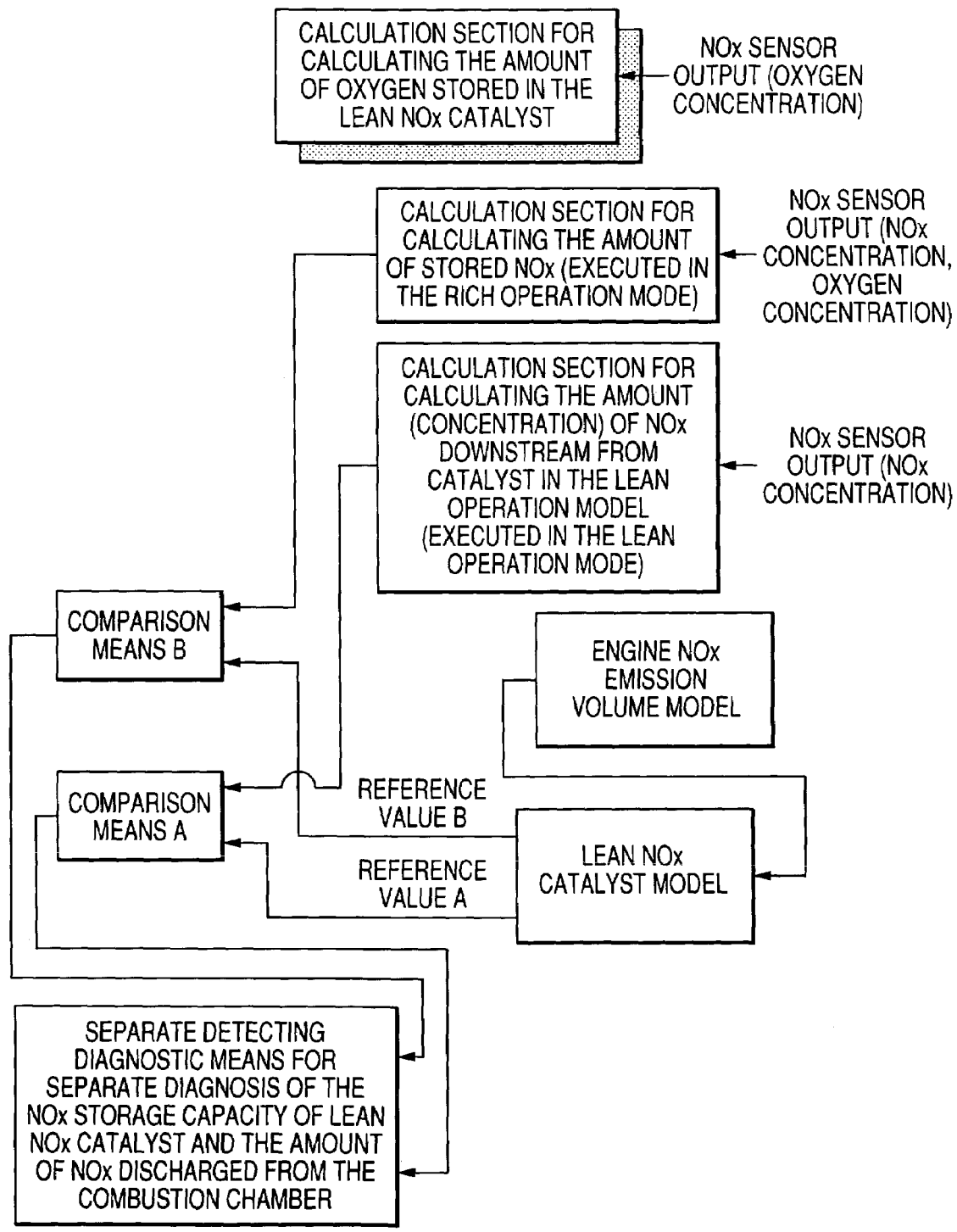
Figure 55:
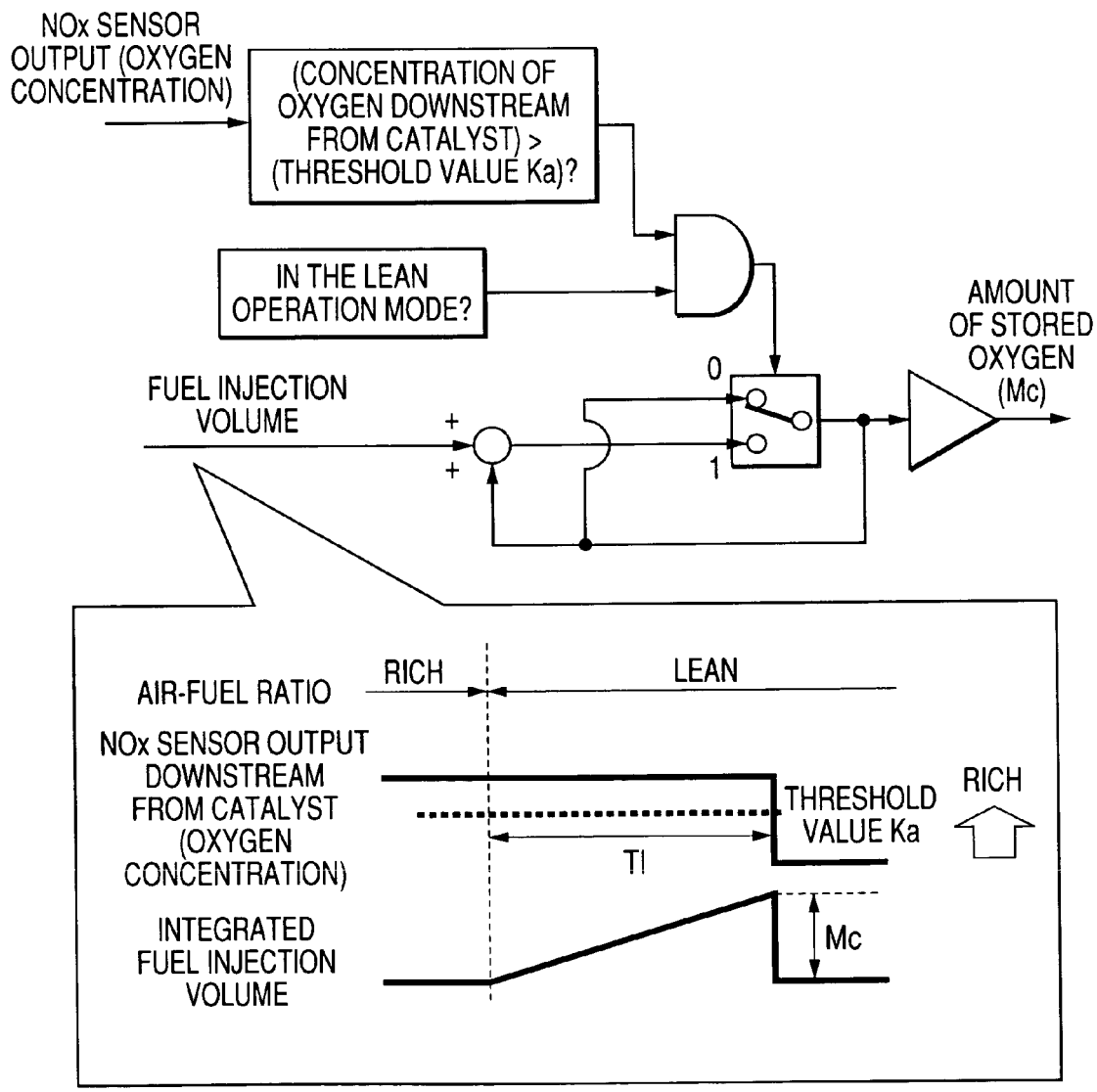
Figure 56:
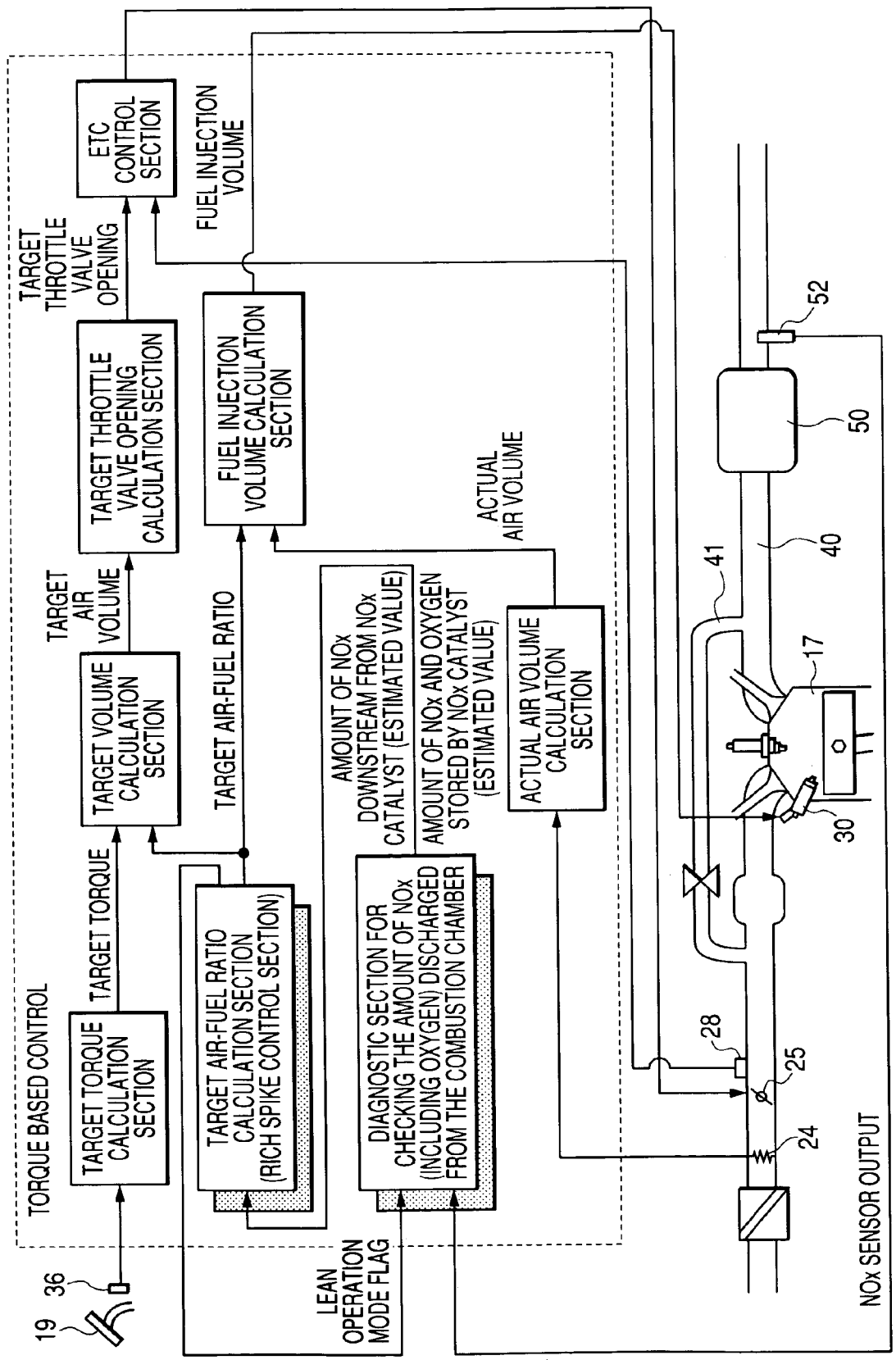
Figure 57:
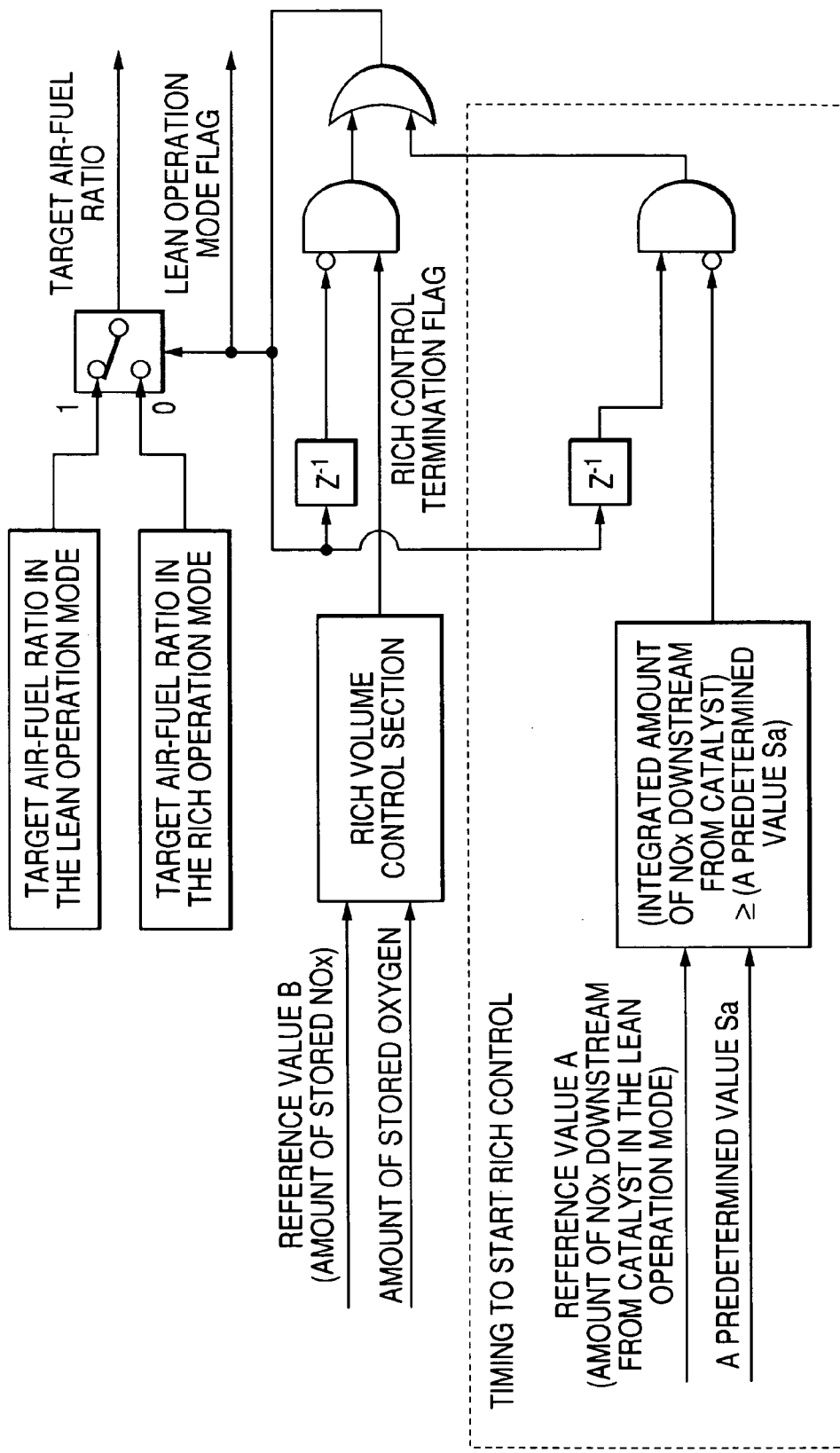
Figure 58:
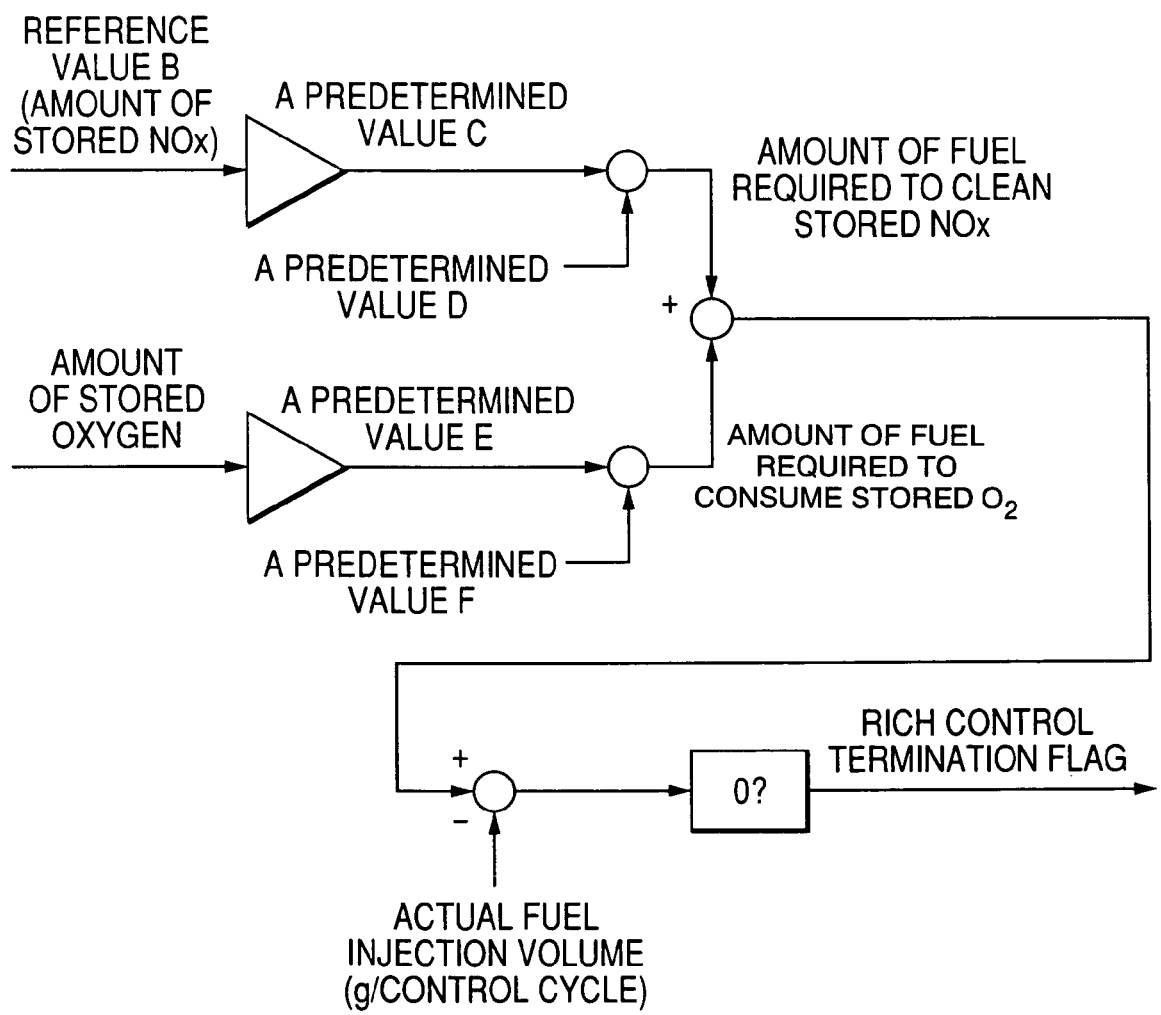
Figure 59:
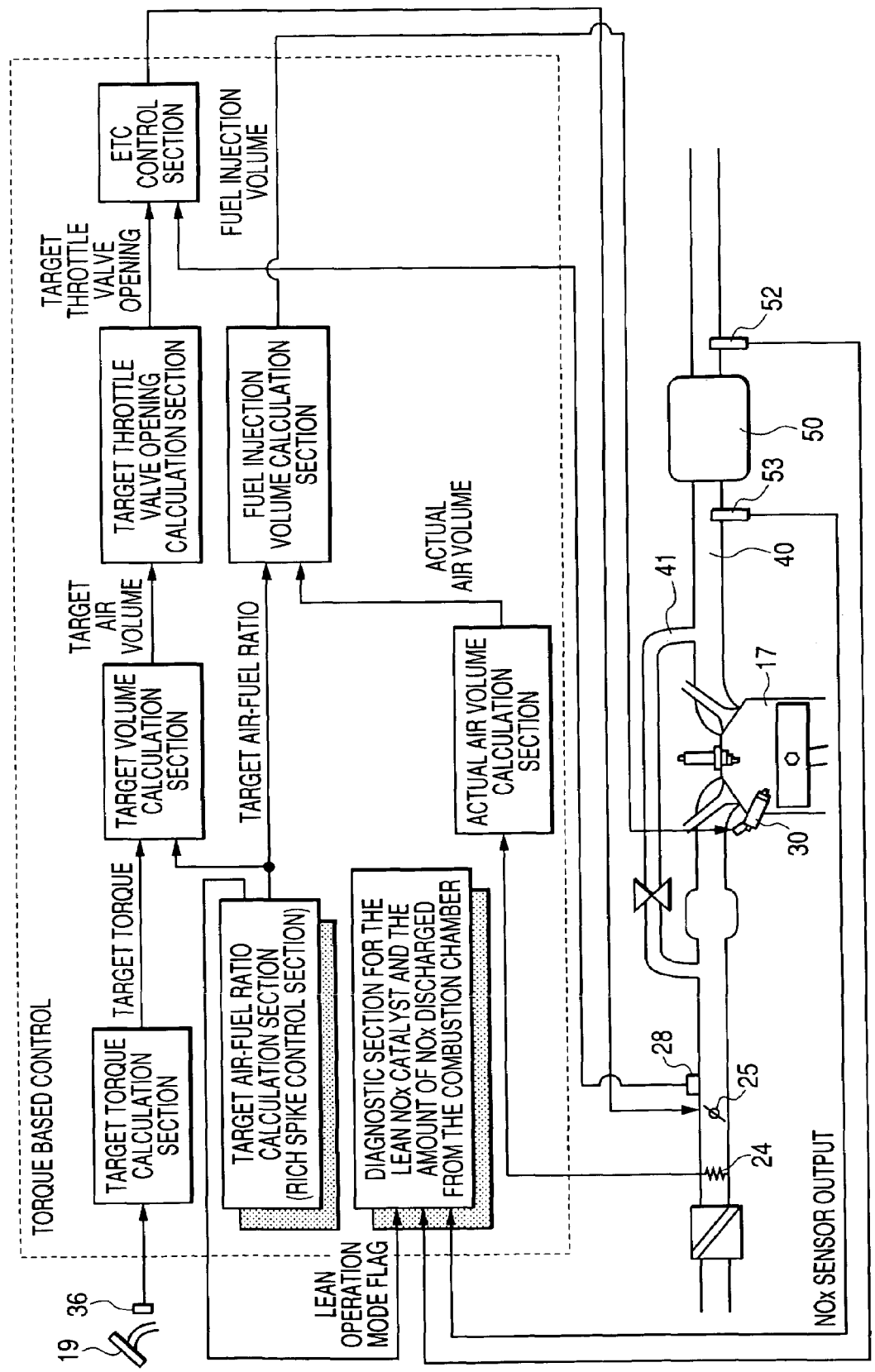
Figure 60:
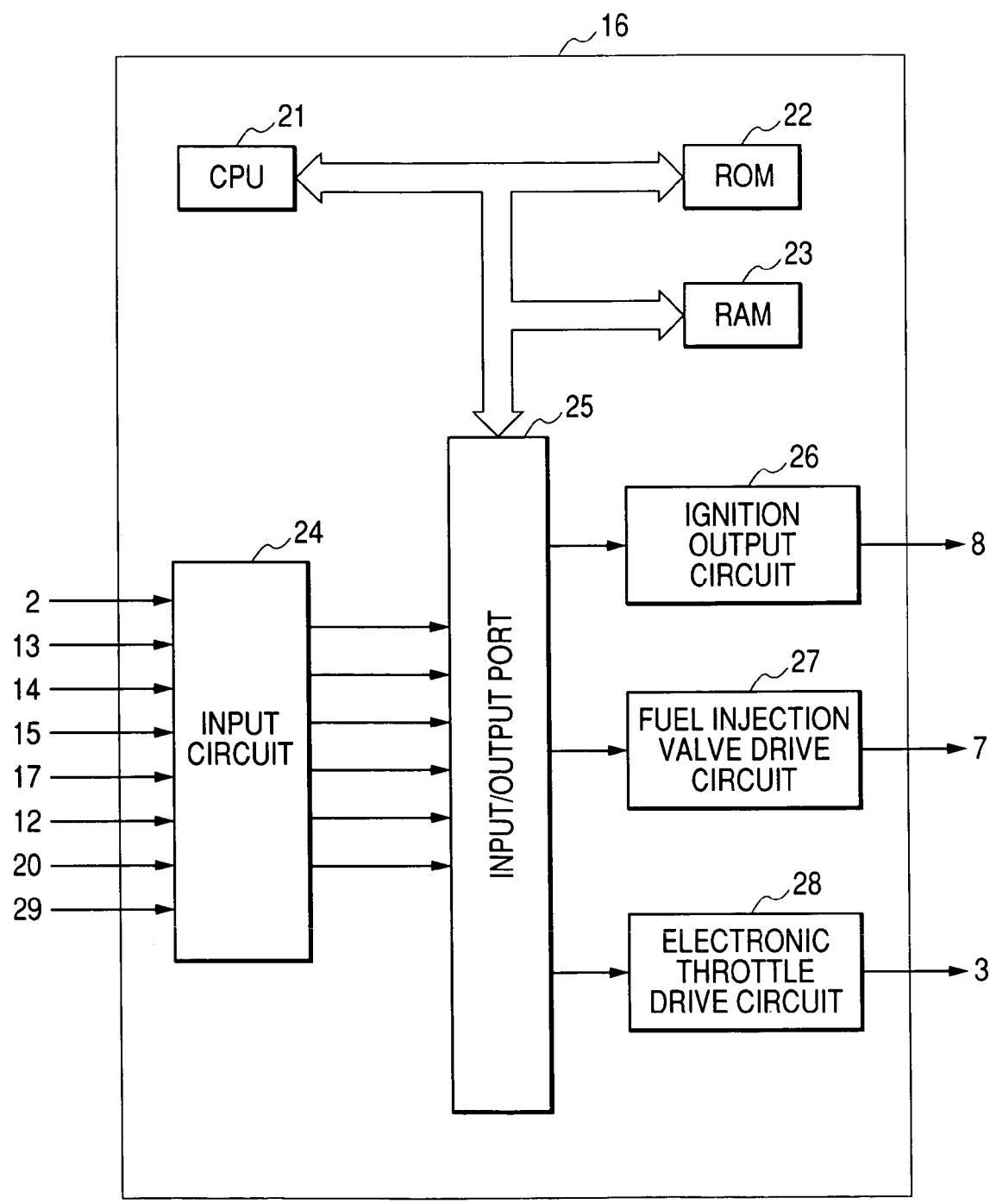
Figure 61:
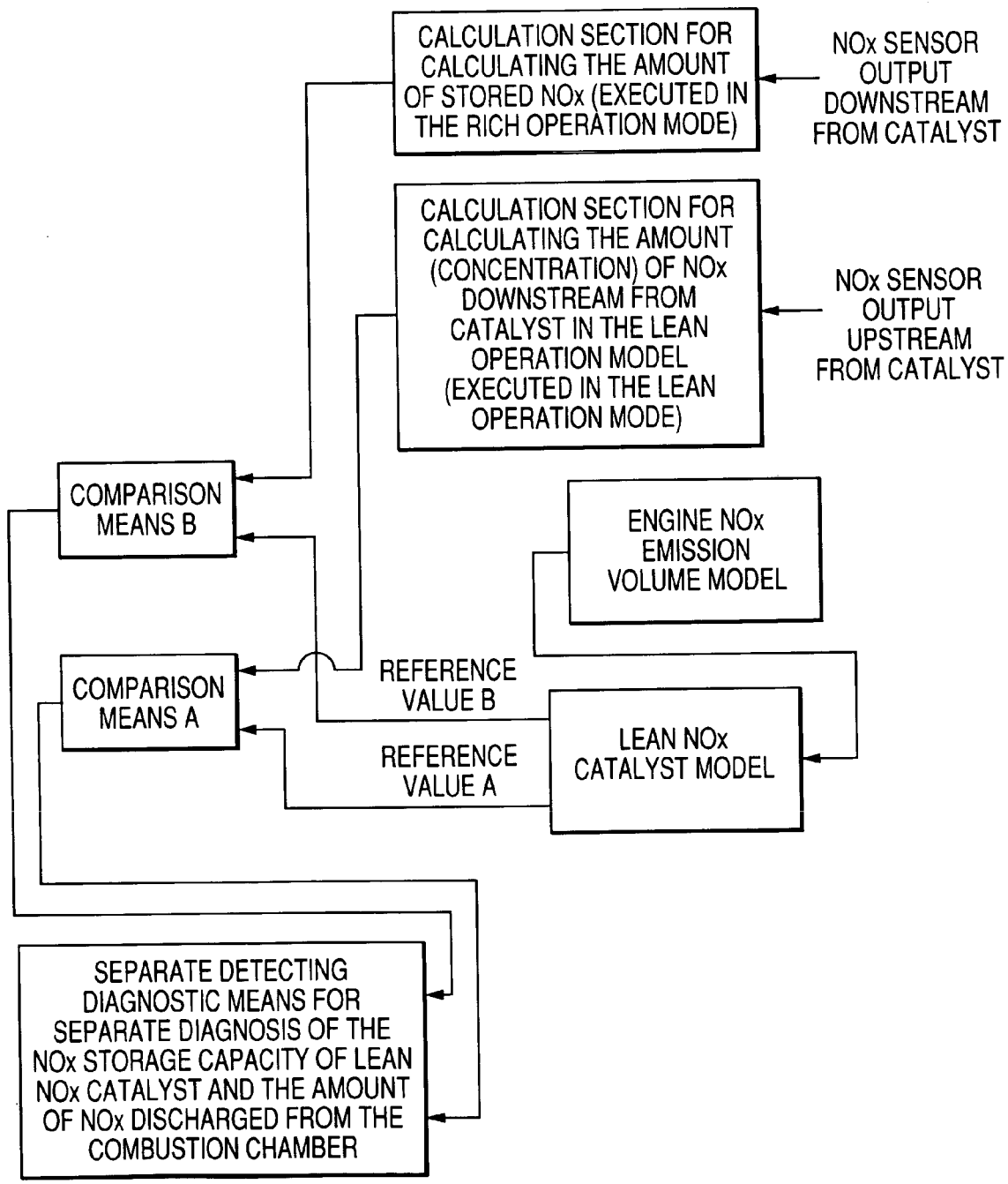
Figure 62:
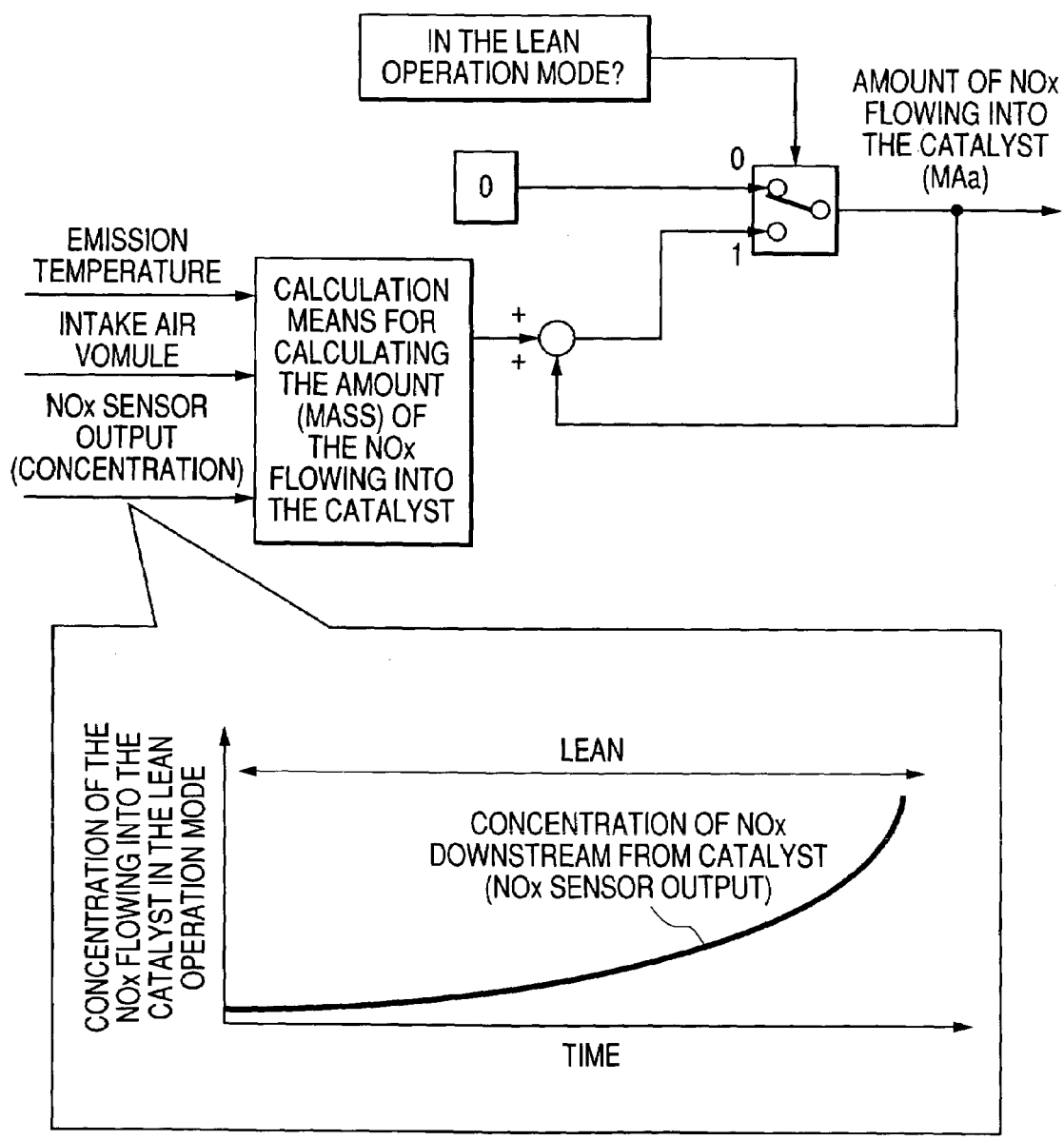
Figure 63:
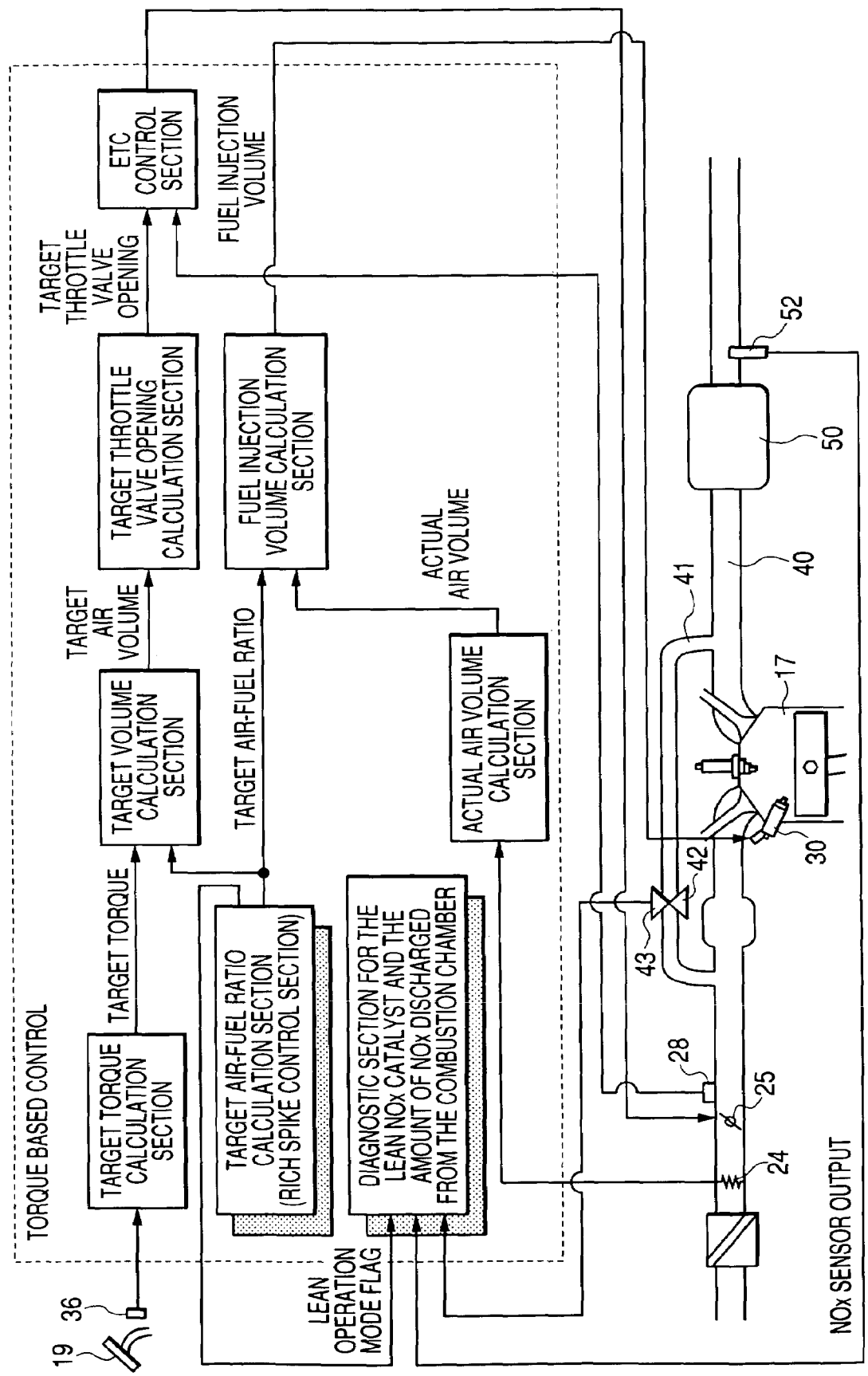
Figure 64:
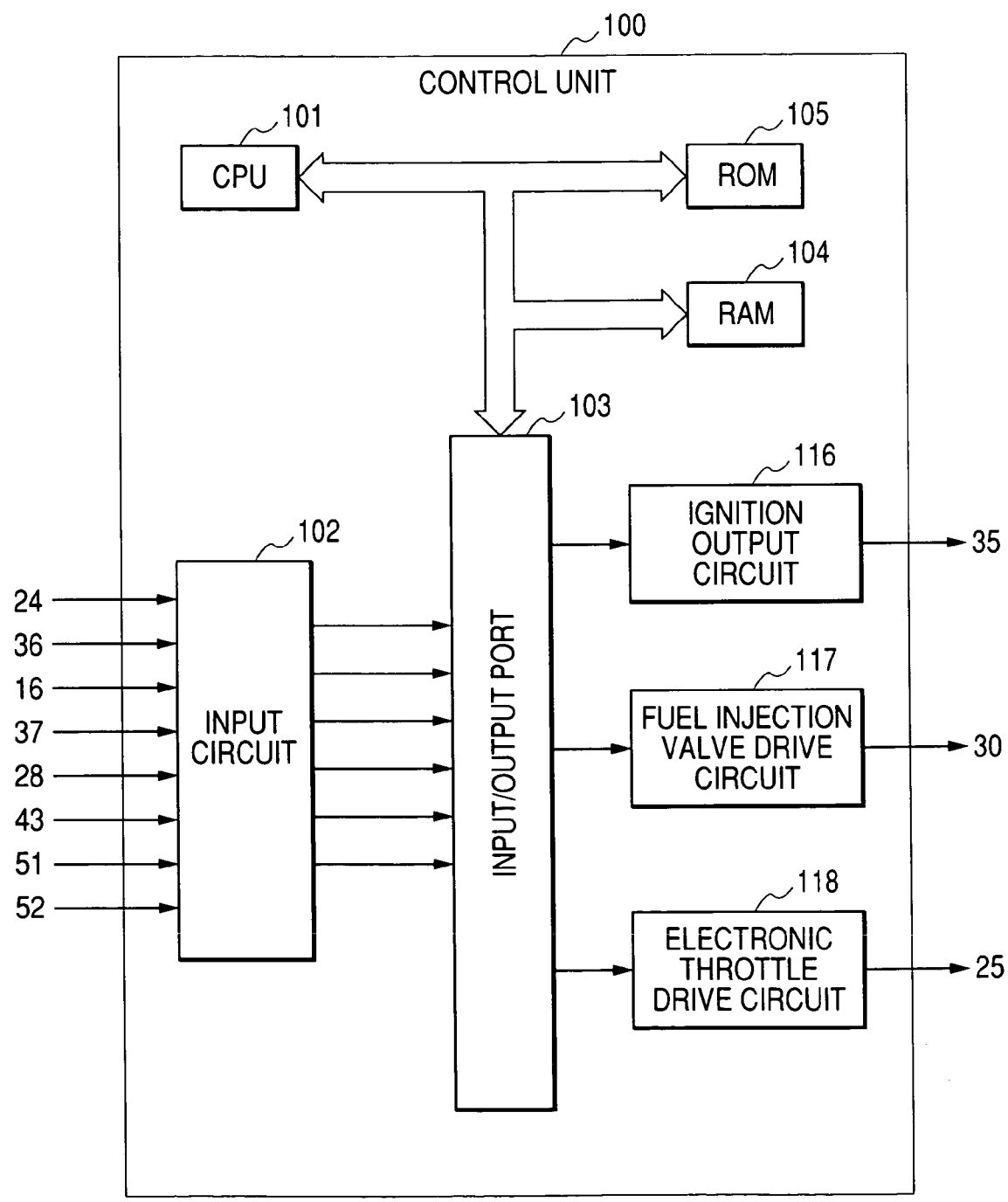
Figure 65:
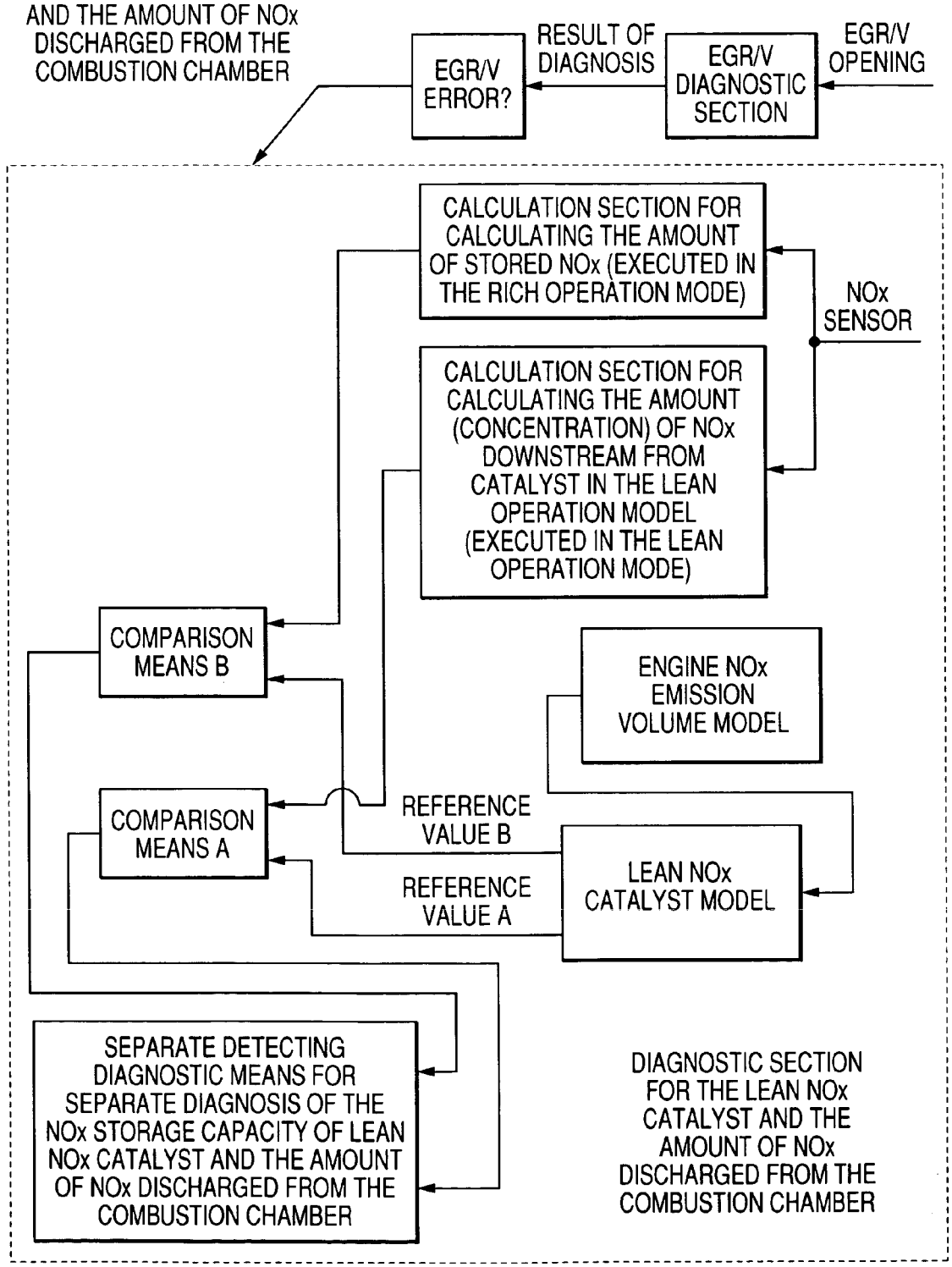

FIG. 54 is a block diagram showing the diagnostic section for the lean NOx catalyst (including oxygen) and the amount of NOx discharged from the combustion chamber in the sixth embodiment;

FIG. 55 is a block diagram showing the calculation section for calculating the stored oxygen in the sixth embodiment;

FIG. 56 is a drawing showing a control system in the seventh embodiment;

FIG. 57 is a block diagram showing the target air-fuel ratio calculation section in the seventh embodiment;

FIG. 58 is a block diagram showing the rich volume control section in the seventh embodiment;

FIG. 59 is a diagram showing a control system in the eighth embodiment;

FIG. 60 is a diagram showing the internal configuration of the control unit in the eighth embodiment;

FIG. 61 is a block diagram showing the diagnostic section for the lean NOx catalyst and the amount of NOx discharged from the combustion chamber in the eighth embodiment;

FIG. 62 is a block diagram showing the calculation section for calculating the amount (concentration) of NOx upstream from catalyst in the lean operation mode in the eighth embodiment;

FIG. 63 is a drawing of the control system in the ninth embodiment;

FIG. 64 is a diagram showing the internal configuration of the control unit in the ninth embodiment; and FIG. 65 is a block diagram showing of the diagnostic section for the lean NOx catalyst and the amount of NOx discharged from the combustion chamber in the ninth embodiment.

DESCRIPTION OF THE PREFERRED EMBODIMENTS

The following describes the embodiments of the present invention with reference to drawings:

Embodiment 1

FIG. 30 is a schematic diagram representing the first embodiment of the present invention, together with an example of the car-mounted cylinder injection engine to which the same is applied.

A cylinder injection engine 10 is a multi-cylinder engine, and includes a cylinder 12 and a piston 15 inserted slidably in the cylinder 12. A combustion chamber 17 is formed over this piston 15. The combustion chamber 17 contains an ignition plug 35 and a fuel injection valve 30 that directly injects a fuel into the combustion chamber 17.

The fuel injection valve 30 is supplied with the fuel regulated to a predetermined pressure, by a fuel supply system equipped with a fuel tank, low pressure fuel pump, fuel pressure regulator and high pressure fuel pump (not illustrated).

Air supplied for combustion of fuel is taken inside by an air cleaner 21 installed on the starting end of an intake path 20, and is put into a collector 27 through an air flow sensor 24 and an electronically controlled throttle valve 25. Air is then sucked into the combustion chamber 17 from this collector 27 through an intake valve 47 arranged on the downstream end of the intake path 20 (its branched path).

A gas mixture consisting of the air sucked into the combustion chamber 17 and the fuel injected from the fuel injection valve 30 is ignited by an ignition plug 35 and is subjected to explosive combustion. The waste gas after combustion (emission gas) is discharged into an emission path 40 from the combustion chamber 17 through an exhaust valve 48. It flows into the lean NOx catalyst 50 arranged in the emission path 40 and is discharged to the outside after having been cleaned.

The lean NOx catalyst 50 stores the NOx discharged from the combustion chamber 17 in the lean operation mode and rich operations performed, whereby the stored NOx catalyst is desorbed and cleaned.

Further, part of the emission gas discharged from the combustion chamber 17 to the emission path 40 is led to the collector 27 of the intake path 20 through an EGR path 41 as required, and is refluxed into the combustion chamber 17 of each cylinder through the branched path of the intake path 20. The EGR path 41 incorporates an EGR valve 42 for regulating the EGR rate.

A control unit 100 containing various microcomputers is arranged in the control apparatus 1 of the present invention to provide various controls of the engine 10.

The control unit 100 is basically composed of a CPU 101, input circuit 102, input/output port 103, RAM 104 and ROM 105, as shown in FIG. 31.

The control unit 100 is supplied with such input signals as:

a signal in response to the intake air volume to be detected by the air flow sensor 24;

a signal in response to the opening of the throttle valve 25 to be detected by a throttle sensor 28;

a signal for detecting the rotation (engine speed) and phase of the crank shaft 18 from a crank angle sensor 37;

a signal in response to the concentration of oxygen in the emission gas detected by the A/F sensor 51 arranged upstream from the lean NOx catalyst 50 in the emission path 40;

a signal (to be described later) in response to the concentration of NOx in the emission gas detected by the NOx sensor 52 arranged downstream from the lean NOx catalyst 50 in the emission path 40;

a signal in response to the engine cooling water temperature to be detected by the water temperature sensor 16 arranged in the cylinder 12; and a signal in response to the stroke (indicative of the driver required torque) of the accelerator pedal 19 obtained from an accelerator sensor 36.

The A/F sensor 51 has a linear output characteristics with respect to the concentration of oxygen in the emission gas. The relationship between concentration of oxygen in the emission gas and air-fuel ratio exhibits an almost linear form, and this allows the air-fuel ratio to be obtained from the A/F sensor 51 for detecting the oxygen concentration. The control unit 100 calculates the air-fuel ratio upstream from lean NOx catalyst 50 from the signal of the A/F sensor 51 and provides a F/B control of sequentially correcting the fuel injection volume or intake air volume to as to ensure that the air-fuel ratio of the gas mixture supplied for combustion reaches the level of the target air-fuel ratio.

The NOx sensor 52 also detects oxygen concentration since it uses the principle of detecting the NOx concentration indirectly from oxygen concentration; it has the function of an oxygen-A/F sensor. Based on the signal from the NOx sensor 52, the control unit 100 calculates the concentration of NOx and oxygen, and A/F. It evaluates if there is any deterioration of the lean NOx catalyst (deterioration of storage capacity), and if there is any increase or decrease in the amount of NOx discharged from the combustion chamber 17. Thus, the control unit 100 provides the optimum control of the lean NOx catalyst 50 from the viewpoint of both the fuel economy and emission gas performance.

The control unit 100, is supplied with the outputs from such sensors as the A/F sensor 51, throttle sensor 28, air flow sensor 28, crank angle sensor 37 and water temperature sensor 16, accelerator sensor 36, and NOx sensor 52. After noise has been removed by the input circuit 102, these signals are sent to the input/output port 103. The input port value is stored in the RAM 104, and is subjected to arithmetic processing in the CPU 101. The control program containing the description of arithmetic processing is written in the ROM 105 in advance. The value for the amount of each actuator operation is stored in the RAM 104 and is then sent to the input/output port 103.

The operation signal for the ignition plug 35 is set to the ON/OFF signal that is turned on when power is supplied to the primary coil of the ignition output circuit 116, and is turned off when power is not supplied. Ignition takes place when this signal turns off. The signal for the ignition plug 35 set to the input/output port 103 is amplified into a sufficient energy required to ignore the ignition output circuit 116 and is sent to the ignition plug 35. The signal for driving the fuel injection valve 30 is set to the ON/OFF signal that is turned when the valve is on, and is turned off when the valve is off. After having been amplified into a sufficient energy required to open the fuel injection valve 30, this signal is sent to the fuel injection valve 30. The drive signal for achieving the opening of the target opening of the electronically controlled throttle valve 25 is sent to the electronically controlled throttle valve 25 through the electronically controlled throttle valve drive circuit 118.

The following specifically describes the details of the control by the control unit 100:

FIG. 32 is a drawing of the control system, representing the major sections of the torque based control of air preceding type. This control unit consists of a target torque calculation section, a target air volume calculation section, a target throttle valve opening calculation section, an ETC (electronically controlled throttle valve 25) control section, a target air-fuel ratio calculation section, and an actual air volume/fuel injection volume calculation section. In the first place, the target torque is calculated from the accelerator opening by the target torque calculation section. Then the target air volume is calculated from the target torque and target air-fuel ratio. Then the opening of the target throttle for achieving the target air volume is calculated. The opening of the throttle is subjected to F/B control by the ETC control unit, based on the output of the throttle sensor 28. Then the fuel injection volume is calculated from the actual air volume detected by the air flow sensor 24 and target air-fuel ratio. The present invention is characterized by the target air-fuel ratio calculation section (rich spike control section); and the diagnostic section (separate detecting diagnostic section) for separate detection of the deterioration of the lean NOx catalyst performance (NOx storage capacity) and the amount of NOx discharged from the combustion chamber (unexpected fluctuation). The specifications of other calculation sections are publicly known and are disclosed in many documents. So their detailed description will be omitted. The following describes the details of the target air-fuel ratio calculation section (rich spike control section) and the separate detecting diagnostic section.

FIG. 33 is a block diagram showing the details of the target air-fuel ratio calculation section (rich spike control section). When the lean operation time has exceeded a predetermined level, the lean flag is set to "0", and the target air-fuel ratio is set to the target air-fuel ratio for rich operation so as to start rich operation. When the rich operation time has exceeded a predetermined level, the lean flag is set to "1", and the target air-fuel ratio is set to the target air-fuel ratio for lean operation so as to restart lean operation.

FIG. 34 is a block diagram showing the details of the separate detecting diagnostic section. This diagnostic section comprises a calculation section for calculating the amount of stored NOx (executed in the rich operation mode), a calculation section for calculating the amount (concentration) of NOx downstream from catalyst in the lean operation mode (executed in the lean operation mode), an engine NOx emission volume model, a lean NOx catalyst model, a comparison means A, a comparison means B, and a separate detecting diagnostic means for separate diagnosis of the NOx storage capacity of lean NOx catalyst or the amount of NOx discharged from the combustion chamber. To put it another way, the fluctuation of the amount of NOx discharged from the combustion chamber in the lean operation mode and deterioration of the lean NOx catalyst 50 (reduction in storage capacity) can be separately diagnosed by detecting the NOx concentration downstream from lean NOx catalyst 50 in each of the lean operation mode and in the rich operation mode by the NOx sensor 52.

FIG. 35 is a block diagram representing the engine NOx emission volume model. The NOx emission basic value is obtained from the engine torque and speed. The NOx emission volume correction value is obtained from the EGR rate and air-fuel ratio. The NOx emission basic value is multiplied by NOx emission volume correction value to get the amount (concentration) of NOx discharged from the combustion chamber. For the engine torque, it is possible to use the target torque calculated by the target torque calculation section shown in FIG. 36. For the air-fuel ratio of the gas mixture used for combustion, it is possible to use the target air-fuel ratio calculated by the target air-fuel ratio calculation section shown in FIG. 33. For the NOx emission basic value and NOx emission volume correction value, it is possible use the result of experiments previously recorded on a map or the like in advance.

FIG. 36 is a block diagram showing the lean NOx catalyst model. The amount (mass) of NOx upstream from the catalyst 50 is calculated, using the amount (concentration) of NOx discharged from the combustion chamber 17 calculated according to the engine NOx emission volume model, the intake air volume and the emission temperature. The formula for conversion from concentration to mass will not be described in details (same for the rest). The amount of stored NOx is subtracted from the amount (mass) of NOx upstream from the catalyst to obtain the amount of unstored NOx. The amount of unstored NOx is again converted into concentration by the calculation section for calculating the amount (concentration) of NOx downstream from catalyst, thereby getting the amount of NOx downstream from catalyst as the reference value A. The formula for conversion from mass to concentration will not be described in details here (same for the rest). The amount of stored NOx is obtained by multiplying the amount (mass) of NOx upstream from the catalyst by the NOx cleaning rate (storage rate). What is called "the amount of stored NOx" refers to the amount of NOx stored for a predetermined period of time T[s]. Since it is given in units of [g/T], it can be expressed as the storage speed. At the time of implementation, the predetermined period of time T[s] corresponds to control cycle. For example, when the control cycle is 10 ms, the unit of the amount of stored NOx is [g/10 ms]. The amount of the NOx stored during the predetermined period of time T[s] is integrated, and the total the amount of NOx stored in the catalyst as the reference value B is obtained. Further, the NOx cleaning (storage) rate is obtained from the product between the basic storage rate and basic storage rate correction. The basic storage rate is obtained from the saturation rate. To put it another way, the greater the reference value for the amount of stored NOx, the smaller the NOx cleaning (storage) rate. The saturation rate is obtained by (the reference value for the amount of stored NOx (reference value B)/maximum storage volume).

The maximum storage volume is obtained from the emission temperature. The basis storage rate correction is obtained from air-fuel ratio of gas mixture for combustion. It can be determined by tests or experiments in conformity to the characteristics of the lean NOx catalyst 50.

FIG. 37 is a block diagram showing the calculation section for calculating the amount (concentration) of NOx downstream from catalyst in the lean operation mode. This calculation section evaluates if the current mode is the lean operation mode or not. If so, the calculation section calculates the amount (concentration) of NOx downstream from catalyst in the lean operation mode, using the output (concentration) of the NOx sensor 52, intake air volume and emission temperature. The formula for conversion from the concentration to the mass is generally known, and the detailed description will be omitted. Further, the amount (mass) of NOx downstream from the catalyst is integrated to get the total amount (mass) of NOx discharged downstream. The Ma represents the actual measurement of the total amount of (unstored) NOx discharged downstream from the lean NOx catalyst 50. The lean flag in FIG. 33 is used to determine if the current mode is the lean mode or not.

FIG. 38 is a block diagram showing the calculation section for calculating the amount of stored NOx. Evaluation is made to determine whether the current mode is the lean operation mode or not. If so, the calculation section calculates the amount (mass) of NOx downstream from lean NOx catalyst 50, using the output (concentration) of the NOx sensor 52, intake air volume and emission temperature. Further, the amount (mass) of NOx downstream from the catalyst is integrated. The total amount (mass) of NOx discharged downstream is multiplied by a predetermined value to get Mb. The Mb represents the actual measurement of the total amount of (unstored) NOx discharged downstream from the lean NOx catalyst in the rich operation mode. In the rich control mode, part of the stored NOx in the lean NOx catalyst 50 flows out downstream from the catalyst, without being cleaned. From the experiment, it has been learned that this amount of NOx flowing out is proportional to the amount of NOx stored in the catalyst. This arrangement permits the amount of actually stored NOx to be estimated from the amount of NOx downstream from the lean NOx catalyst 50. The lean flag in FIG. 33 is used to determine if the current mode is the rich operation mode or not.

FIG. 39 shows the details of the comparison made by the comparison means A given in FIG. 34. The following describes the comparison between the reference value A (Sa) calculated by the lean NOx catalyst model (FIG. 36) and the amount of NOx downstream (Ma) actually measured by the calculation section for calculating the amount of NOx downstream from catalyst in the lean operation mode. To put it another way, the amount of NOx downstream from catalyst in the lean operation mode predicted by the model is assumed as Sa, and the amount of NOx downstream from catalyst measured by the NOx sensor in the lean operation mode is assumed as Ma. Then comparison is made to see whether the predicted value Sa is greater than the measured value Ma or not.

FIG. 40 shows the details of the comparison made by the comparison means B given in FIG. 34. Here comparison is made between the reference value B (Sb) calculated by the lean NOx catalyst model (FIG. 36) and the amount of NOx downstream from catalyst (Mb) measured by the calculation section for calculating the amount of stored NOx (FIG. 38). To put it another way, the amount of stored NOx predicted by the lean NOx catalyst model is assumed as Sb, and the amount of NOx calculated from the NOx sensor output in the rich operation mode is assumed as "Mb". Then comparison is made to see whether the measured value Mb is greater than the predicted value Sb.

FIG. 41 is a matrix and block diagram showing the processing by the separate detecting diagnostic section, applied to the NOx storage capacity of the lean NOx catalyst 50 and the amount of NOx discharged from the combustion chamber in the lean operation mode, wherein the aforementioned processing. In the comparison means A, when Sa>Ma and Sb>Mb, the amount of NOx discharged from the combustion chamber 17 is evaluated to have decreased. If Sa<Ma and Sb<Mb, the amount of NOx discharged from the combustion chamber 17 is evaluated to have increased. If Sa<Ma and Sb>Mb, the NOx storage capacity of the NOx catalyst is evaluated as having deteriorated.

As a result of calculation by the comparison means A, if the measured amount of NOx downstream (Ma) is smaller than the reference value A (Sa), then the amount of NOx discharged from the combustion chamber 17 is evaluated as having decreased.

If the measured amount of NOx downstream (Ma) is greater than the reference value A (Sa), then the amount of NOx discharged from the combustion chamber may have increased, or the NOx storage performance of the lean NOx catalyst may have deteriorated. However, in this phase, namely, from the result of comparison by comparison means A, no evaluation is made as to whether there is any increase in the amount of NOx discharged from the combustion chamber 17 or the lean NOx catalyst performance has deteriorated.

As a result of calculation by the comparison means B, if the measured amount of NOx (Mb) is greater than the reference value B (Sb), then the amount of NOx discharged from the combustion chamber 17 is evaluated as having increased.

If the measured amount of NOx (Mb) is smaller than the reference value B (Sb), then the amount of NOx discharged from the combustion chamber 17 may have decreased, or the NOx storage performance of the lean NOx catalyst may have deteriorated. However, in this phase, namely, from the result of comparison by comparison means B, no evaluation is made as to whether there is any increase in the amount of NOx discharged from the combustion chamber 17 or the lean NOx catalyst performance has deteriorated.

If the measured amount of NOx downstream from catalyst (Ma) is greater than the reference value A (Sa), and the measured the amount of stored NOx (Mb) is greater than the reference value B (Sb) according to the combination of the results of calculations between comparison means A and B, then the lean NOx catalyst can be evaluated to have deteriorated.

As described above, the possibility of the increase or decrease of the amount of NOx discharged from the combustion chamber in the lean operation mode can be diagnosed separately from the possibility of deterioration of the lean NOx catalyst.

As described above, when there is a fluctuation in the amount of NOx downstream from catalyst, the causes of this trouble can be diagnosed separately; namely, the possibility of the increase or decrease of the amount of NOx discharged from the combustion chamber of the engine proper can be diagnosed separately from the possibility of the deterioration in the performance (storage capacity) of the lean NOx catalyst 50. This arrangement avoids the possible diagnostic error in the evaluation of the deterioration in the lean NOx catalyst and ensures the optimum control of the catalyst, whereby effective improvement in engine emission performance and fuel economy is provided.

Embodiment 2

The following describes a second embodiment of the present invention: The system configuration of the second embodiment is approximately the same as that of the first embodiment (see FIGS. 30, 31, 32 and 33), and will not be described here to avoid duplication.

FIG. 42 is a block diagram showing the diagnostic section for the lean NOx catalyst and the amount of NOx discharged from the combustion chamber. This diagnostic section is the same as that of the first embodiment (FIG. 34), except for the calculation section for calculating the amount of stored NOx (executed in the rich operation mode). The calculation section for calculating the amount of stored NOx calculates the amount of stored NOx by detecting the concentration of the oxygen downstream from catalyst. As described above, the calculation section for calculating the amount (concentration) of NOx downstream from catalyst in the lean operation mode (executed in the lean operation mode), engine NOx emission volume model, lean NOx catalyst model, comparison means A, comparison means B and separate detecting diagnostic means for separate diagnosis of the NOx storage capacity of lean NOx catalyst and the amount of NOx discharged from the combustion chamber are the same as in the first embodiment, and will not be described in details to avoid duplication.

FIG. 43 is a block diagram showing the calculation section for calculating the amount of stored NOx. Evaluation is made to see if the current mode is the rich operation mode or not. If so, Mb is assumed as the value obtained by multiplying a predetermined value by the integrated amount of the fuel injection volume during the time period Tr from the time when air-fuel ratio of the engine becomes rich, until the output of oxygen concentration, out of the output of the NOx sensor 52 downstream from lean NOx catalyst 50, becomes rich. This time period Tr corresponds to the time period when the NOx stored in the lean NOx catalyst 50 oxidizes the reducing agent ($H_2$, CO, HC) flowing inside from the catalyst inlet. Accordingly, this is based on the fact that this time period is correlated to the amount of stored NOx. The lean flag in FIG. 33 is used to determine if the current mode is the rich operation mode or not.

Embodiment 3

The following describes a third embodiment of the control apparatus of the present invention: The system configuration of the third embodiment is approximately the same as that of the first embodiment (see FIGS. 30 and 31), and will not be described here to avoid duplication.

FIG. 44 is a diagram showing a control system of the third embodiment, and corresponds to FIG. 32 showing the first embodiment. In the present embodiment, the lean NOx catalyst, the amount (reference value A) of NOx downstream from the lean NOx catalyst 50 calculated by the diagnostic section for diagnosing the amount of NOx discharged from the combustion chamber, and the amount of NOx stored by the NOx catalyst are inputted into the target air-fuel ratio calculation section, and the target air-fuel ratio is calculated, based on it.

FIG. 45 is a block diagram showing the target air-fuel ratio calculation section (the rich spike control section). When the reference value A (reference value for the amount of NOx downstream from catalyst in the lean operation mode) has exceeded a predetermined level Sa, the lean flag is set to "0", and the target air-fuel ratio is set to the target air-fuel ratio for the rich operation so as to restart rich operation. When the rich operation time has exceeded a predetermined level, the lean flag is set to "1", and the target air-fuel ratio is set to the target air-fuel ratio for lean operation so as to restart lean operation. When the reference value A (reference value for the amount of NOx downstream from catalyst in the lean operation mode) has exceeded a predetermined level Sa, the rich operation is started, in order to keep the NOx emission volume in the lean operation mode below a predetermined level. Accordingly, a predetermined value Sa should be determined in response to the permissible NOx emission volume.

As shown in FIG. 46, when the reference value B (reference value for the amount of stored NOx) has exceeded a predetermined value Sb, it is possible to set the lean flag to "0" to start rich operation. This is based on the assumption that the rich operation starts when the amount of NOx stored in the NOx catalyst has exceeded a predetermined level in the lean operation mode. A predetermined value Sb can be determined in response to the performance of the NOx catalyst.

The configuration other than the above is approximately the same as that of the first and second embodiments, and the description will be omitted to avoid duplication.

Fourth Embodiment

The following describes a fourth embodiment of the control apparatus of the present invention: The system configuration of the fourth embodiment is approximately the same as that of the first embodiment (see FIGS. 30 and 31), and the control system is approximately the same as that of the second embodiment (see FIG. 44). So detailed description will be omitted to avoid duplication.

FIG. 47 is a block diagram showing the target air-fuel ratio calculation section (rich spike control section) of the present embodiment. When the reference value A (reference value for the NOx downstream from catalyst in the rich operation mode) has exceeds a predetermined level Sa, the flag is set to "0" to start rich operation. It is also possible to arrange such a configuration that, when the reference value B (reference value for the amount of stored NOx) has exceeded a predetermined level Sb, the lean flag is set to "0" to start rich operation, as shown in FIG. 46. It is also possible to arrange such a configuration that the rich control termination flag is calculated by the rich volume control section. When the rich control termination flag has indicated "1", the lean flat is set to "1" and the target air-fuel ratio is set to the target air-fuel ratio for lean operation so as to restart lean operation.

FIG. 48 is a block diagram showing the rich volume control section. The value obtained by multiplying a predetermined value C by the reference value B (the amount of stored NOx) and by adding a predetermined value D thereto is assumed as the amount of fuel required to clean the stored NOx. From this value, actual fuel injection volume is subtracted for each control cycle until "0" is reached. When "0" has been reached, the rich control termination flag is set to "1". This is based on the understanding that the amount of stored NOx is proportional to the fuel volume required to clean it. For example, it is possible to terminate the rich operation when the concentration of oxygen downstream from the catalyst 50 is subjected to the reversal to the rich mode. However, this means excessive supply of the fuel in the amount corresponding to the delay from the injection of the fuel to the response of the sensor 52 downstream from the catalyst 50, with the result that deterioration of HC and CO will occur. Thus, feed forward control method as the one adopted in the present embodiment is preferred.

The aforementioned arrangement is approximately the same as those of the first and second embodiments, so the description thereof will be omitted to avoid duplication.

Fifth Embodiment

The following describes a fifth embodiment of the control apparatus of the present invention: The system configuration of the fifth embodiment is approximately the same as those of the first through fourth embodiments (see FIGS. 30 and 31), and the control system is approximately the same as those of the first and second embodiments (see FIGS. 32 and 44). Further, the target air-fuel ratio calculation section (rich spike control section) is also the same. Accordingly, detailed description will be omitted to avoid duplication.

FIG. 49 is a block diagram showing the diagnostic section for the lean NOx catalyst and the amount of NOx discharged from the combustion chamber in the present embodiment. The present embodiment is the same as the aforementioned embodiments, except that the parameters of the engine NOx emission volume model and lean NOx catalyst model are modified, based on the result of diagnosis by the separate detecting diagnostic section for the NOx storage capacity of the lean NOx catalyst or the amount of NOx discharged from the combustion chamber in the lean operation mode. Accordingly, the calculation section for calculating the amount of stored NOx (executed in the rich operation mode), the calculation section for calculating the amount (concentration) of NOx downstream from catalyst in the lean operation mode (executed in the lean operation mode), engine NOx emission volume model, lean NOx catalyst model, comparison means A, comparison means B, and separate detecting diagnostic means for separate diagnosis of the NOx storage capacity of lean NOx catalyst and the amount of NOx discharged from the combustion chamber are the same as those described above, and will not be described in details to avoid duplication.

FIG. 50 shows the specifications for changing the parameters of the engine NOx emission volume model. According to the result of separate detection and diagnosis of the NOx storage capacity of the lean NOx catalyst shown in FIG. 41 and the amount of NOx discharged from the combustion chamber in the lean operation mode, by the separate detecting diagnostic section, the value obtained by multiplying the Ma/Sa by a predetermined value in the case of Feng__1=1 or Feng_h=1 is reflected in the parameter of the engine NOx emission volume model as shown in FIG. 50. Here the Ma refers to the amount of downstream NOx calculated by the calculation section for calculating the amount of NOx downstream from catalyst in the lean operation mode, and the Sa indicates the reference value A calculated by the NOx catalyst model (the reference value for the amount of NOx downstream from catalyst in the lean operation mode). To put it another way, when evaluation is made to determine that there is an increase or decrease in the amount of NOx discharged from the combustion chamber 17, the parameter of the engine NOx emission volume model is changed based on the Ma/Sa representing the amount of increase and decrease.

FIG. 51 shows the specifications for changing the parameter of the lean NOx catalyst model. When Fcat=1 according to the result of separate detection and diagnosis of the NOx storage capacity of the lean NOx catalyst shown in FIG. 41 and the amount of NOx discharged from the combustion chamber in the lean operation mode, by the separate detecting diagnostic section, this is reflected in the parameter used to obtain the basic storage rate from the saturation rate of the lean NOx catalyst model, as shown in FIG. 51.

FIG. 52 shows the saturation rate vs. basic storage rate curves fn (Rs) and fd (Rs) for a new product and a deteriorated product 2. When Fcat=1, the saturation rate vs. basic storage rate curves fm (Rs) for another deteriorated product 1 is obtained from the following formula.

$$fm(Rs)=fn(Rs)\times(Mb-Md)/(Mn-Md)+fd(Rs)\times(Mn-Mb)/(Mn-Md)$$

where the Mn denotes the Mb for a new product, and Md indicates the Mb for a deteriorated product 2.

To put it another way, it denotes the internally dividing point of the saturation rate vs. basic storage rate curves for each of the new product and deteriorated product, and the internal ratio is determined based on the Mb, Md and Mn.

Embodiment 6

The following describes a sixth embodiment of the control apparatus of the present invention: The system configuration of the sixth embodiment is approximately the same as that of the first embodiment (see FIGS. 30 and 31), and will not be described here to avoid duplication.

FIG. 53 is a drawing showing a control system as a sixth embodiment in the present invention. When compared with the first embodiment (see FIG. 32), the specifications for calculating the amount of oxygen stored in the lean NOx catalyst is also includes in the diagnostic section for diagnosing the lean NOx catalyst and the amount of NOx discharged from the combustion chamber.

FIG. 54 is a block diagram showing the diagnostic section for the lean NOx catalyst and the amount of NOx discharged from the combustion chamber. It shows the same configuration as that of the first embodiment, except that the calculation section for calculating the amount of oxygen stored in the lean NOx catalyst is additionally provided. The calculation section for calculating the amount of stored NOx (executed in the rich operation mode), calculation section for calculating the amount (concentration) of NOx downstream from catalyst in the lean operation mode (executed in the lean operation mode), engine NOx emission volume model, lean NOx catalyst model, comparison means A, comparison means B, and separate detecting diagnostic means for separate diagnosis of the NOx storage capacity of lean NOx catalyst and the amount of NOx discharged from the combustion chamber are also the same as those described above, and will not be described in details to avoid duplication.

FIG. 55 is a block diagram showing a calculation section for calculating the amount of stored oxygen. Evaluation is made to see whether the current mode is the lean operation mode or not. M3 is assumed as the value obtained by multiplying a predetermined value by the integrated amount of the fuel injection volume during the time period T1 from the time when air-fuel ratio of the engine becomes lean, until the output of oxygen concentration, out of the output of the NOx sensor downstream from lean NOx catalyst, becomes lean. This time period T1 corresponds to the time period when the oxygen flowing inside from the catalyst inlet is stored. Accordingly, this is based on the fact that this time period is correlated to the amount of stored oxygen. The lean flag in FIG. 33 is used to determine if the current mode is the rich operation mode or not.

Embodiment 7

The following describes a seventh embodiment of the control apparatus of the present invention: The system configuration of the seventh embodiment is approximately the same as that of the first embodiment (see FIGS. 30 and 31), and will not be described here to avoid duplication.

FIG. 56 is a drawing showing a control system as a sixth embodiment in the present invention. When compared with the seventh embodiment (see FIG. 53), the amount of NOx downstream from catalyst (reference value A) and the amount of NOx and oxygen (reference B) stored in the NOx catalyst, calculated by the diagnostic section for the lean NOx catalyst and the amount of NOx discharged from the combustion chamber are inputted into the target air-fuel ratio calculation section, and the target air-fuel ratio is calculated based thereon.

FIG. 57 is a block diagram showing the target air-fuel ratio calculation section (rich spike mode control section). When the reference value A (reference value for the NOx downstream from catalyst in the lean operation mode) has exceeded a predetermined level Sa, the lean flag is set to "0" to start rich operation. It is also possible to arrange such a configuration that, when the reference value B (reference value for the amount of stored NOx) has exceeded a predetermined level Sb, the lean flag is set to "0" to start rich operation, as shown in FIG. 46. It is also possible to arrange such a configuration that the rich control termination flag is calculated by the rich volume control section. When the rich control termination flag has indicated "1", the lean flat is set t "1" and the target air-fuel ratio is set to the target air-fuel ratio for lean operation so as to restart lean operation.

FIG. 58 is a block diagram showing the rich volume control section. The value obtained by multiplying a predetermined value C by the reference value B (the amount of stored NOx) and by adding a predetermined value D thereto is assumed as the amount of fuel required to clean the stored NOx. The value obtained by multiplying the amount of stored oxygen by a predetermined value E and by adding a predetermined value F thereto is assumed as the amount of fuel required for the consumption of stored oxygen. When the sum of these two results has reached "0" by subtracting the actual amount of fuel injection for each control cycle, the rich control termination flag is set to "1". This is based on the fact that the amount of stored NOx is proportional to the amount of fuel required to clean it, and that the amount of stored oxygen is proportional to the amount of fuel required to consume it. For example, it is possible to terminate the rich operation when the concentration of oxygen downstream from catalyst is subjected to the reversal to the rich mode, as in the case of the embodiment 2. However, this means excessive supply of the fuel in the amount corresponding to the delay from the injection of the fuel to the response of the sensor 52 downstream from the catalyst 50, with the result that deterioration of HC and CO will occur. Thus, feed forward control method as the one adopted in the present embodiment is preferred.

Embodiment 8

The following describes an eighth embodiment of the control apparatus of the present invention: The system configuration of the eighth embodiment is approximately the same as that of the first embodiment (see FIG. 30). However, as shown in the control system diagram in FIG. 59 and FIG. 60 (corresponding to FIG. 31 of the first embodiment), a NOx sensor 53 is added upstream from the lean NOx catalyst 50, and the output of this NOx sensor 53 is inputted into the input circuit 102.

FIG. 61 is a block diagram showing the diagnostic section for the lean NOx catalyst and the amount of NOx discharged from the combustion chamber. The output of the NOx sensor 52 downstream from catalyst is inputted into the calculation section for calculating the amount of stored NOx, and the output of the NOx sensor 53 for sensing the NOx upstream from the catalyst is inputted into the calculation section for calculating the amount (concentration) of NOx downstream from catalyst in the lean operation mode. Otherwise, this embodiment is the same the first embodiment.

FIG. 62 is a block diagram showing the calculation section for calculating the amount (concentration) of NOx upstream from catalyst in the lean operation mode. Evaluation is made to determine whether the current mode is the lean operation mode or not. If so, the amount (mass) of NOx upstream from lean NOx catalyst is calculated using the output (concentration) of the NOx sensor, intake air volume and emission temperature. Further, the amount (mass) of NOx upstream from the catalyst is integrated. The total amount (mass) of NOx discharged upstream is assumed as MAa. The MAa represents the actual measurement of the total amount (unstored) of NOx flowing out from the lean NOx catalyst in the lean operation mode. The lean flag given in FIG. 33 is used to show if the current mode is a lean mode or not.

In the present embodiment, a sensor is used to measure the instantaneous value of the NOx concentration. For example, it is also possible to use a sensor capable of directly detecting the total amount of NOx discharged during a predetermined time period (Ma in FIG. 37 and MAa in FIG. 62).

Embodiment 9

The following describes a ninth embodiment of the control apparatus of the present invention: The system configuration of the ninth embodiment is approximately the same as that of the first embodiment (see FIG. 30). However, as shown in the control system diagram in FIG. 63 and FIG. 64 (corresponding to FIG. 31 of the first embodiment), an opening sensor 43 for detecting the opening of the EGR valve 42 is added and the output of this opening sensor 43 is inputted into the input circuit 102.

FIG. 65 is a block diagram showing of the diagnostic section for the lean NOx catalyst and the amount of NOx discharged from the combustion chamber, and the diagnostic section of the EGR/V (valve). The opening of the EGR/V 42 is used to check if the EGR/V 42 is working correctly or not. If the EGR/V 42 is evaluated as working incorrectly, the diagnostic section for the lean NOx catalyst and the amount of NOx discharged from the combustion chamber is disabled. Otherwise, the configuration is the same as that of the first embodiment. Further, the diagnostic method of the EGR means including the EGR/V (valve) 42 is widely known, and will not be described in details.

The aforementioned embodiments are all described to be applicable to the spark ignition engine. They can also be applied to the so-called compressed self-ignition engine such as a diesel engine. Especially in the compressed self-ignition engine, the amount of NOx discharged is much reduced as compared to that in the spark ignition engine. Thus, the method of diagnosing the amount of NOx discharged from the engine (combustion chamber) in the present invention is also effective in diagnosing the combustion of the compressed self-ignition engine.

What is claimed is:

1. A control apparatus of an engine wherein lean NOx catalyst having a function of storing the NOx discharaed from a combustion chamber in the lean operation mode, and desorbing and cleaning said stored NOx in the rich operation mode is provided in an exhaust path, said control apparatus comprising:

a sensor for detecting the amount or concentration of the NOx downstream from said lean NOx catalyst;

calculation means A for calculating the amount of NOx downstream from the lean NOx catalyst in the lean operation mode, based on the output from said sensor;

calculation means B for calculating the amount of NOx stored in the lean NOx catalyst;

means for calculating the NOx storage capacity of said lean NOx catalyst, based on the results of calculations by the calculation means A and B setting means for setting a reference value A relative to the amount of NOx downstream from the lean NOx catalyst in the lean operation mode;

setting means for setting a reference value B relative to the stored amount of NOx;

comparison means A for comparing between the amount of NOx downstream from the lean NOx catalyst as a result of calculation by the calculation means A, and said reference value A;

comparison means B for comparing between the amount of NOx stored in the lean NOx catalyst as a result of calculation by the calculation means A, and said reference value B; and diagnostic means for evaluating that:

the amount of NOx discharged from the combustion chamber has reduced when the result of calculation by the calculation means A is smaller than the reference value A in the comparison means A, and the result of calculation by calculation means B is smaller than the reference value B in the comparison means B;

the amount of NOx discharged from the combustion chamber has increased when the result of calculation by calculation means A is greater than the reference value A in the comparison means A, and the result of calculation by calculation means B is greater than the reference value B in the comparison means B; and the NOx storage capacity of the lean NOx catalyst has reduced when the result of calculation by calculation means A is smaller than the reference value A in the comparison means A, and the result of calculation by calculation means B is greater than the reference value B in the comparison means B.

2. The control apparatus described in claim 1 further comprising:
- an engine NOx emission volume model for calculating the amount of NOx discharged from the combustion chamber or the concentration of NOx; and
- a lean NOx catalyst model for calculating the reference values A and B, based on the amount or concentration of NOx discharged from the combustion chamber calculated according to said NOx emission volume model.

3. The control apparatus described in claim 2 wherein said engine NOx emission volume model calculates the amount of NOx discharged from the combustion chamber, by correcting the NOx emission volume basic value calculated according to the engine torque and speed, based on the EGR rate and air-fuel ratio.

4. The control apparatus described in claim 2 wherein said lean NOx catalyst model comprises:
- calculation means for calculating the amount of NOx flowing into the lean NOx catalyst, based on the amount of NOx flowing into the lean NOx catalyst calculated by said engine NOx emission volume model;
- calculation means for calculating the NOx cleaning rate and storage rate based on the reference value A;
- calculation means for calculating the amount of NOx storage based on the amount of NOx flowing into the lean NOx catalyst and NOx cleaning rate or storage rate;
- setting means for setting the reference value B by adding up the NOx storage volume;
- calculation means for subtracting the NOx storage volume from the amount of NOx flowing into the lean NOx catalyst and calculating the amount of unstored NOx; and
- setting means for setting the reference value A by integrating the unstored amount of NOx.

5. The control apparatus described in claim 2 comprising rich control start timing setting means for setting the timing to start rich control to desorb and clean the NOx stored in the lean NOx catalyst, based on said reference value A or B.

6. The control apparatus described in claim 5 wherein said rich control start timing setting means sets the timing in such a way that rich control starts when the reference value B calculated by the lean NOx catalyst model has exceeded a predetermined value Sb.

7. The control apparatus described in claim 5 wherein said rich control start timing setting means sets the timing in such a way that rich control starts when the reference value A calculated by the lean NOx catalyst model has exceeded a predetermined value Sa.

8. The control apparatus described in claim 1 comprising calculation means for calculating the rich volume during the rich control for desorbing and cleaning the NOx stored in the lean NOx catalyst, according to the reference value B.

9. The control apparatus described in claim 2 comprising fuel supply volume calculation mean for determining that the value obtained by multiplying a predetermined value C by the reference value B calculated by the lean NOx catalyst model is the fuel supply volume in the rich control mode.

10. The control apparatus described in claim 2 comprising:
- means for changing the parameter of said lean NOx catalyst model in response to the NOx storage capacity of the lean NOx catalyst; and
- means for changing the parameter of said engine NOx emission volume model in response to the amount of NOx discharged from the combustion chamber.

11. The control apparatus described in claim 2 comprising means for changing the NOx emission volume basic value calculated according to the torque and speed of the engine in the engine NOx emission volume model, and the NOx emission volume correction value calculated based on the EGR rate and air-fuel ratio.

12. The control apparatus described in claim 2 comprising means for changing the NOx cleaning rate or storage rate calculated on the basis of the reference value B in the lean NOx catalyst, in response to the NOx storage capacity of the lean NOx catalyst.

* * * * *